(12) United States Patent
Lee et al.

(10) Patent No.: US 10,904,569 B2
(45) Date of Patent: Jan. 26, 2021

(54) IMAGE ENCODING/DECODING METHOD USING PREDICTION BLOCK AND APPARATUS FOR SAME

(71) Applicant: Electronics and Telecommunications Research Institute, Daejeon (KR)

(72) Inventors: Jin Ho Lee, Daejeon-si (KR); Hui Yong Kim, Daejeon-si (KR); Sung Chang Lim, Daejeon-si (KR); Jin Soo Choi, Daejeon-si (KR); Jin Woong Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/546,786

(22) Filed: Aug. 21, 2019

(65) Prior Publication Data

US 2019/0379905 A1 Dec. 12, 2019

Related U.S. Application Data

(63) Continuation of application No. 16/206,696, filed on Nov. 30, 2018, now Pat. No. 10,516,897, which is a
(Continued)

(30) Foreign Application Priority Data

Jun. 20, 2011 (KR) .......................... 10-2011-0059850
Jul. 1, 2011 (KR) .......................... 10-2011-0065708
(Continued)

(51) Int. Cl.
*H04N 19/593* (2014.01)
*H04N 19/117* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC ...... H04N 19/11; H04N 19/176; H04N 19/46; H04N 19/593; H04N 19/82; H04N 19/182
See application file for complete search history.

(56) References Cited

U.S. PATENT DOCUMENTS 6,580,758 B1 6/2003 Chevance et al.
7,050,504 B2 5/2006 Joch et al.
(Continued)

FOREIGN PATENT DOCUMENTS

CN 101321290 A 12/2008
CN 101409833 A 4/2009
(Continued)

OTHER PUBLICATIONS

Overview of the H.264_AVC video coding standard; Wiegand; 2003. (Year: 2003).*
(Continued)

*Primary Examiner* — Luis Perez-Fuentes
(74) *Attorney, Agent, or Firm* — NSIP Law

(57) ABSTRACT

According to the present invention, an image encoding/decoding method comprises the steps of: performing an intra prediction on a current block so as to generate a prediction block; performing filtering on a filtering target pixel in the prediction block on the basis of the intra prediction mode of the current block so as to generate a final prediction block; and generating a reconstructed block on the basis of a reconstructed differential block corresponding to the current
(Continued)

block and on the final prediction block. According to the present invention, image encoding/decoding efficiency can be improved.

6 Claims, 22 Drawing Sheets

Related U.S. Application Data continuation of application No. 15/410,388, filed on Jan. 19, 2017, now Pat. No. 10,205,964, which is a continuation of application No. 14/221,794, filed on Mar. 21, 2014, now Pat. No. 9,591,327, which is a continuation of application No. 13/983,207, filed as application No. PCT/KR2012/004883 on Jun. 20, 2012, now Pat. No. 9,332,262.

(30) Foreign Application Priority Data

| Nov. 15, 2011 | (KR) | ................ 10-2011-0119214 |
| Nov. 28, 2011 | (KR) | ................ 10-2011-0125353 |
| Jun. 20, 2012 | (KR) | ................ 10-2012-0066206 |
| Sep. 5, 2013 | (KR) | ................ 10-2013-0106605 |

(51) Int. Cl.

| H04N 19/157 | (2014.01) |
| H04N 19/182 | (2014.01) |
| H04N 19/105 | (2014.01) |
| H04N 19/159 | (2014.01) |
| H04N 19/11 | (2014.01) |
| H04N 19/122 | (2014.01) |
| H04N 19/137 | (2014.01) |
| H04N 19/82 | (2014.01) |
| H04N 19/44 | (2014.01) |
| H04N 19/136 | (2014.01) |
| H04N 19/80 | (2014.01) |
| H04N 19/176 | (2014.01) |
| H04N 19/96 | (2014.01) |

(52) U.S. Cl.
CPC ......... *H04N 19/117* (2014.11); *H04N 19/122* (2014.11); *H04N 19/136* (2014.11); *H04N 19/137* (2014.11); *H04N 19/157* (2014.11); *H04N 19/159* (2014.11); *H04N 19/182* (2014.11); *H04N 19/44* (2014.11); *H04N 19/80* (2014.11); *H04N 19/82* (2014.11); *H04N 19/176* (2014.11); *H04N 19/96* (2014.11)

(56) References Cited

U.S. PATENT DOCUMENTS

| 7,386,048 | B2 | 6/2008 | Sun et al. |
| 7,444,029 | B2 | 10/2008 | Shen et al. |
| 7,457,362 | B2 | 11/2008 | Sankaran |
| 7,609,897 | B2 | 10/2009 | Oneda et al. |
| 7,688,893 | B2 | 3/2010 | Morimoto et al. |
| 7,995,654 | B2 | 8/2011 | Boon et al. |
| 8,514,942 | B2 | 8/2013 | Goel |
| 8,576,906 | B2 | 11/2013 | Andersson et al. |
| 8,619,857 | B2 | 12/2013 | Zhao et al. |
| 8,619,858 | B2 * | 12/2013 | Min ................ H04N 19/30 375/240.12 |
| 8,644,375 | B2 | 2/2014 | Segall et al. |
| 8,654,845 | B2 | 2/2014 | Tao et al. |
| 8,711,950 | B2 | 4/2014 | Minamoto |
| 8,743,949 | B2 | 6/2014 | Srinivasan et al. |
| 8,879,626 | B2 | 11/2014 | Alshina et al. |
| 9,008,175 | B2 | 4/2015 | Van Der Auwera et al. |
| 9,154,781 | B2 | 10/2015 | Lee et al. |
| 9,189,869 | B2 | 11/2015 | Yie et al. |
| 9,225,981 | B2 | 12/2015 | Lee et al. |
| 9,332,262 | B2 | 5/2016 | Lee et al. |
| 9,426,491 | B2 | 8/2016 | Kim et al. |
| 9,445,127 | B2 | 9/2016 | Kim et al. |
| 9,503,758 | B2 | 11/2016 | Jang |
| 9,591,327 | B2 | 3/2017 | Lee et al. |
| 9,615,094 | B2 | 4/2017 | Oh et al. |
| 9,641,844 | B2 | 5/2017 | Kim et al. |
| 9,712,822 | B2 | 7/2017 | Han et al. |
| 10,003,820 | B2 | 6/2018 | Lee et al. |
| 10,368,090 | B2 | 7/2019 | Park et al. |
| 2005/0201633 | A1 | 9/2005 | Moon et al. |
| 2007/0206872 | A1 | 9/2007 | Song |
| 2010/0208802 | A1 * | 8/2010 | Tsukuba ............... H04N 19/176 375/240.12 |
| 2011/0317757 | A1 * | 12/2011 | Coban ................ H04N 19/46 375/240.02 |
| 2012/0008675 | A1 * | 1/2012 | Karczewicz .......... H04N 19/61 375/240.02 |
| 2012/0020580 | A1 | 1/2012 | Sasai et al. |
| 2012/0033736 | A1 | 2/2012 | Sato |
| 2012/0039388 | A1 * | 2/2012 | Kim ................ H04N 19/11 375/240.03 |
| 2012/0294365 | A1 * | 11/2012 | Zheng .................. H04N 19/176 375/240.16 |
| 2013/0279577 | A1 | 10/2013 | Schwarz et al. |
| 2013/0287116 | A1 | 10/2013 | Helle et al. |
| 2013/0301720 | A1 * | 11/2013 | Lee ................ H04N 19/182 375/240.12 |
| 2013/0336591 | A1 | 12/2013 | Jeon et al. |
| 2014/0079128 | A1 | 3/2014 | Kim et al. |
| 2014/0328397 | A1 | 11/2014 | Jeon et al. |
| 2015/0023405 | A1 | 1/2015 | Joshi et al. |
| 2015/0195559 | A1 | 7/2015 | Chen et al. |
| 2015/0365698 | A1 * | 12/2015 | Lin ................ H04N 19/593 375/240.12 |
| 2016/0105685 | A1 | 4/2016 | Zou et al. |
| 2016/0198189 | A1 | 7/2016 | Lee et al. |
| 2016/0255367 | A1 * | 9/2016 | Kim ................ H04N 19/82 375/240.16 |
| 2017/0064316 | A1 * | 3/2017 | Alshina ................ H04N 19/42 |

FOREIGN PATENT DOCUMENTS

| CN | 101710990 A | 5/2010 | |
| JP | 2010-183162 A | 8/2010 | |
| JP | 2011-030175 A | 2/2011 | |
| JP | 5478740 B2 | 4/2014 | |
| KR | 10-2008-0068474 A | 7/2008 | |
| KR | 10-2011-0054244 A | 5/2011 | |
| KR | 10-2011-0062516 A | 6/2011 | |
| WO | WO 02/067589 A1 | 8/2002 | |
| WO | WO 2010/087157 A1 | 8/2010 | |
| WO | WO 2010/120113 A2 | 10/2010 | |
| WO | WO-2010120113 A2 * | 10/2010 | ............ H04N 19/61 |
| WO | WO 2011/049605 A1 | 4/2011 | |
| WO | WO 2011/057557 A1 | 5/2011 | |
| WO | WO 2012/096150 A1 | 7/2012 | |
| WO | WO 2012/148138 A2 | 11/2012 | |

OTHER PUBLICATIONS

New technique for next generation video coding; Liu; 2010. (Year: 2010).*
NPL Google search; 2020. (Year: 2020).*
Pan, Feng, et al. "Fast Mode Decision Algorithm for Intra-Prediction in H264-AVC Video Coding." *IEEE Transactions On Circuits and Systems for Video Technology* 15.7 (Jul. 2005). (10 pages, in English).
Li, Xiang, et al. "Gradient Intra Prediction for Coding of Computer Animated Videos", IEEE 8th Workshop on Multimedia Signal Processing, XP31011019, Oct. 2006: pp. 50-53.

(56) References Cited

OTHER PUBLICATIONS

Matsuo, Shohei, et al. "Intra Prediction With Spatial Gradient", Visual Communications and Image Processing, XP030081771, Jan. 2009 (10 pages, in English).
Elyousfi, A., et al. "Fast Intra Prediction Algorithm for H.264/AVC Based on Quadratic and Gradient Model", International Journal of Electrical and Electronics Engineering 4, XP055117225, Jan. 2010: pp. 27-35.
Li, Xiang, Norbert Oertel, and André Kaup. "Gradient Intra Prediction for Coding of Computer Animated Videos." Multimedia Signal Processing, 2006 IEEE 8th Workshop on. IEEE, 2006.
Winken, Martin, et al. "Description of video coding technology proposal by Fraunhofer HHI", Joint Collaborative Team on Video Coding of ISO/IEC JTC1/SC29/WG11 and ITU-TSG.16, URL: http://wftp3.1tu.int/av-arch/jctvc-site/, No. JCTVC-A116, XP030007557, Apr. 2010 (44 pages, in English).
McCann, Ken, et al . . . "Samsung's Response to the Call for Proposals on Video Compression Technology, document JCTVC-A124." Joint Collaborative Team on Video Coding (JCT-VC), XP030007573, Dresden, Germany (2010): (42 pages, in English).
Tung, Nguyen. "Improved intra smoothing for UDI and new fast AIS decision mode", Joint Collaborative Team on Video Coding of ISO/IEC JTC1/SC29/WG11 and 1TU-T SG.16, URL: http://wftp3.1tu.int/av-arch/jctvc-site/, No. JCTVC-C302, XP030008009, Oct. 2010 (4 pages, in English).
Zheng, Yunfei, et al. "CE13:Mode Dependent Hybrid Intra Smoothing", Joint Collaborative Team on Video Coding of ISO/IEC JTC1/SC29/WG11 and 1TU-T SG.16, URL: http://wftp3.itu.int/av-arch/jctvc-site/, No. JCTVC-D282, XP030008322, Jan. 2011 (6 pages, in English).
Sugimoto, Kazuo, et al: "LUT-based adaptive filtering on intra prediction samples", Motion Picture Expert Group or ISO/IEC JTC1/SC29/WG11, No. JCTVC-D109, XP030047429, Jan. 2011 (4 pages, in English).
Zhao, Jie, et al. "On Intra Coding and MDIS", Joint Collaborative Team on Video Coding of ISO/IEC JTC1/SC29/WG11, No. JCTVC-E437, Mar. 2011 (4 pages, in English).
Lai C et al., "New intra prediction using the correlation between pixels and lines," 2.JCT-VC Meeting; Jul. 21, 2010-Jul. 28, 2010; Geneva; (Joint Collaborative Team on Video Coding of ISO/IEC JTC1/SC29/WG11 and ITU-T SG16); URL:http://wftp3.itu.int/av-arch/jctvc-site/, No. JCTVC-B040, Jul. 24, 2010 (Jul. 24, 2010), XP30007620, pp. 1-4.
Rickard Sjoberg, et al., "Constrain Intra Source Code Implementation", Joint Collaborative Team in Video Coding (JCT-VC) of ITU-T SG16 WP3 and ISO/IEC JTC1/SC29/WG11, 4$^{th}$ Meeting: Daegu, KR, Jan. 20-28, 2011—Document: JCTVC-D386 (3 pages, in English).
Sugimoto, Kazuo, et al. "CE6.f: verification report on LUT-based adaptive filtering on intra prediction samples" Joint Collaborative Team on Video Coding (JCT-VC) of ITU-T SG16 WP3 and ISO/IEC JTC1/SC29/WG11 5th Meeting: Geneva, CH, Mar. 2011, [JCTVC-E069] (7 pages, in English).
Chono, Keiichi., et al., "CE6: Cross-Verification Report of LUT-based Intraprediction Filtering." Document: JCTVC-E184, 5$^{th}$ Meeting: Geneva, CH, Mar. 15-23, 2011 (3 pages in English).

Van der Auwera, G., et al., "CE6.f: Cross-Verification of Mitsubishi's LUT-Based Intra Prediction Filtering Contribution by Qualcomm." Document: JCTVC-E369, 5$^{th}$ Meeting: Geneva, CH, Mar. 16-23, 2011 (2 pages in English).
Lainema, Jani, et al. "Directional intra prediction smoothing", Joint Collaborative Team on Video Coding of ISO/IEC JTC1/SC29/WG11 and ITU-T SG.16, URL: http://wftp3.itu.int/av-arch/jctvc-site/, No. JCTVC-F456, XP030009479, Jul. 2011 (4 pages, in English).
Davies, Thomas. "BBC's Response to the Call for Proposals on Video Compression Technology." Document: JCTVC-A 125, 1st Meeting: Dresden, DE, Apr. 15-23, 2010. (2 pages in English).
Minezawa, Akira, et al. "An improved intra vertical and horizontal prediction", Join Collaborative Team on Video Coding of ISO/IEC JTC1/SC29/WG11 and ITU-T SG.16, URL: http'// wftp3. itu.int/av-arch/jctvc-site/, No. JCTVC-F172, XP030009195, Jul. 2011 (6 pages, in English).
Lee, Jinho, et al., "Mode dependent filtering for intra predicted sample", Joint Collaborative Team on Video Coding (JCT-VC) of ITU-T SG16 WP3 and ISO/IEC JTC1/SC29/WG11, 6$^{th}$ Meeting: Torino, IT, Jul. 14-22, 2011—Document: JCTVC-F358 (9 pages).
Alshin, A. et al., "Block-size and pixel position independent boundary smoothing for non-directional Intra prediction" Joint Collaborative Team on Video Coding (JCT-VC) of ITU-T SG16 WP3 and ISO/IEC JTC1/SC29/WG11 6th Meeting: Torino, IT, Jul. 14-22, 2011 (3 pages in English).
International Search Report dated Dec. 20, 2012, in counterpart International Application No. PCT/KR2012/004883. (5 pages including English translation).
Extended European Search Report dated May 20, 2014 in European Application No. 12803047.5 (8 pages, in English).
Extended European Search Report dated May 20, 2014 in European Application No. 14160472.8 (9 pages, in English).
Japanese Office Action dated Jun. 3, 2014 in counterpart Japanese Application No. JP 2014-516915 (5 pages, in Japanese).
Japanese Office Action dated Jun. 6, 2014 in counterpart Japanese Application No. JP 2014-070145 (5 pages, in Japanese).
Korean Notice of Allowance issued by the Korean Intellectual Property Office dated Jul. 11, 2014 in the corresponding Korean Application No. 10-2013-0106607 (5 pages, in Korean).
Korean Office Action issued by the Korean Intellectual Property Office dated Jul. 14, 2014 for the corresponding Korean Application No. 10-2014-0054411 (3 pages, in Korean).
Chinese Office Action dated Aug. 5, 2014 in counterpart Chinese Application No. CN 201280011184.0 (8 pages, with English language translation).
Chinese Office Action dated Oct. 10, 2014 in corresponding Chinese Application No. 201410069312.8 (18 pages, with English translation).
U.S. Office Action dated Oct. 23, 2014 in parent U.S. Appl. No. 13/983,207 (13 pages).
U.S. Office Action dated Nov. 17, 2014 in related U.S. Appl. No. 14/202,943 (17 pages).
Japanese Office Action dated Dec. 12, 2014 in counterpart Japanese Application No. JP 2014-070145 (4 pages, in Japanese).
Examiner Google Search; 2019 (Year: 2019), cited in U.S. Office Action dated Mar. 8, 2019 in parent U.S. Appl. No. 16/206,696 (1 page, in English).
David Money Harris et al., "Digital Design and Computer Architecture," First edition, SHOEISHA, Aug. 3, 2009, pp. 335-337, ISBN: 978-4-7981-1534-4 (21 pages in Korean).

* cited by examiner

FIG. 7

|  710  |  |  |  |
|---|---|---|---|
| -4 | -5 | -4 | -8 |
| -8 | -6 | -4 | -7 |
| 7 | 0 | -4 | -8 |
| 2 | 2 | 2 | -3 |

|  720  |  |  |  |
|---|---|---|---|
| -4 | -5 | -4 | -8 |
| -8 | -6 | -4 | -7 |
| 7 | 0 | -4 | -8 |
| 6 | 4 | -4 | -8 |

=

| 70 | 68 | 68 | 68 |
|---|---|---|---|
| 72 | 70 | 68 | 68 |
| 72 | 72 | 70 | 68 |
| 78 | 75 | 66 | 66 |

=

| 70 | 68 | 68 | 68 |
|---|---|---|---|
| 72 | 70 | 68 | 68 |
| 72 | 72 | 70 | 68 |
| 73 | 72 | 72 | 70 |

−

| 66 | 63 | 64 | 60 |
|---|---|---|---|
| 64 | 64 | 64 | 61 |
| 79 | 72 | 66 | 60 |
| 80 | 77 | 68 | 63 |

−

| 66 | 63 | 64 | 60 |
|---|---|---|---|
| 64 | 64 | 64 | 61 |
| 79 | 72 | 66 | 60 |
| 80 | 77 | 68 | 63 |

FIG. 9

| | 910 | | | | 920 | | | |
|---|---|---|---|---|---|---|---|---|
| 919 | 66 | 68 | 64 | 64 | 66 | 68 | 64 | 64 | 929 |
| | 64 | 70 | 60 | 60 | 64 | 70 | 60 | 60 | |
| | 80 | 72 | 62 | 60 | 80 | 72 | 62 | 60 | |
| | 80 | 77 | 68 | 68 | 75 | 74 | 74 | 72 | |

=  =

| 916 | 70 | 68 | 68 | 68 | 70 | 68 | 68 | 68 | 926 |
|---|---|---|---|---|---|---|---|---|---|
| | 72 | 70 | 68 | 68 | 72 | 70 | 68 | 68 | |
| | 72 | 72 | 70 | 68 | 72 | 72 | 70 | 68 | |
| | 78 | 75 | 66 | 66 | 73 | 72 | 72 | 70 | |

+  +

| 913 | −4 | 0 | −4 | −4 | −4 | 0 | −4 | −4 | 923 |
|---|---|---|---|---|---|---|---|---|---|
| | −8 | 0 | −8 | −8 | −8 | 0 | −8 | −8 | |
| | 8 | 0 | −8 | −8 | 8 | 0 | −8 | −8 | |
| | 2 | 2 | 2 | 2 | 2 | 2 | 2 | 2 | |

FIG. 11
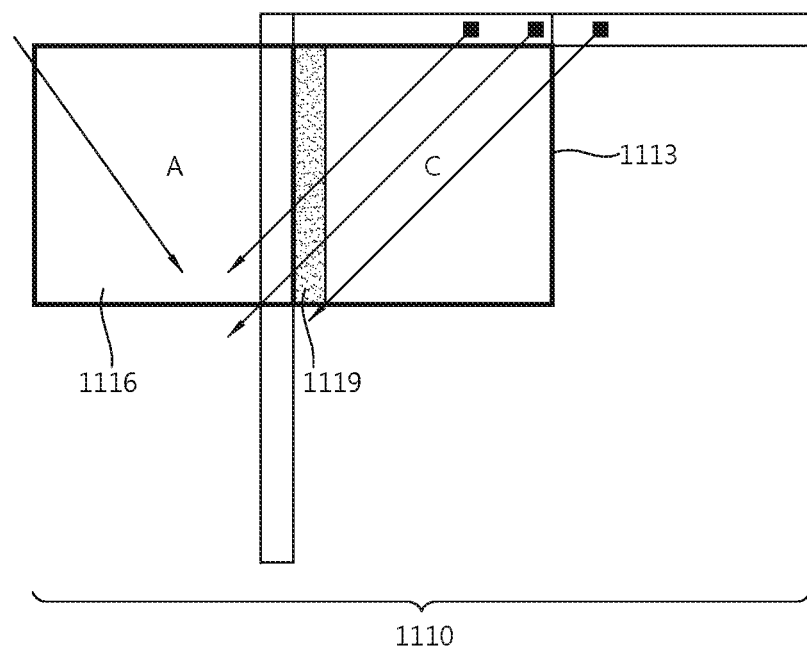
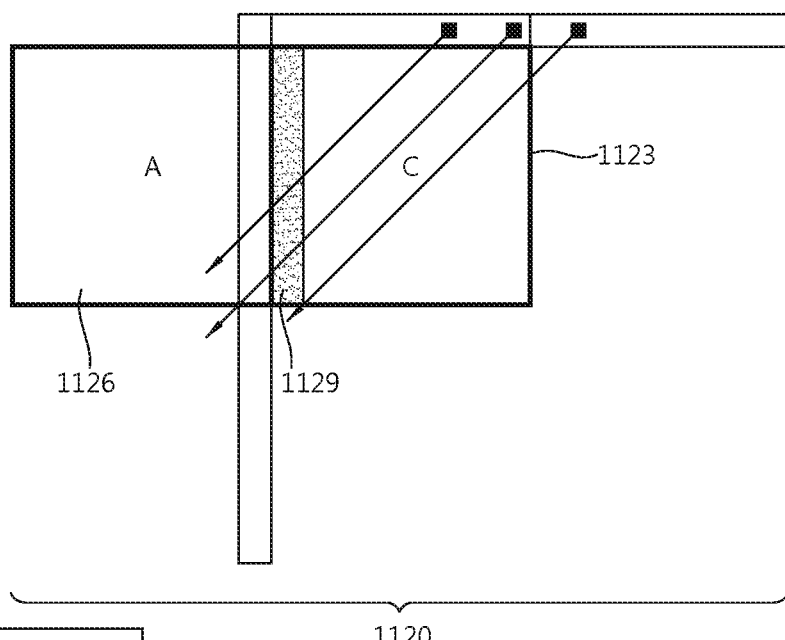

FIG. 15
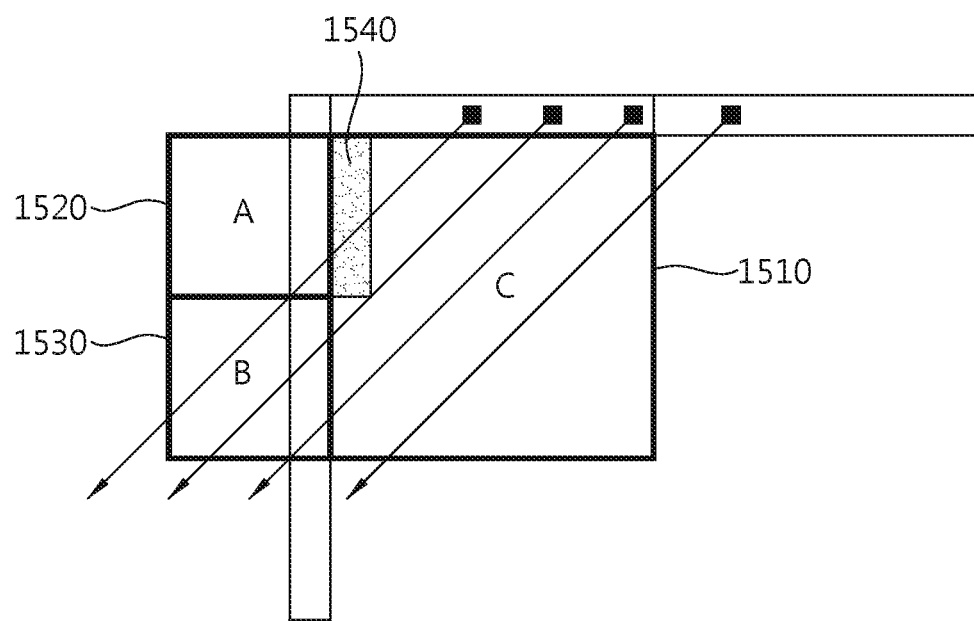
| INTRODUCTORY NOTES |
| --- |
|  FILTERING TARGET REGION |

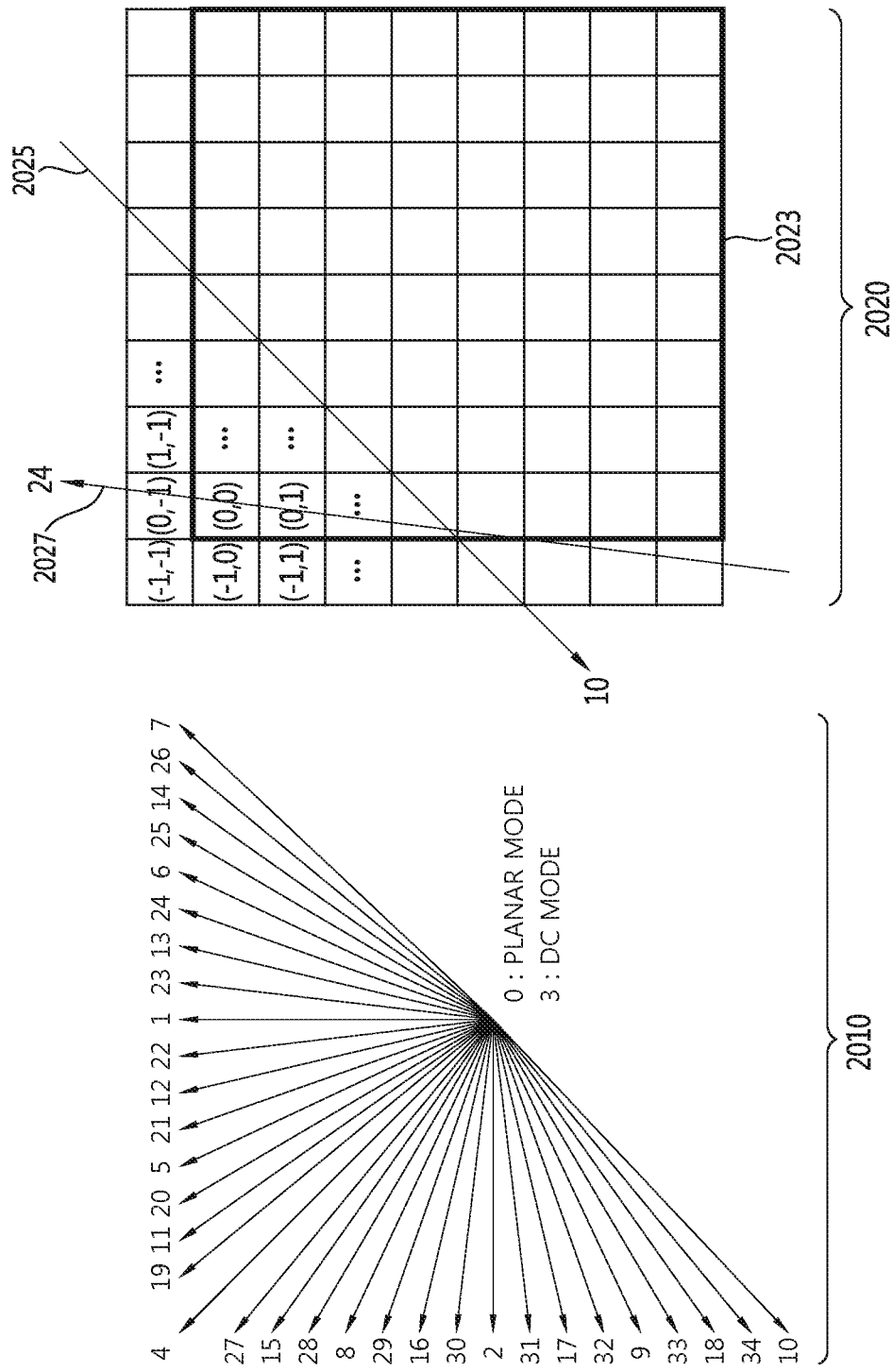

IMAGE ENCODING/DECODING METHOD USING PREDICTION BLOCK AND APPARATUS FOR SAME

CROSS-REFERENCE TO RELATED APPLICATIONS

This application is a Continuation application of U.S. patent application Ser. No. 16/206,696 filed on Nov. 30, 2018, issued as U.S. Pat. No. 10,516,897 on Dec. 24, 2019, which is a Continuation application of U.S. patent application Ser. No. 15/410,388 filed on Jan. 19, 2017, issued as U.S. Pat. No. 10,205,964 on Feb. 12, 2019, which is a Continuation application of U.S. patent application Ser. No. 14/221,794 filed on Mar. 21, 2014, issued as U.S. Pat. No. 9,591,327 on Mar. 7, 2017, which is a Continuation application of U.S. application Ser. No. 13/983,207 filed on Aug. 1, 2013, issued as U.S. Pat. No. 9,332,262 on May 3, 2016, which is a U.S. National Stage application of International Application No. PCT/KR2012/004883 filed Jun. 20, 2012, claiming priority based on Korean Patent Application Nos. 10-2011-0059850 filed Jun. 20, 2011, 10-2011-0065708 filed Jul. 1, 2011, 10-2011-0119214 filed Nov. 15, 2011, 10-2011-0125353 filed Nov. 28, 2011, 10-2012-0066206 filed Jun. 20, 2012, and 10-2013-0106605 filed Sep. 5, 2013, the contents of all of which are incorporated herein by reference in their entireties.

TECHNICAL FIELD

The present invention relates to image processing, and more particularly, to an intra prediction method and apparatus.

BACKGROUND ART

Recently, in accordance with the expansion of broadcasting services having high definition (HD) resolution in the country and around the world, many users have been accustomed to a high resolution and definition image, such that many organizations have attempted to develop the next-generation video devices. In addition, as the interest in HDTV and ultra high definition (UHD) having a resolution four times higher than that of HDTV have increased, a compression technology for a higher-resolution and higher-definition image has been demanded.

For image compression, an inter prediction technology of predicting pixel values included in a current picture from a picture before and/or after the current picture, an intra prediction technology of predicting pixel values included in a current picture using pixel information in the current picture, an entropy encoding technology of allocating a short code to symbols having a high appearance frequency and a long code to symbols having a low appearance frequency, or the like, may be used.

DISCLOSURE

Technical Problem

The present invention provides an image encoding method and apparatus capable of improving image encoding/decoding efficiency.

The present invention also provides an image decoding method and apparatus capable of improving image encoding/decoding efficiency.

The present invention also provides a prediction block generating method and apparatus capable of improving image encoding/decoding efficiency.

The present invention also provides an intra prediction method and apparatus capable of improving image encoding/decoding efficiency.

The present invention also provides a filtering performing method and apparatus capable of improving image encoding/decoding efficiency.

Technical Solution

In an aspect, an image decoding method is provided. The picture decoding method includes: generating a prediction block by performing intra prediction on a current block; generating a final prediction block by performing filtering on a filtering target pixel in the prediction block based on an intra prediction mode of the current block; and generating a reconstructed block based on the final prediction block and a reconstructed residual block corresponding to the current block, wherein the filtering target pixel is a prediction pixel included in a filtering target region in the prediction block, and a filter type applied to the filtering target pixel and the filtering target region are determined based on the intra prediction mode of the current block.

In the case in which the intra prediction mode of the current block is a DC mode, the filtering target region may include a left vertical prediction pixel line that is one vertical pixel line positioned at the leftmost portion in the prediction block and an upper horizontal prediction pixel line that is one horizontal pixel line positioned at the uppermost portion in the prediction block.

In the generating of the final prediction block, the filtering may be performed in the case in which the current block is a luma component block and may not be performed in the case in which the current block is a chroma component block.

The filter type may include information on a filter shape, a filter tap, and a plurality of filter coefficients, and in the generating of the final prediction block, the filtering may be performed based on a predetermined fixed filter type regardless of a size of the current block.

In the case in which the filtering target pixel is a left upper prediction pixel positioned at the leftmost upper portion in the prediction block, in the generating of the final prediction block, the filtering on the filtering target pixel may be performed by applying a 3-tap filter based on the filtering target pixel, an above reference pixel adjacent to an upper portion of the filtering target pixel, and a left reference pixel adjacent to the left of the filtering target pixel, the above reference pixel and the left reference pixel may be reconstructed reference pixels adjacent to the current block, respectively, and in the 3-tap filter, a filter coefficient allocated to a filter tap corresponding to the filtering target pixel may be $2/4$, a filter coefficient allocated to a filter tap corresponding to the above reference pixel may be $1/4$, and a filter coefficient allocated to a filter tap corresponding to the left reference pixel may be $1/4$.

In the case in which the filtering target pixel is a prediction pixel included in the left vertical prediction pixel line and the filtering target pixel is not a left upper prediction pixel positioned at the leftmost upper portion in the prediction block, in the generating of the final prediction block, the filtering on the filtering target pixel may be performed by applying a horizontal 2-tap filter based on the filtering target pixel and a left reference pixel adjacent to the left of the filtering target pixel, the left reference pixel may be a reconstructed reference pixel adjacent to the current block, and in the horizontal 2-tap filter, a filter coefficient allocated to a filter tap corresponding to the filtering target pixel may be ¾ and a filter coefficient allocated to a filter tap corresponding to the left reference pixel may be ¼.

In the case in which the filtering target pixel is a prediction pixel included in the upper horizontal prediction pixel line and the filtering target pixel is not a left upper prediction pixel positioned at the leftmost upper portion in the prediction block, in the generating of the final prediction block, the filtering on the filtering target pixel may be performed by applying a vertical 2-tap filter based on the filtering target pixel and an above reference pixel adjacent to an upper portion of the filtering target pixel, the above reference pixel may be a reconstructed reference pixel adjacent to the current block, and in the vertical 2-tap filter, a filter coefficient allocated to a filter tap corresponding to the filtering target pixel may be ¾ and a filter coefficient allocated to a filter tap corresponding to the above reference pixel may be ¼.

In another aspect, a picture decoding method is provided. The picture decoding method includes: generating a prediction block by performing prediction on a prediction target pixel in a current block based on an intra prediction mode of the current block; and generating a reconstructed block based on the prediction block and a reconstructed residual block corresponding to the current block, wherein in the generating of the prediction block, the prediction on the prediction target pixel is performed based on a first offset in the case in which the intra prediction mode of the current block is a vertical mode and the prediction target pixel is a pixel on a left vertical pixel line, and the prediction on the prediction target pixel is performed based on a second offset in the case in which the intra prediction mode of the current block is a horizontal mode and the prediction target pixel is a pixel on a upper horizontal pixel line, the left vertical pixel line being one vertical pixel line positioned at the leftmost portion in the current block and the upper horizontal pixel line being one horizontal pixel line positioned at the uppermost portion in the current block.

In the generating of the prediction block, a prediction value of the prediction target pixel may be derived by adding a value of the first offset to a pixel value of a first reference pixel present on the same vertical line as a vertical line on which the prediction target pixel is present among reconstructed reference pixels adjacent to an upper portion of the current block in the case in which the intra prediction mode of the current block is the vertical mode and the prediction target pixel is the pixel on the left vertical pixel line, wherein the value of the first offset is determined based on a difference value between a pixel value of a second reference pixel adjacent to the left of the prediction target pixel and a pixel value of a third reference pixel adjacent to the left of the first reference pixel.

In the generating of the prediction block, it may be determined that the pixel value of the first reference pixel is the prediction value of the prediction target pixel in the case in which the current block is a chroma component block.

In the generating of the prediction block, a prediction value of the prediction target pixel may be derived by adding a value of the second offset to a pixel value of a first reference pixel present on the same horizontal line as a horizontal line on which the prediction target pixel is present among reconstructed reference pixels adjacent to the left of the current block in the case in which the intra prediction mode of the current block is the horizontal mode and the prediction target pixel is the pixel on the upper horizontal pixel line, wherein the value of the second offset is determined based on a difference value between a pixel value of a second reference pixel adjacent to an upper portion of the prediction target pixel and a pixel value of a third reference pixel adjacent to an upper portion of the first reference pixel.

In the generating of the prediction block, it may be determined that the pixel value of the first reference pixel is the prediction value of the prediction target pixel in the case in which the current block is a chroma component block.

In still another aspect, an image decoding apparatus is provided. The picture decoding apparatus includes: a prediction block generating unit generating a prediction block by performing intra prediction on a current block; a filter unit generating a final prediction block by performing filtering on a filtering target pixel in the prediction block based on an intra prediction mode of the current block; and a reconstructed block generating unit generating a reconstructed block based on the final prediction block and a reconstructed residual block corresponding to the current block, wherein the filtering target pixel is a prediction pixel included in a filtering target region in the prediction block, and a filter type applied to the filtering target pixel and the filtering target region are determined based on the intra prediction mode of the current block In the case in which the intra prediction mode of the current block is a DC mode, the filtering target region may include a left vertical prediction pixel line that is one vertical pixel line positioned at the leftmost portion in the prediction block and an upper horizontal prediction pixel line that is one horizontal pixel line positioned at the uppermost portion in the prediction block.

In the case in which the filtering target pixel is a left upper prediction pixel positioned at the leftmost upper portion in the prediction block, the filter unit may perform the filtering on the filtering target pixel by applying a 3-tap filter based on the filtering target pixel, an above reference pixel adjacent to an upper portion of the filtering target pixel, and a left reference pixel adjacent to the left of the filtering target pixel, the above reference pixel and the left reference pixel may be reconstructed reference pixels adjacent to the current block, respectively, and in the 3-tap filter, a filter coefficient allocated to a filter tap corresponding to the filtering target pixel may be 2/4, a filter coefficient allocated to a filter tap corresponding to the above reference pixel may be ¼, and a filter coefficient allocated to a filter tap corresponding to the left reference pixel may be ¼.

In the case in which the filtering target pixel is a prediction pixel included in the left vertical prediction pixel line and the filtering target pixel is not a left upper prediction pixel positioned at the leftmost upper portion in the prediction block, the filter unit may perform the filtering on the filtering target pixel by applying a horizontal 2-tap filter based on the filtering target pixel and a left reference pixel adjacent to the left of the filtering target pixel, the left reference pixel may be a reconstructed reference pixel adjacent to the current block, and in the horizontal 2-tap filter, a filter coefficient allocated to a filter tap corresponding to the filtering target pixel may be ¾ and a filter coefficient allocated to a filter tap corresponding to the left reference pixel may be ¼.

In the case in which the filtering target pixel is a prediction pixel included in the upper horizontal prediction pixel line and the filtering target pixel is not a left upper prediction pixel positioned at the leftmost upper portion in the prediction block, the filter unit may perform the filtering on the filtering target pixel by applying a vertical 2-tap filter based on the filtering target pixel and an above reference pixel adjacent to an upper portion of the filtering target pixel, the above reference pixel may be a reconstructed reference pixel adjacent to the current block, and in the vertical 2-tap filter, a filter coefficient allocated to a filter tap corresponding to the filtering target pixel may be ¾ and a filter coefficient allocated to a filter tap corresponding to the above reference pixel may be ¼.

In still another aspect, a picture decoding apparatus is provided. The picture decoding apparatus includes: a prediction block generating unit generating a prediction block by performing prediction on a prediction target pixel in a current block based on an intra prediction mode of the current block; and a reconstructed block generating unit generating a reconstructed block based on the prediction block and a reconstructed residual block corresponding to the current block, wherein the prediction block generating unit performs the prediction on the prediction target pixel based on a first offset in the case in which the intra prediction mode of the current block is a vertical mode and the prediction target pixel is a pixel on a left vertical pixel line and performs the prediction on the prediction target pixel based on a second offset in the case in which the intra prediction mode of the current block is a horizontal mode and the prediction target pixel is a pixel on a upper horizontal pixel line, the left vertical pixel line being one vertical pixel line positioned at the leftmost portion in the current block and the upper horizontal pixel line being one horizontal pixel line positioned at the uppermost portion in the current block.

The prediction block generating unit may derive a prediction value of the prediction target pixel by adding a value of the first offset to a pixel value of a first reference pixel present on the same vertical line as a vertical line on which the prediction target pixel is present among reconstructed reference pixels adjacent to an upper portion of the current block in the case in which the intra prediction mode of the current block is the vertical mode and the prediction target pixel is the pixel on the left vertical pixel line, wherein the value of the first offset is determined based on a difference value between a pixel value of a second reference pixel adjacent to the left of the prediction target pixel and a pixel value of a third reference pixel adjacent to the left of the first reference pixel.

The prediction block generating unit may derive a prediction value of the prediction target pixel by adding a value of the second offset to a pixel value of a first reference pixel present on the same horizontal line as a horizontal line on which the prediction target pixel is present among reconstructed reference pixels adjacent to the left of the current block in the case in which the intra prediction mode of the current block is the horizontal mode and the prediction target pixel is the pixel on the upper horizontal pixel line, wherein the value of the second offset is determined based on a difference value between a pixel value of a second reference pixel adjacent to an upper portion of the prediction target pixel and a pixel value of a third reference pixel adjacent to an upper portion of the first reference pixel.

Advantageous Effects

With the image encoding method according to the exemplary embodiment of the present invention, image encoding/decoding efficiency may be improved.

With the image decoding method according to the exemplary embodiment of the present invention, image encoding/decoding efficiency may be improved.

With the prediction block generating method according to the exemplary embodiment of the present invention, image encoding/decoding efficiency may be improved.

With the intra prediction method according to the exemplary embodiment of the present invention, image encoding/decoding efficiency may be improved.

With the filtering performing method according to the exemplary embodiment of the present invention, image encoding/decoding efficiency may be improved.

DESCRIPTION OF DRAWINGS

FIG. 7 is a diagram schematically showing an example of a process of generating a residual block.

FIG. 9 is a diagram schematically showing an example of the process of generating the residual block.

FIG. 11 is a diagram schematically showing an example of a method of determining whether or not filtering is performed based on encoding parameters of neighboring blocks adjacent to a current block.

FIG. 15 is a diagram schematically showing an example of a method of determining a filtering performing region based on an encoding mode of the neighboring blocks adjacent to the current block.

FIG. 20 is a diagram describing an intra prediction mode and a filter type applied to Table 9.

MODE FOR INVENTION

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Further, in the present invention, "comprising" a specific configuration will be understood that additional configuration may also be included in the embodiments or the scope of the technical idea of the present invention.

Terms used in the specification, 'first', 'second', etc. can be used to describe various components, but the components are not to be construed as being limited to the terms. The terms are only used to differentiate one component from other components. For example, the 'first' component may be named the 'second' component and the 'second' component may also be similarly named the 'first' component, without departing from the scope of the present invention.

Furthermore, constitutional parts shown in the embodiments of the present invention are independently shown so as to represent different characteristic functions. Thus, it does not mean that each constitutional part is constituted in a constitutional unit of separated hardware or one software. In other words, each constitutional part includes each of enumerated constitutional parts for convenience of explanation. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Figure 1:
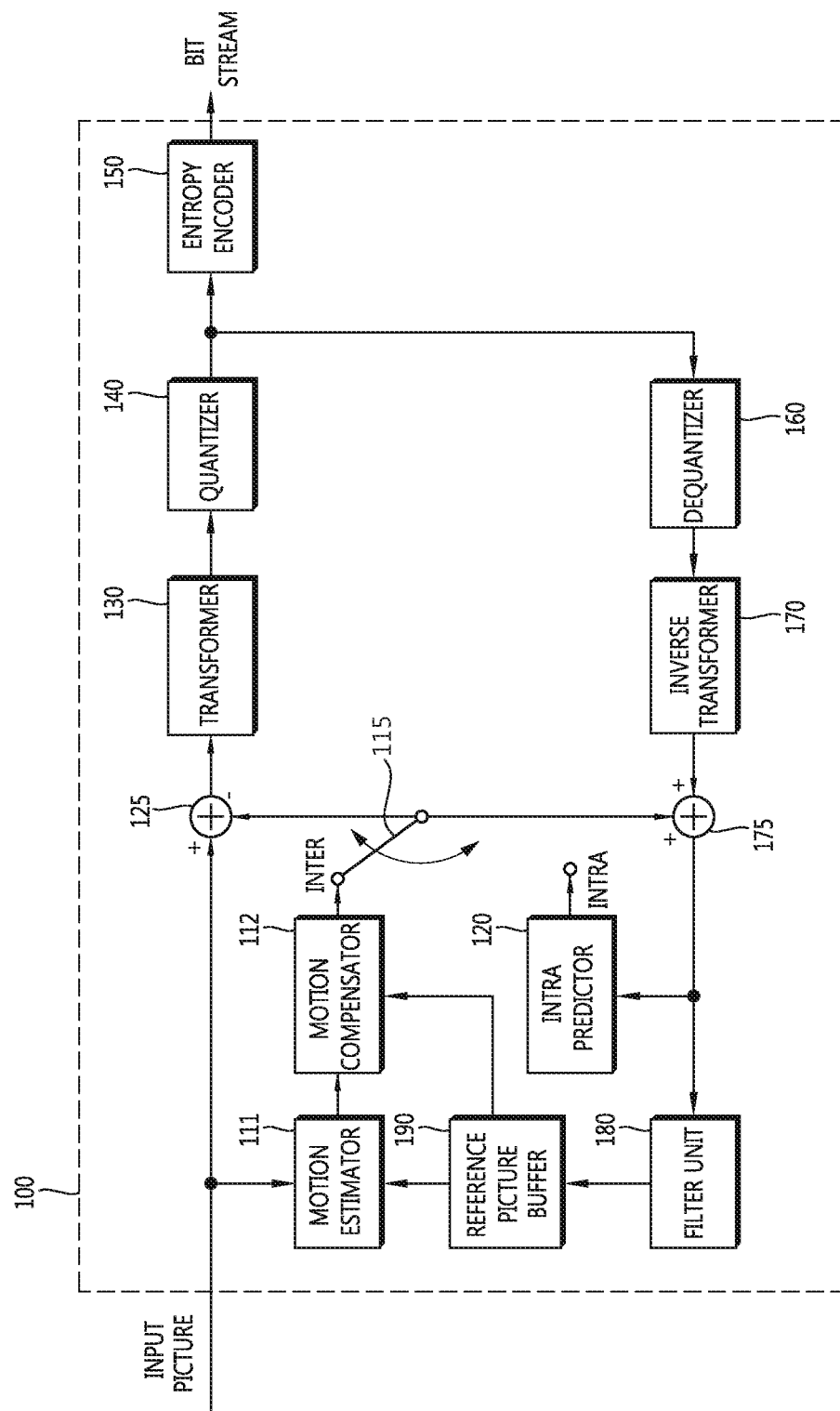
FIG. 1 is a block diagram showing a configuration of an image encoding apparatus according to an exemplary embodiment of the present invention.

FIG. 1 is a block diagram showing a configuration of an image encoding apparatus according to an exemplary embodiment of the present invention.

Referring to FIG. 1, the image encoding apparatus 100 includes a motion estimator 111, a motion compensator 112, an intra predictor 120, a switch 115, a subtracter 125, a transformer 130, a quantizer 140, an entropy encoder 150, a dequantizer 160, an inverse transformer 170, an adder 175, a filter unit 180, and a reference picture buffer 190.

The image encoding apparatus 100 may perform encoding on input pictures in an intra-mode or an inter-mode and output bit streams. The intra prediction means intra-picture prediction and the inter prediction means inter-picture prediction. In the case of the intra mode, the switch 115 may be switched to intra, and in the case of the inter mode, the switch 115 may be switched to inter. The image encoding apparatus 100 may generate a prediction block for an input block of the input pictures and then encode a residual between the input block and the prediction block.

In the case of the intra mode, the intra predictor 120 may perform spatial prediction using pixel values of blocks encoded in advance around a current block to generate the prediction block.

In the case of the inter mode, the motion estimator 111 may search a region optimally matched with the input block in a reference picture stored in the reference picture buffer 190 during a motion prediction process to obtain a motion vector. The motion compensator 112 may perform motion compensation using the motion vector to generate the prediction block. Here, the motion vector may be a two dimensional vector used for inter prediction and represent an offset between a current encoding/decoding target picture and the reference picture.

The subtracter 125 may generate a residual block by the residual between the input block and the generated prediction block. The transformer 130 may perform transform on the residual block to output transform coefficients. Further, the quantizer 140 may quantize the input transform coefficient according to quantization parameters to output a quantized coefficient.

The entropy encoder 150 may perform entropy encoding based on values calculated in the quantizer 140 or encoding parameter values, or the like, calculated during the encoding process to output bit streams.

When the entropy encoding is applied, symbols are represented by allocating a small number of bits to symbols having high generation probability and allocating a large number of bits to symbols having low generation probability, thereby making it possible to reduce a size of bit streams for the encoding target symbols. Therefore, the compression performance of the image encoding may be improved through the entropy encoding. The entropy encoder 150 may use an encoding method such as exponential golomb, context-adaptive variable length coding (CAVLC), context-adaptive binary arithmetic coding (CABAC), or the like, for the entropy encoding.

Since the image encoding apparatus according to the exemplary embodiment of FIG. 1 performs inter prediction encoding, that is, inter-picture prediction encoding, a current encoded picture needs to be decoded and stored in order to be used as a reference picture. Therefore, the quantized coefficient is dequantized in the dequantizer 160 and inversely transformed in the inverse transformer 170. The dequantized and inversely transformed coefficient is added to the prediction block through the adder 175, such that a reconstructed block is generated.

The reconstructed block passes through the filter unit 180 and the filter unit 180 may apply at least one of a deblocking filter, a sample adaptive offset (SAO), and an adaptive loop filter (ALF) to a reconstructed block or a reconstructed picture. The filter unit 180 may also be called an adaptive in-loop filter. The deblocking filter may remove block distortion generated at an inter-block boundary. The SAO may add an appropriate offset value to a pixel value in order to compensate an encoding error. The ALF may perform the filtering based on a comparison value between the reconstructed picture and the original picture. The reconstructed block passing through the filter unit 180 may be stored in the reference picture buffer 190.

Figure 2:
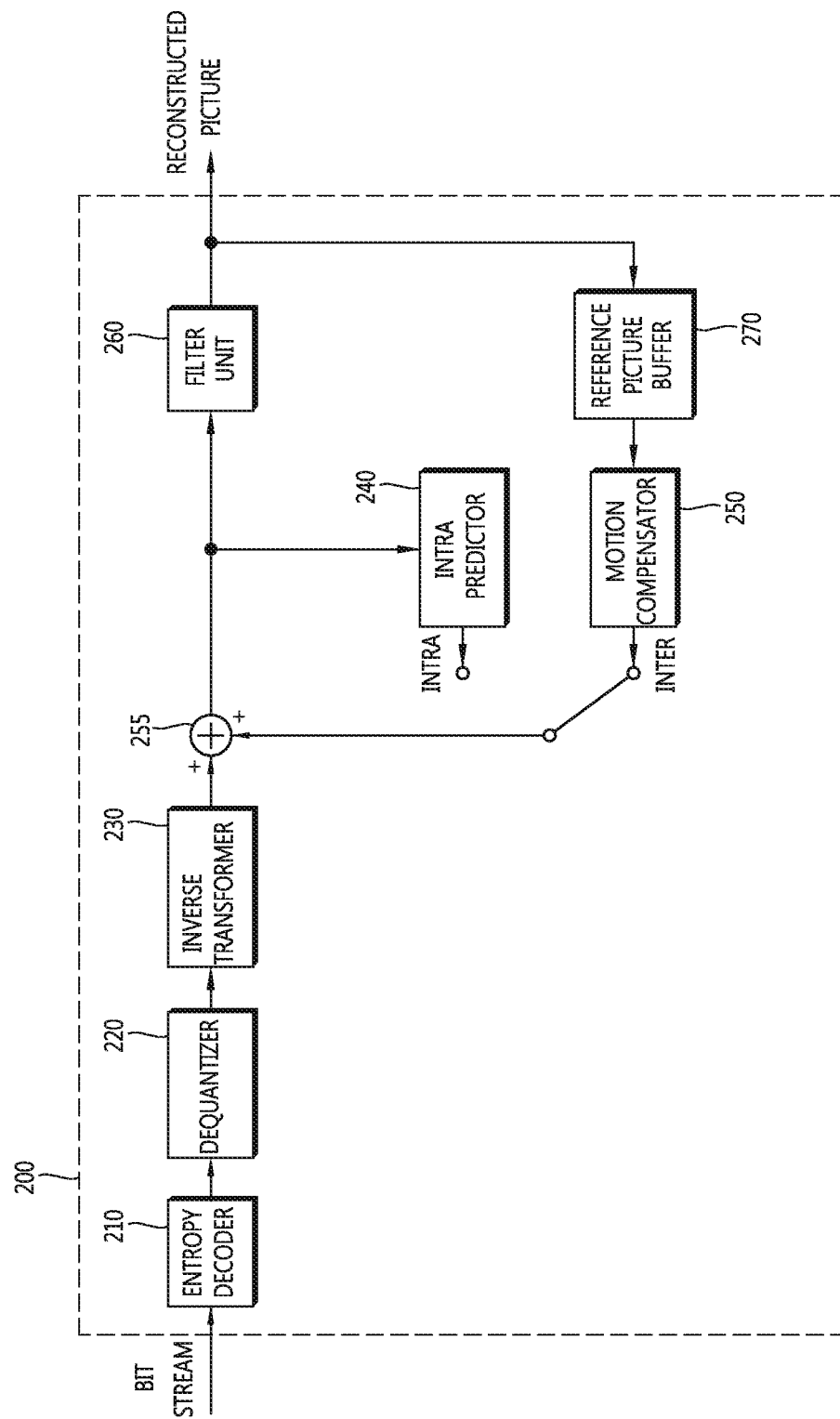
FIG. 2 is a block diagram showing a configuration of an image decoding apparatus according to an exemplary embodiment of the present invention.

FIG. 2 is a block diagram showing a configuration of an image decoding apparatus according to an exemplary embodiment of the present invention.

Referring to FIG. 2, an image decoding apparatus 200 includes an entropy decoder 210, a dequantizer 220, an inverse transformer 230, an intra predictor 240, a motion compensator 250, an adder 255, a filter unit 260, and a reference picture buffer 270.

The image decoding apparatus 200 may receive the bit streams output from the encoder to perform the decoding in the intra mode or the inter mode and output the reconstructed picture, that is, the reconstructed picture. In the case of the intra mode, the switch may be switched to the intra, and in the case of the inter mode, the switch may be switched to the inter. The image decoding apparatus 200 may obtain a residual block from the received bit streams, generate the prediction block, and then add the residual block to the prediction block to generate the reconstructed block, that is, the reconstructed block.

The entropy decoder 210 may entropy-decode the input bit streams according to the probability distribution to generate symbols including a quantized coefficient type of symbols. The entropy decoding method is similar to the above-mentioned entropy encoding method.

When the entropy decoding method is applied, symbols are represented by allocating a small number of bits to symbols having high generation probability and allocating a large number of bits to symbols having low generation probability, thereby making it possible to reduce a size of bit streams for each symbol. Therefore, the image decoding compression performance may be improved through the entropy decoding method.

The quantized coefficients may be dequantized in the dequantizer 220 and be inversely transformed in the inverse transformer 230. The quantized coefficients are dequantized/inversely transformed, such that the residual block may be generated.

In the case of the intra mode, the intra predictor 240 may perform spatial prediction using pixel values of blocks encoded in advance around a current block to generate the prediction block. In the case of the inter mode, the motion compensator 250 may perform the motion compensation by using the motion vector and the reference picture stored in the reference picture buffer 270 to generate the prediction block.

The residual block and the prediction block may be added to each other through the adder 255 and the added block may pass through the filter unit 260. The filter unit 260 may apply at least one of the deblocking filter, the SAO, and the ALF to the reconstructed block or the reconstructed picture. The filter unit 260 may output the reconstructed pictures, that is, the reconstructed picture. The reconstructed picture may be stored in the reference picture buffer 270 to thereby be used for the inter prediction.

Hereinafter, a unit means a unit of picture encoding and decoding. At the time of the picture encoding and decoding, the encoding or decoding unit means the divided unit when the picture is divided and then encoded or decoded. Therefore, the unit may be called a coding unit (CU), a prediction unit (PU), a transform unit (TU), or the like. Further, in examples to be described below, the unit may also be called a block. A single unit may be subdivided into subunits having a smaller size.

Figure 3:
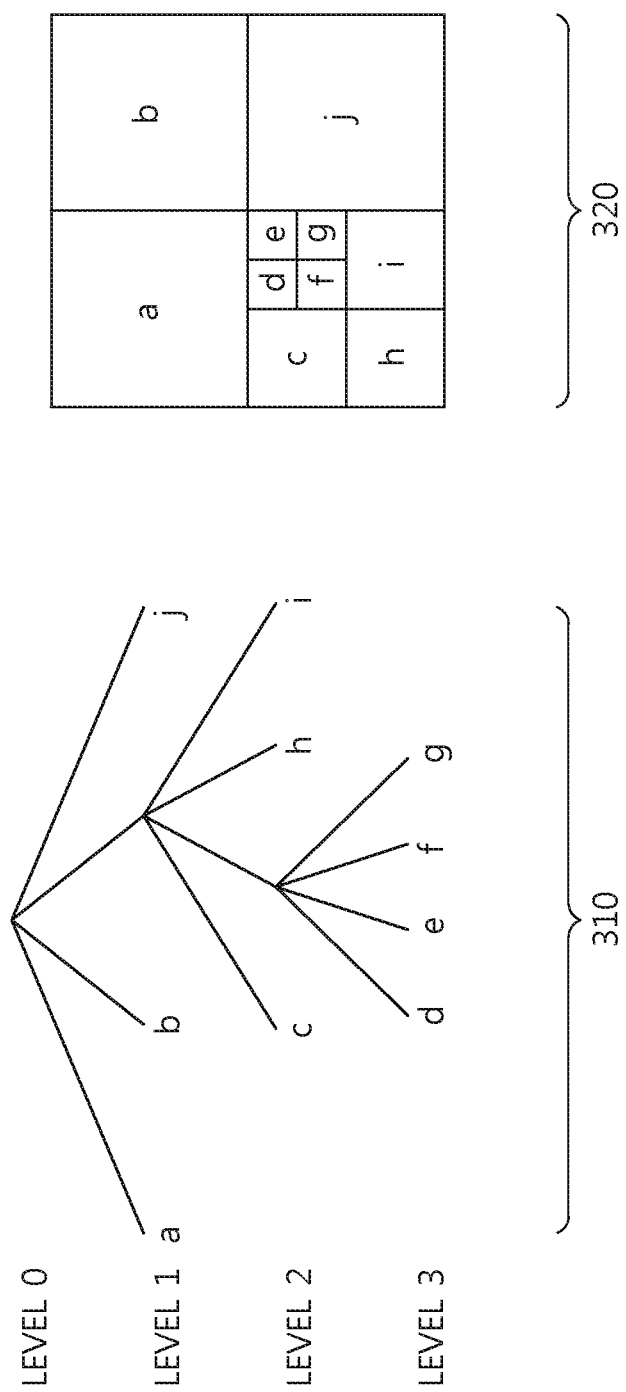
FIG. 3 is a conceptual diagram schematically showing an example in which a single unit is divided into a plurality of subunits.

FIG. 3 is a conceptual diagram schematically showing an example in which a single unit is divided into a plurality of subunits.

A single unit may be hierarchically divided using depth information based on a tree structure. The respective divided sub-units may have depth information. Since the depth information indicates the number and/or the degree of unit divisions, it may include information on a size of the sub-unit.

Referring to 310 of FIG. 3, an uppermost node may be called a root node and have a smallest depth value. Here, the uppermost node may have a depth of level 0 and indicate an initial unit that is not divided.

A lower node having a depth of level 1 may indicate a unit divided once from the initial unit, and a lower node having a depth of level 2 may indicate a unit divided twice from the initial unit. For example, in 320 of FIG. 3, a unit a corresponding to a node a may be a unit divided once from the initial unit and have a depth of level 1.

A leaf node of level 3 may indicate a unit divided three times from the initial unit. For example, in 320 of FIG. 3, a unit d corresponding to a node d may be a unit divided three times from the initial unit and have a depth of level 3. The leaf node of level 3, which is a lowermost node, may have a deepest depth.

Hereinafter, in examples to be described below, an encoding/decoding target block may also be called a current block in some cases. Further, in the case in which the intra prediction is performed on the encoding/decoding target block, the encoding/decoding target block may also be called a prediction target block.

Meanwhile, a video signal may generally include three color signals representing three primary color components of light. The three color signals representing the three primary color components of light may be a red (R) signal, a green (G) signal, and a blue (B) signal. The R, G, and B signals may be converted into one luma signal and two chroma signals in order to reduce a frequency band used for image processing. Here, one video signal may include one luma signal and two chroma signals. Here, the luma signal, which is a component indicating brightness of a screen, may correspond to Y, and the chroma signal, which is a component indicating color of the screen, may correspond to U and V or Cb and Cr. Since human visual system (HVS) is sensitive to the luma signal and insensitive to the chroma signal, in the case in which the R, G, and B signals are converted into the luma signal and the chroma signal using these characteristics, a frequency band used to process an image may be reduced. In examples to be described below, a block having the luma component will be called a luma block, and a block having the chroma component will be a chroma block.

Figure 4A:
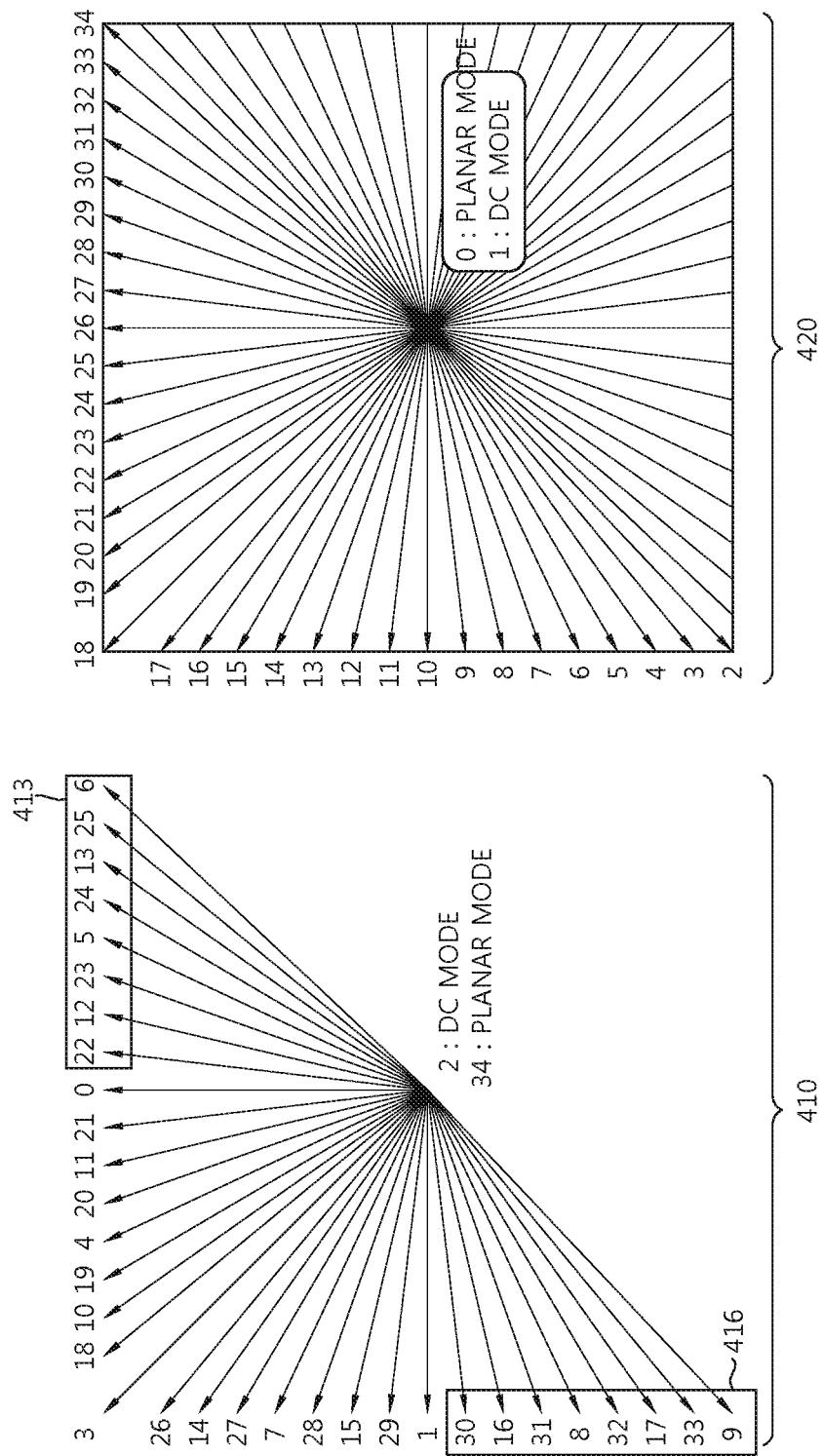
FIGS. 4A and 4B are diagrams describing an example of an intra prediction process.
Figure 4B:
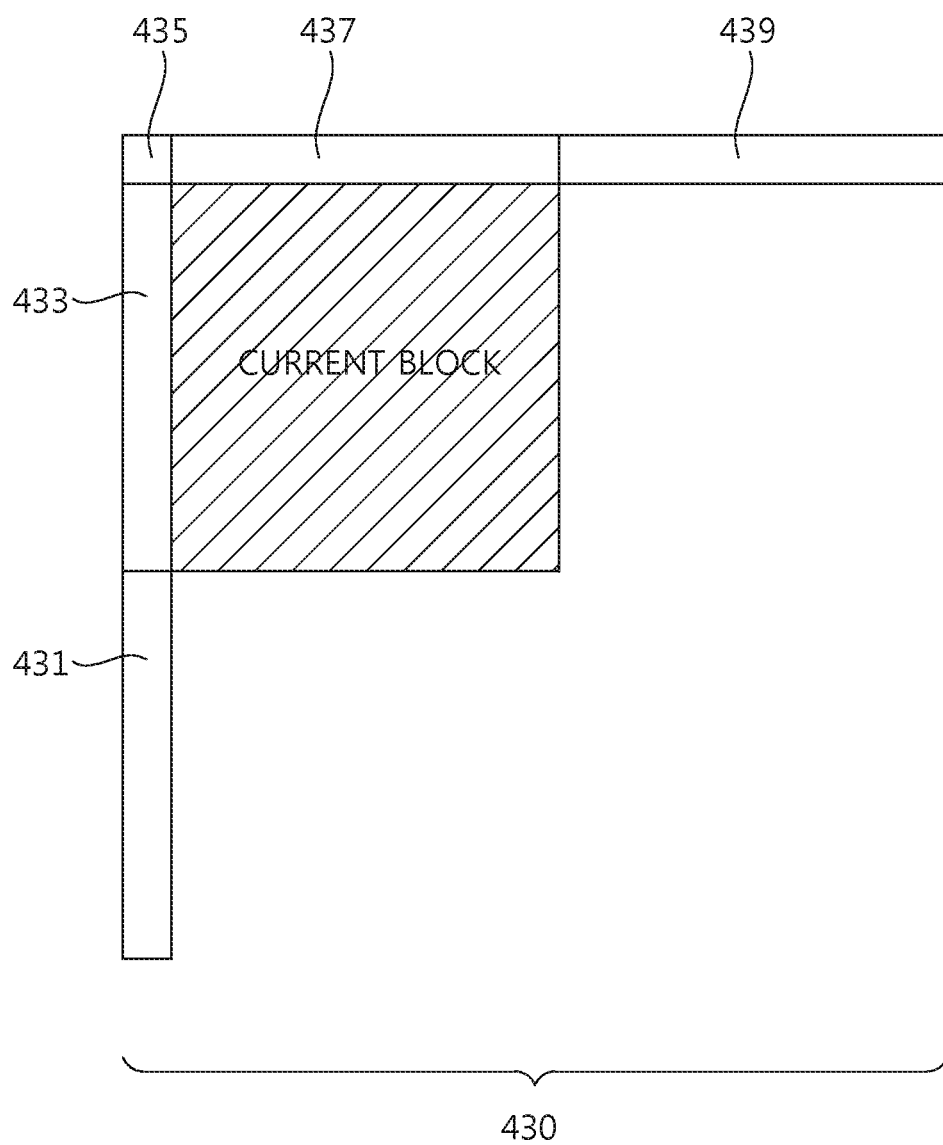

FIGS. 4A and 4B are diagrams describing an example of an intra prediction process. 410 and 420 of FIG. 4A show examples of prediction directions of an intra prediction mode and mode values allocated to each of the prediction directions. In addition, 430 of FIG. 4B shows positions of reference pixels used for intra prediction of an encoding/decoding target block. A pixel may have the same meaning as that of a sample. In examples to be described below, the pixel may also be called the sample in some cases.

As described in the examples of FIGS. 1 and 2, the encoder and the decoder may perform the intra prediction based on the pixel information in the current picture to generate the prediction block. That is, at the time of performing the intra prediction, the encoder and the decoder may perform directional and/or non-direction prediction based on at least one reconstructed reference pixel. Here, the prediction block may mean a block generated as a result of performing the intra prediction. The prediction block may correspond to at least one of a coding unit (CU), a prediction unit (PU), and a transform unit (TU). In addition, the prediction block may be a square block having a size of 2×2, 4×4, 8×8, 16×16, 32×32, 64×64, or the like, or be a rectangular block having a size of 2×8, 4×8, 2×16, 4×16, 8×16, or the like.

Meanwhile, the intra prediction may be performed according an intra prediction mode of the current block. The number of intra prediction modes that the current block may have may be a predetermined fixed value or a value changed according to a size of the prediction block. For example, the number of intra prediction modes that the current block may have may be 3, 5, 9, 17, 34, 35, 36, or the like.

410 of FIG. 4A show an example of the prediction directions of the intra prediction mode and the mode values allocated to each of the prediction directions. In 410 of FIG. 4A, numbers allocated to each of the intra prediction modes may indicate the mode values.

Referring to 410 of FIG. 4A, for example, in the case of a vertical mode having the mode value of 0, prediction may be performed in a vertical direction based on pixel values of reference pixels, and in the case of a horizontal mode having the mode value of 1, prediction may be performed in a horizontal direction based on pixel values of reference pixels. Also in the case of a directional mode other than the above-mentioned modes, the encoder and the decoder may perform the intra prediction using reference pixels according to corresponding angles.

In 410 of FIG. 4A, an intra prediction mode having a mode value of 2 may be called a DC mode, and an intra prediction mode having a mode value of 34 may be called a planar mode. The DC mode and the planar mode may correspond to a non-directional mode. For example, in the case of the DC mode, the prediction block may be generated by an average of pixel values of a plurality of reference pixels. An example of a method of generating each prediction pixel of the prediction block in the planar mode will be described below with reference to FIG. 5.

The number of intra prediction modes and/or the mode values allocated to each of the intra prediction modes are not limited to the above-mentioned example, but may also be changed according to an implementation and/or as needed. For example, the prediction directions of the intra prediction modes and the mode values allocated to each of the prediction modes may be defined to be different from 410 of FIG. 4A, as shown in 420 of FIG. 4A. Hereinafter, in examples to be described below, unless particularly described, it is assumed that the intra prediction is performed in the intra prediction mode as shown in 410 of FIG. 4A for convenience of explanation.

In addition, hereinafter, an intra prediction mode positioned at the right of the vertical mode is called a vertical right mode, and an intra prediction mode positioned at a lower portion of the horizontal mode is called a horizontal below mode. For example, in 410 of FIG. 4A, an intra prediction mode having mode values of 5, 6, 12, 13, 22, 23, 24, and 25 may correspond to the vertical right mode 413, and an intra prediction mode having mode values of 8, 9, 16, 17, 30, 31, 32, and 33 may correspond to the horizontal below mode 416.

Meanwhile, referring to 430 of FIG. 4B, as reconstructed reference pixels used for intra prediction of the current block, for example, there may be below-left reference pixels 431, left reference pixels 433, above-left corner reference pixels 435, above reference pixels 437, above-right reference pixels 439, and the like. Here, the left reference pixels 433 may mean reconstructed reference pixels adjacent to the left of an outer portion of the current block, the above reference pixels 437 may mean reconstructed reference pixels adjacent to an upper portion of the outer portion of the current block, and the above-left corner reference pixels 435 may mean reconstructed reference pixels adjacent to a left upper corner of the outer portion of the current block. In addition, the below-left reference pixels 431 may mean reference pixels position at a lower portion of a left pixel line configured of the left reference pixels 433 among pixels positioned on the same line as the left pixel line, and the above-right reference pixels 439 may mean reference pixels position at the right of an upper pixel line configured of the above reference pixels 437 among pixels positioned on the same line as the upper pixel line. In the present specification, the names of the reference pixels described above may be similarly applied to other examples to be described below.

The reference pixels used for the intra prediction of the current block may be changed according to the intra prediction mode of the current block. For example, in the case in which the intra prediction mode of the current block is the vertical mode (the intra prediction mode having the mode value of 0 in 410 of FIG. 4A), the above reference pixels 437 may be used for the intra prediction, and in the case in which the intra prediction mode of the current block is the horizontal mode (the intra prediction mode having the mode value of 1 in 410 of FIG. 4A), the left reference pixel 433 may be used for the intra prediction. Further, in the case in which an intra prediction mode having a mode value of 13 is used, the above-right reference pixel 439 may be used for the intra prediction, and in the case in which an intra prediction mode having a mode value of 7 is used, the below-left reference pixel 431 may be used for the intra prediction.

In the case in which positions of the reference pixels determined based on prediction directions and prediction target pixels of the intra prediction mode are integer positions, the encoder and the decoder may determine that reference pixel values of the corresponding positions are prediction pixel values of the prediction target pixels. In the case in which the positions of the reference pixels determined based on the prediction directions and the prediction target pixels of the intra prediction mode are not the integer positions, the encoder and the decoder may generate interpolated reference pixels based on the reference pixels of the integer positions and determine that pixel values of the interpolated reference pixels are the prediction pixel values.

According to the example described above, the encoder and the decoder may perform the intra prediction on the encoding/decoding target block based on the reconstructed or generated reference pixels. However, as described above, the reference pixels used for the intra prediction may be changed according to the intra prediction mode of the current block and discontinuity between the generated prediction block and the neighboring blocks may be generated. For example, in the case of the directional intra prediction, the farther the distance from the reference pixel, the larger the prediction errors of the prediction pixels in the prediction block. In the case, the discontinuity may be generated due to the prediction error and there may a limitation in improving encoding efficiency.

Therefore, in order to solve the above-mentioned problem, an encoding/decoding method of performing filtering on the prediction block generated by the intra prediction may be provided. For example, filtering may be adaptively applied to a region having a large prediction error within the prediction block generated based on the reference pixels. In this case, the prediction error is reduced and the discontinuity between the blocks is minimized, thereby making it possible to improve the encoding/decoding efficiency.

Figure 5:
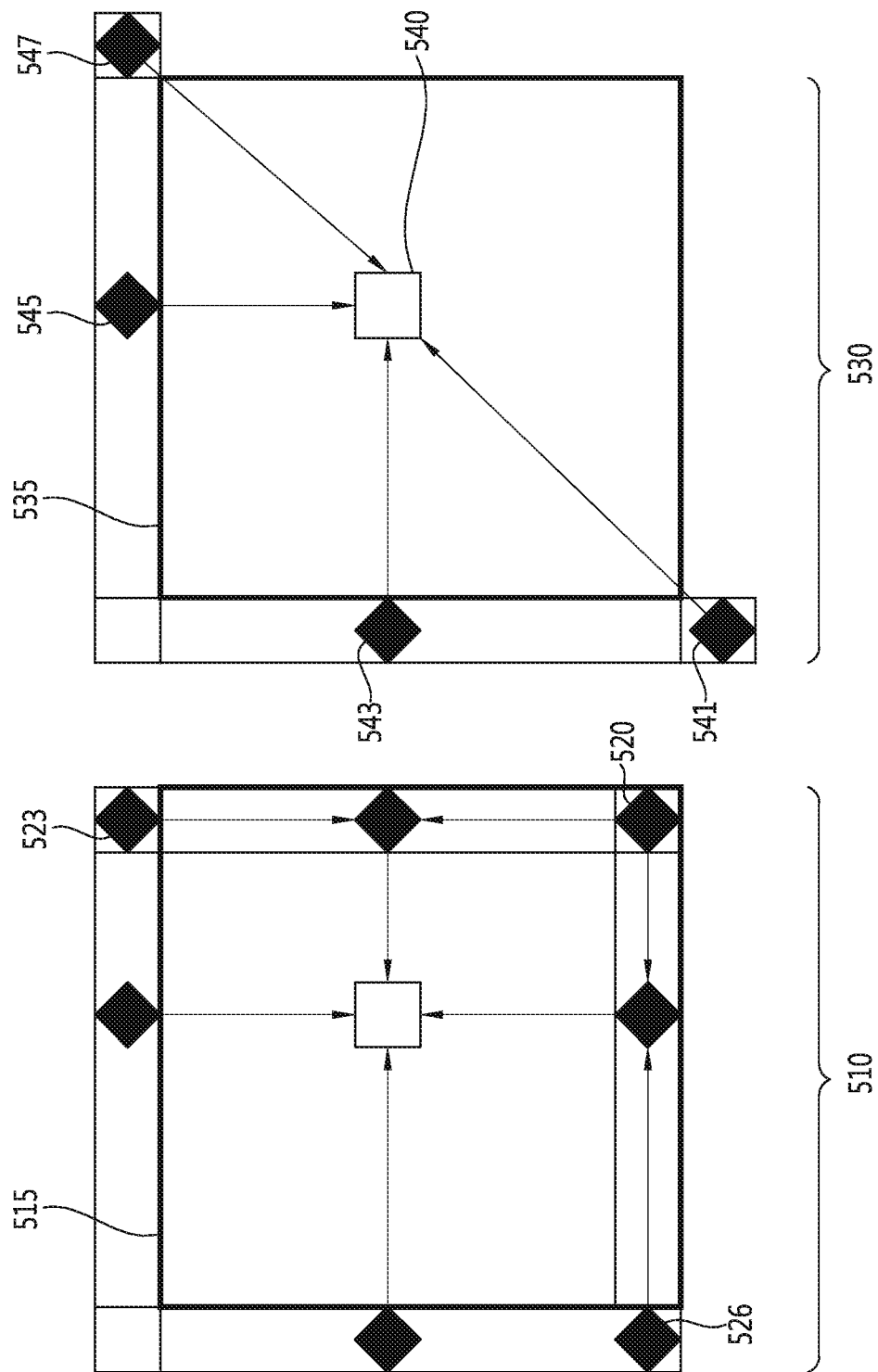
FIG. 5 is a diagram schematically showing an example of an intra prediction method in a planar mode.

FIG. 5 is a diagram schematically showing an example of an intra prediction method in a planar mode.

510 of FIG. 5 shows an example of an intra prediction method in a planar mode, and 530 of FIG. 5 shows another example of an intra prediction method in a planar mode. 515 and 535 of FIG. 5 show an encoding/decoding target block (hereinafter, the encoding/decoding target block has the same meaning as the current block), and each of the sizes of blocks 515 and 535 is nS×nS.

In FIG. 5, positions of pixels in the current block may be represented by a predetermined coordinate. For convenience, a coordinate of the left uppermost portion in the current block is (0,0). In this case, on a coordinate axis, a y value may increase toward a downward direction, and an x value may increase toward a right direction. In examples to be described below, coordinates of pixels may be represented by the same coordinate axis as the coordinate axis used in FIG. 5.

As an example, referring to 510 of FIG. 5, the encoder and the decoder may derive a pixel value of a prediction pixel for a pixel (nS-1, nS-1) positioned at the right lowermost portion in the current block, that is, a right lower prediction pixel 520. The encoder and the decoder may derive pixel values of prediction pixels for pixels on a vertical line positioned at the rightmost portion in the current block, that is, right vertical line prediction pixels, based on a reference pixel 523 positioned at the rightmost portion (nS-1, -1) among the above reference pixels and the right lower prediction pixel 520, and derive pixel values of prediction pixels for pixels on a horizontal line positioned at the lowermost portion in the current block, that is, lower horizontal line prediction pixels, based on a reference pixel 526 positioned at the lowermost portion (-1, nS-1) among the left reference pixels and the right lower prediction pixel 520.

Here, prediction values for remaining pixels except for the pixels on the right vertical line and the pixels on the lower horizontal line among the pixels in the current block may be obtained by applying weights based on the above reference pixel, the left reference pixel, the right vertical line prediction pixel, and the lower horizontal line prediction pixel.

As another example, the encoder and the decoder may also derive a prediction value for a prediction target pixel 540 in the current block 535 by a method shown in 530 of FIG. 5. In 530 of FIG. 5, a coordinate of the prediction target pixel 540 is (x,y). Referring to 530 of FIG. 5, the encoder and the decoder may derive the prediction value of the prediction target pixel 540 by performing the averaging and/or the weight averaging based on a reference pixel (-1, nS) 541 positioned at the uppermost portion among the below-left reference pixels, a reference pixel (-1, y) 543 positioned on the same horizontal line as the prediction target pixel 540 among the left reference pixels, a reference pixel (x, -1) 545 positioned on the same vertical line as the prediction target pixel 540 among the above reference pixels, and a reference pixel (nS, -1) positioned at the leftmost portion among the above-right reference pixels.

Figure 6:
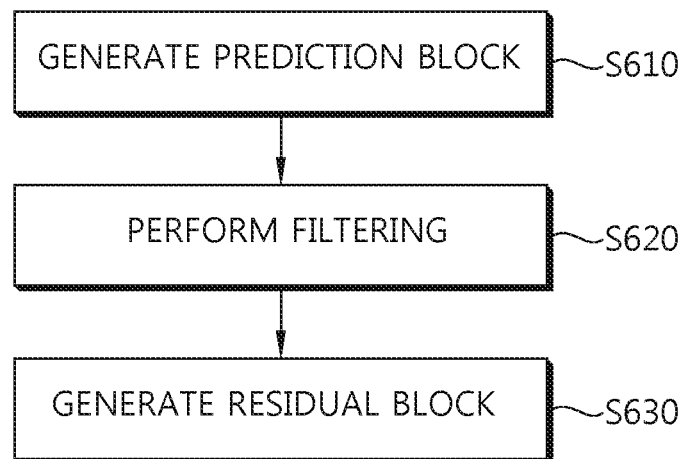
FIG. 6 is a flow chart schematically showing an example of an image encoding method according to the exemplary embodiment of the present invention.

FIG. 6 is a flow chart schematically showing an example of an image encoding method according to the exemplary embodiment of the present invention.

Referring to FIG. 6, the encoder may perform the intra prediction on the encoding target block to generate the prediction block (S610). Since the specific example of the prediction block generating method has been described with reference to FIGS. 4A and 4B, a description thereof will be omitted.

Again referring to FIG. 6, the encoder may perform the filtering on the prediction block based on the encoding target block and/or the encoding parameters of the neighboring blocks adjacent to the encoding target block (S620). Here, the encoding parameter may include information that may be inferred during an encoding or decoding process as well as information that is encoded in the encoder and transmitted to the decoder, such as a syntax element, and means information required when the image is encoded or decoded. The encoding parameter may include, for example, information on an intra/inter prediction mode, a motion vector, a reference picture index, a coded block pattern (CBP), whether or not there is a residual signal, a quantization parameter, a block size, block partition, and the like.

As an example, the encoder may perform the filtering on the prediction block based on information on an intra prediction mode of the encoding target block, whether the encoding target block is the luma block or the chroma block, a size (and/or a depth) of the encoding target block, the encoding parameters (for example, encoding modes of the neighboring blocks) of the neighboring blocks adjacent to the encoding target block, whether or not there are the neighboring blocks (and/or whether or not the neighboring blocks are available blocks), and the like.

Although the case in which the encoder always performs the filtering is described in the filtering performing process described above, the encoder may also not perform the filtering on the prediction block. For example, the encoder may determine whether or not the filtering is performed based on the encoding target block and/or the encoding parameters of the neighboring blocks adjacent to the encoding target block and may not perform the filtering on the prediction block in the case in which it is determined that the filtering is not performed.

Meanwhile, the filtering process described above may be an independent process separate from the prediction block generating process. However, the filtering process may also be combined with the prediction block generating process to thereby be performed as a single process. That is, the encoder may also generate the prediction block by applying a process corresponding to the filtering performing process based on the encoding target block and/or the encoding parameters of the neighboring blocks in the prediction block generating process. A specific example of the filtering performing method will be described below.

Again referring to FIG. 6, the encoder may generate a residual block based on an original block corresponding to the position of the encoding target block and the prediction block (S630). Here, the prediction block may be the prediction block on which the filtering is performed or the prediction block on which the filtering is not performed.

FIG. 7 is a diagram schematically showing an example of a process of generating a residual block. 710 of FIG. 7 shows an example of a process of generating a residual block based on the original block and the prediction block on which the filtering is performed. In 710 of FIG. 7, a block 713 indicates the original block, a block 716 indicates the prediction block on which the filtering is performed, and a block 719 indicates the residual block. Referring to 710 of FIG. 7, the encoder and the decoder may generate the residual block by subtracting the prediction block on which the filtering is performed from the original block. 720 of FIG. 7 shows an example of a process of generating a residual block based on the original block and the prediction block on which the filtering is not performed. In 720 of FIG. 7, a block 723 indicates the original block, a block 726 indicates the prediction block on which the filtering is not performed, and a block 729 indicates the residual block. Referring to 720 of FIG. 7, the encoder and the decoder may generate the residual block by subtracting the prediction block on which the filtering is not performed from the original block.

The generated residual block may be subjected to processes such as a transform process, a quantization process, an entropy encoding process, and the like, and be then transmitted to the decoder.

Figure 8:
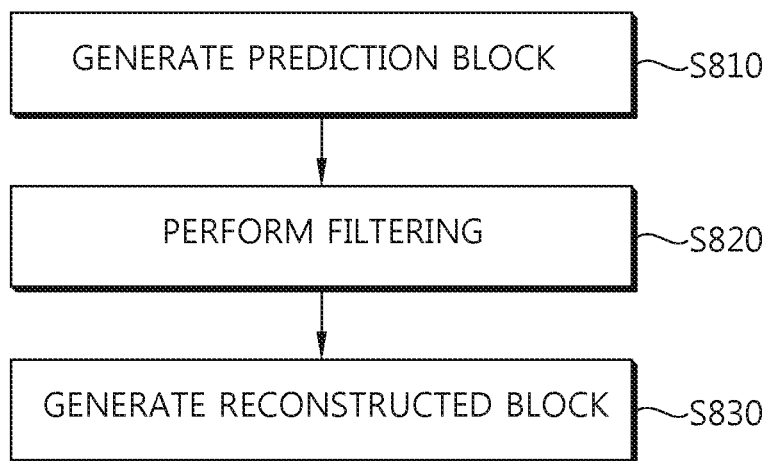
FIG. 8 is a flow chart schematically showing an example of an image decoding method according to the exemplary embodiment of the present invention.

FIG. 8 is a flow chart schematically showing an example of an image decoding method according to the exemplary embodiment of the present invention.

Referring to FIG. 8, the decoder may perform the intra prediction on the decoding target block to generate the prediction block (S810). Since the specific example of the prediction block generating method has been described with reference to FIGS. 4A and 4B, a description thereof will be omitted.

Again referring to FIG. 8, the decoder may perform the filtering on the prediction block based on the decoding target block and/or encoding parameters of the neighboring blocks adjacent to the decoding target block (S820). Here, the encoding parameter may include information that may be inferred during an encoding or decoding process as well as information that is encoded in the encoder and transmitted to the decoder, such as a syntax element, and means information required when the image is encoded or decoded. The encoding parameter may include, for example, information on an intra/inter prediction mode, a motion vector, a reference picture index, a coded block pattern (CBP), whether or not there is a residual signal, a quantization parameter, a block size, block partition, and the like.

As an example, the decoder may perform the filtering on the prediction block based on information on an intra prediction mode of the decoding target block, whether the decoding target block is the luma block or the chroma block, a size (and/or a depth) of the decoding target block, the encoding parameters (for example, encoding modes of the neighboring blocks) of the neighboring blocks adjacent to the decoding target block, whether or not there are the neighboring blocks (and/or whether or not the neighboring blocks are available blocks), and the like.

Although the case in which the decoder always performs the filtering is described in the filtering performing process described above, the decoder may also not perform the filtering on the prediction block. For example, the decoder may determine whether or not the filtering is performed based on the decoding target block and/or the encoding parameters of the neighboring blocks adjacent to the decoding target block and may not perform the filtering on the prediction block in the case in which it is determined that the filtering is not performed.

Meanwhile, the filtering process described above may be an independent process separate from the prediction block generating process. However, the filtering process may also be combined with the prediction block generating process to thereby be performed as a single process. That is, the decoder may also generate the prediction block by applying a process corresponding to the filtering performing process based on the decoding target block and/or the encoding parameters of the neighboring blocks in the prediction block generating process. In this case, the decoder may not perform a separate filtering process on the prediction block.

The filtering performing method in the decoder may be the same as the filtering performing method in the encoder. A specific example of the filtering performing method will be described below.

Again referring to FIG. 8, the decoder may generate a reconstructed block based on a reconstructed residual block corresponding to the position of the decoding target block and the prediction block (S830). Here, the prediction block may be the prediction block on which the filtering is performed or the prediction block on which the filtering is not performed.

FIG. 9 is a diagram schematically showing an example of the process of generating the residual block. 910 of FIG. 9 shows an example of a process of generating a reconstructed block based on the reconstructed residual block and the prediction block on which the filtering is performed. In 910 of FIG. 9, a block 913 indicates the reconstructed residual block, a block 916 indicates the prediction block on which the filtering is performed, and a block 919 indicates the reconstructed block. Referring to 910 of FIG. 9, the encoder and the decoder may generate the reconstructed block by adding the reconstructed residual block and the prediction block on which the filtering is performed to each other. 920 of FIG. 9 shows an example of a process of generating a reconstructed block based on the reconstructed residual block and the prediction block on which the filtering is not performed. In 920 of FIG. 9, a block 923 indicates the reconstructed residual block, a block 926 indicates the prediction block on which the filtering is not performed, and a block 929 indicates the reconstructed block. Referring to 920 of FIG. 9, the encoder and the decoder may generate the residual block by adding the reconstructed residual block and the prediction block on which the filtering is not performed to each other.

Figure 10:
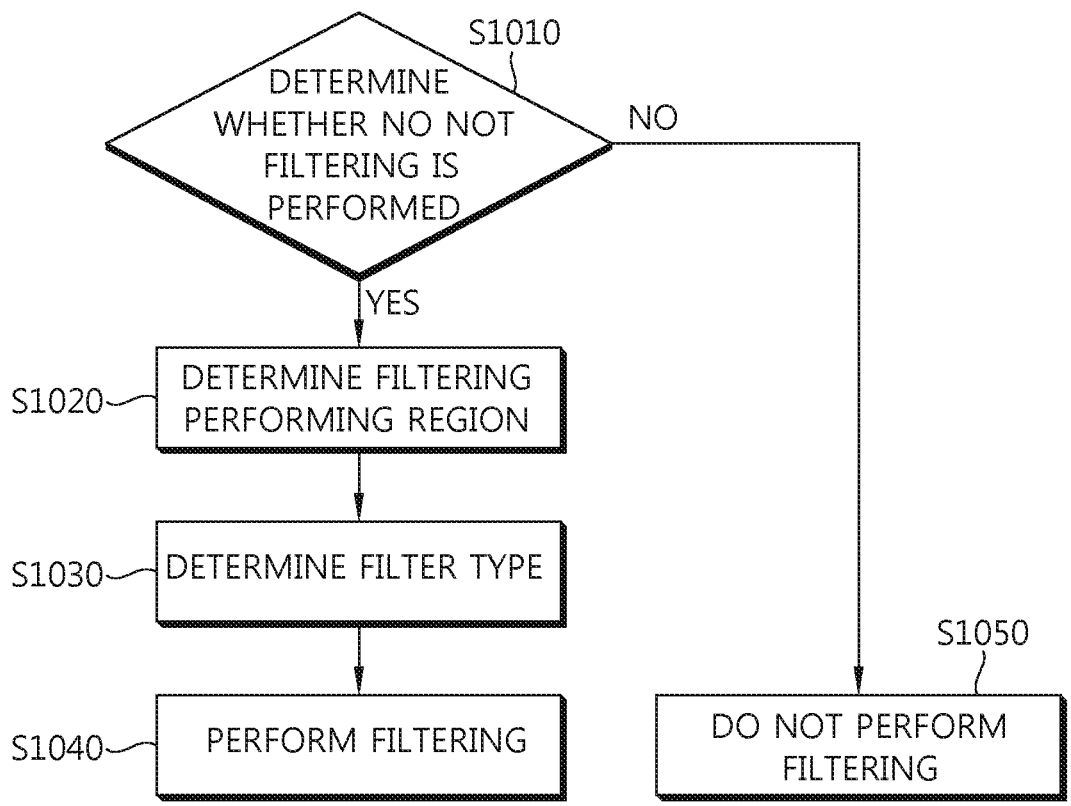
FIG. 10 is a flow chart schematically showing an example of a filtering performing method according to the exemplary embodiment of the present invention.

FIG. 10 is a flow chart schematically showing an example of a filtering performing method according to the exemplary embodiment of the present invention.

Referring to FIG. 10, the encoder and the decoder may determine whether or not the filtering is performed on the prediction block (and/or the prediction pixel) (S1010).

As described above, the encoder and the decoder may perform the intra prediction on the encoding/decoding target block based on the previously reconstructed reference pixels. Here, a reference pixel used for the intra prediction and/or a prediction pixel value in a prediction block generated in the intra prediction may be changed according to the intra prediction mode of the current block. Therefore, in this case, the encoder and the decoder performs the filtering on prediction pixels having a small correlation with the reference pixel used for the intra prediction, thereby making it possible to reduce a prediction error. On the other hand, it may be more efficient not to perform the filtering on pixels having a large correlation with the reference pixel used for the intra prediction.

Therefore, the encoder and the decoder may determine whether or not the filtering is performed on the prediction block (and/or the prediction pixel) based on at least one of information on the intra prediction mode of the encoding/decoding target block, whether the encoding/decoding target block is the luma block or the chroma block, the size (and/or the depth) of the encoding/decoding target block, the encoding parameters (for example, the sizes of the neighboring blocks, the encoding modes of the neighboring blocks, and the like) of the neighboring blocks adjacent to the encoding/decoding target block, whether or not there are the neighboring blocks (and/or whether or not the neighboring blocks are available blocks). Whether or not the filtering is performed may be determined in the encoding/decoding process or be determined in advance according to each condition. Hereinafter, specific examples of a method of determining whether or not the filtering is performed will be described.

As an example, the encoder and the decoder may determine whether or not the filtering is performed on the prediction block based on the intra prediction mode of the encoding/decoding target block. As described above, the reference pixels and the prediction directions used for the intra prediction may be changed according to the intra prediction mode of the encoding/decoding target block. Therefore, it may be efficient to determine whether or not the filtering is performed based on the intra prediction mode of the encoding/decoding target block.

The following Table 1 shows an example of a method of determining whether or not the filtering is performed according to the intra prediction mode. In Table 1, it is assumed that the prediction directions of the intra prediction modes and the mode values allocated to each of the prediction modes were defined as shown in 410 of FIG. 4A.

TABLE 1

| Intra prediction mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Whether or not filtering is performed | 0 | 0 | 1 | 0 | 0 | 1 | 1 | 0 | 1 | 1 | 0 | 0 | 1 | 1 | 0 | 0 | 1 | 1 |
| Intra prediction mode | 18 | 19 | 20 | 21 | 22 | 23 | 24 | 25 | 26 | 27 | 28 | 29 | 30 | 31 | 32 | 33 | 34 | |
| Whether or not filtering is performed | 0 | 0 | 0 | 0 | 1 | 1 | 1 | 1 | 0 | 0 | 0 | 0 | 1 | 1 | 1 | 1 | 1 | |

Here, 0 among the values allocated to the intra prediction mode may indicate that the filtering is not performed, and 1 thereamong may indicate that the filtering is performed.

As an example, in the case in which the prediction mode of the current block is a DC mode (for example, a prediction mode having a mode value of 2), since the prediction block is generated by the average of the pixel values of a plurality of reference pixels, the correlation between the prediction pixels and the reference pixels becomes small. Therefore, in this case, the encoder and the decoder may perform the filtering on the prediction pixels in the prediction block. As another example, in the case in which the prediction mode of the current block is a planar mode (for example, a prediction mode having a mode value of 34), as described above with reference to FIG. 5, the right vertical line prediction pixels and the lower horizontal line prediction pixels are derived and the weights are applied based on the derived prediction pixels and the reference pixels, thereby making it possible to derive prediction values for each pixel in the current block. Therefore, in this case, since the correlation between the prediction pixels and the reference pixels becomes small, the encoder and the decoder may perform the filtering on the prediction pixels in the prediction block.

As still another example, in the case in which the intra prediction mode of the current block is a vertical right mode (for example, a prediction mode having a mode value of 5, 6, 12, 13, 22, 23, 24, and 25), since the encoder and the decoder perform the intra prediction on the current block using the above reference pixels and/or the above-right reference pixels, the correlation between the prediction pixels positioned at a left region in the prediction block and the left reference pixels may become small. Therefore, in this case, the filtering may be performed on the pixels positioned at the left region in the prediction block. As still another example, in the case in which the intra prediction mode of the current block is a horizontal below mode (for example, a prediction mode having a mode value of 8, 9, 16, 17, 30, 31, 32, and 33), since the encoder and the decoder perform the intra prediction on the current block using the left reference pixels and/or the below-left reference pixels, the correlation between the prediction pixels positioned at an upper region in the prediction block and the above reference pixels may become small. Therefore, in this case, the filtering may be performed on the pixels positioned at the upper region in the prediction block.

In addition, the encoder and the decoder may also perform the filtering on a vertical mode (for example, a prediction mode having a mode value of 0) and a horizontal mode (for example, a prediction mode having a mode value of 1), unlike the example of Table 1. In the case in which the intra prediction mode of the current block is the vertical mode, since the encoder and the decoder perform the intra prediction on the current block using the above reference pixels, the correlation between the prediction pixels positioned at the left region in the prediction block and the left reference pixels may become small. Therefore, in this case, the filtering may be performed on the pixels positioned at the left region in the prediction block. As still another example, in the case in which the intra prediction mode of the current block is a horizontal mode (for example, a prediction mode having a mode value of 1), since the encoder and the decoder perform the intra prediction on the current block using the left reference pixels, the correlation between the prediction pixels positioned at the upper region in the prediction block and the above reference pixels may become small. Therefore, in this case, the filtering may be performed on the pixels positioned at the upper region in the prediction block.

Meanwhile, in the case in which the intra prediction mode of the current block corresponds to one of the prediction modes (for example, prediction modes having mode values of 3, 4, 7, 10, 11, 14, 15, 18, 19, 20, 21, 26, 27, 28, and 29) other than the above-mentioned prediction modes, the encoder and the decoder may use at least one of the above reference pixels and the above-right reference pixels for the intra prediction and use at least one of the left reference pixels and the below-left reference pixels for the intra prediction. Therefore, in this case, since all of the prediction pixels positioned at the left region and the upper region in the prediction block may maintain the correlation with the reference pixels, the encoder and the decoder may not perform the filtering on the prediction block.

In each of the cases in which the filtering is performed, regions in which the filtering is performed in the current block and/or the prediction block and/or positions of pixels on which the filtering is performed in the current block will be described below.

As another example, the encoder and the decoder may determine whether or not the filtering is performed on the prediction block based on the size and/or the depth of the current block (and/or the prediction target block). Here, the current block may correspond to at least one of the CU, the PU, and the TU.

Here, 0 among the values allocated to the intra prediction mode may indicate that the filtering is not performed, and 1 thereamong may indicate that the filtering is performed.

The encoder and the decoder may also determine whether or not the filtering is performed on the current block and/or the prediction block in consideration of both of the intra prediction mode of the current block and the size of the current block. That is, the encoder and the decoder may determine whether or not the filtering is performed based on the size of the current block with respect to each of the intra prediction modes. In this case, whether or not the filtering is performed may be determined to be different per the inter prediction mode according to the size of the current block. The following Table 4 shows an example of a method of determining whether or not filtering is performed according to the intra prediction mode of the current block and the size of the current block.

TABLE 4

| | | Intra prediction mode | | | | | | | | | | | | | | | | |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 |
| Block size | 2 × 2 | 0 | 0 | 0 | 0 | 0 | 0 | 0 | 0 | 0 | 0 | 0 | 0 | 0 | 0 | 0 | 0 | 0 | 0 |
| | 4 × 4 | 0 | 0 | 1 | 0 | 0 | 1 | 1 | 0 | 1 | 1 | 0 | 0 | 1 | 1 | 0 | 0 | 1 | 1 |
| | 8 × 8 | 0 | 0 | 1 | 0 | 0 | 1 | 1 | 0 | 1 | 1 | 0 | 0 | 1 | 1 | 0 | 0 | 1 | 1 |
| | 16 × 16 | 0 | 0 | 1 | 0 | 0 | 1 | 1 | 0 | 1 | 1 | 0 | 0 | 1 | 1 | 0 | 0 | 1 | 1 |
| | 32 × 32 | 0 | 0 | 0 | 0 | 0 | 1 | 1 | 0 | 1 | 1 | 0 | 0 | 1 | 1 | 0 | 0 | 1 | 1 |
| | 64 × 64 | 0 | 0 | 0 | 0 | 0 | 0 | 0 | 0 | 0 | 0 | 0 | 0 | 0 | 0 | 0 | 0 | 0 | 0 |

| | | Intra prediction mode | | | | | | | | | | | | | | | | |
|---|---|---|---|---|---|---|---|---|---|---|---|---|---|---|---|---|---|---|
| | | 18 | 19 | 20 | 21 | 22 | 23 | 24 | 25 | 26 | 27 | 28 | 29 | 30 | 31 | 32 | 33 | 34 |
| Block size | 2 × 2 | 0 | 0 | 0 | 0 | 0 | 0 | 0 | 0 | 0 | 0 | 0 | 0 | 0 | 0 | 0 | 0 | 0 |
| | 4 × 4 | 0 | 0 | 0 | 0 | 1 | 1 | 1 | 1 | 0 | 0 | 0 | 0 | 1 | 1 | 1 | 1 | 1 |
| | 8 × 8 | 0 | 0 | 0 | 0 | 1 | 1 | 1 | 1 | 0 | 0 | 0 | 0 | 1 | 1 | 1 | 1 | 1 |
| | 16 × 16 | 0 | 0 | 0 | 0 | 1 | 1 | 1 | 1 | 0 | 0 | 0 | 0 | 1 | 1 | 1 | 1 | 1 |
| | 32 × 32 | 0 | 0 | 0 | 0 | 1 | 1 | 1 | 1 | 0 | 0 | 0 | 0 | 1 | 1 | 1 | 1 | 0 |
| | 64 × 64 | 0 | 0 | 0 | 0 | 0 | 0 | 0 | 0 | 0 | 0 | 0 | 0 | 0 | 0 | 0 | 0 | 0 |

The following Table 2 shows an example of a method of determining whether or not filtering is performed according to a block size, and the following Table 3 shows an example of a method of determining whether or not filtering is performed according to a depth value of a current block. In examples of Tables 2 and 3, the current block may correspond to the TU, a size of the TU may be, for example, 2×2, 4×4, 8×8, 16×16, 32×32, 64×64, or the like. However, the present invention is not limited thereto. That is, the current block may correspond to the CU, the PU, or the like, rather than the TU.

TABLE 2

| Block size | 2 × 2 | 4 × 4 | 8 × 8 | 16 × 16 | 32 × 32 | 64 × 64 |
|---|---|---|---|---|---|---|
| Whether or not filtering is performed | 0 | 1 | 1 | 1 | 1 | 0 |

TABLE 3

| Depth value | 0 | 1 | 2 | 3 | 4 | 5 |
|---|---|---|---|---|---|---|
| Whether or not filtering is performed | 1 | 1 | 1 | 0 | 0 | 0 |

Here, 0 among the values allocated to each of the intra prediction modes may indicate that the filtering is not performed, and 1 thereamong may indicate that the filtering is performed.

As still another example, the encoder and the decoder may determine whether or not the filtering is performed on the prediction block based on information on which the current block corresponds to the luma block or corresponds to the chroma block, that is, information on a color component of the current block. For example, the encoder and the decoder may perform the filtering on the prediction block only in the case in which the current block corresponds to the luma block and may not perform the filtering on the prediction block in the case in which the current block corresponds to the chroma block.

As still another example, the encoder and the decoder may also determine whether or not the filtering is performed based on information on the encoding parameters of the neighboring blocks adjacent to the current block, whether or not constrained intra prediction (CIP) is applied to the current block, whether or not there are the neighboring blocks (and/or whether or not the neighboring blocks are available blocks), and the like. A specific example of each of the methods of determining whether or not filtering is performed will be described below.

Again referring to FIG. 10, in the case in which it is determined that the filtering is performed on the current block and/or the prediction block, the encoder and the decoder may determine the region on which the filtering is performed in the current block and/or the prediction block (S1020). Here, the region on which the filtering is performed may correspond to at least one sample in the current block and/or the prediction block.

As described above, the encoder and the decoder performs the filtering on prediction pixels having a small correlation with the reference pixel used for the intra prediction, thereby making it possible to reduce a prediction error. That is, the encoder and the decoder may determine that a region having a relatively large prediction error in the current block and/or the prediction block is the filtering performing region. In this case, the encoder and the decoder may determine the filtering performing region based on at least one of the intra prediction mode of the current block, the size (and/or the depth) of the current block, and the encoding mode of the neighboring blocks adjacent to the current block. Here, the encoding mode of the neighboring blocks may indicate whether the neighboring blocks are encoded/decoded in the inter mode or are encoded/decoded in the intra mode. Specific examples of a method for determining a filtering performing region will be described below.

In addition, the encoder and the decoder may determine a filter type applied to each of the prediction pixels in the filtering performing region (S1030).

Here, the filter type may include information on a filter shape, a filter tap, a filter coefficient, and the like. A plurality of intra prediction modes may have different prediction directions, and a method of using a reconstructed reference pixel may be changed according to positions of filtering target pixels. Therefore, the encoder and the decoder adaptively determines the filter type, thereby making it possible to improve the filtering efficiency. For example, the encoder and the decoder may determine the filter type applied to each of the filtering target pixels based on the intra prediction mode of the current block, the size (and/or the depth) of the current block, and/or the positions of the filtering target pixels. An example of the filter shape may include a horizontal shape, a vertical shape, a diagonal shape, and the like, and an example of the filter tap may include a 2-tap, a 3-tap, a 4-tap, and the like.

Further, the encoder and the decoder may determine the filter coefficient based on the size of the prediction block, the positions of the filtering target pixels, and the like. That is, the encoder and the decoder may change the filter coefficient applied to the filtering target pixels according to the size of the prediction block, the positions of the filtering target pixels, and the like. Therefore, filtering strength for the filtering target pixels may be adaptively determined. As an example, in the case in which the 2-tap filter is used, the filter coefficient may be [1:3], [1:7], [3:5], or the like. As another example, in the case in which the 3-tap filter is used, the filter coefficient may be [1:2:1], [1:4:1], [1:6:1], or the like.

Meanwhile, the filter determined by the filter type may also not be a filter defined by the filter shape, the filter tap, the filter coefficient, or the like. For example, the encoder and the decoder may also perform a filtering process by adding an offset value determined by a predetermined process to the pixel values of the reference pixels. In this case, the filtering process may also be combined with the prediction block generating process to thereby be performed as a single process. That is, the filtered prediction pixel values of each of the pixels in the current block may be derived only by the above-mentioned filtering process. In this case, the above-mentioned filtering process may correspond to a single process including both of the prediction pixel generating process and the filtering process for the generated prediction pixels.

Specific examples of a method for determining a filter type will be described below.

After the filtering performing region and the filter type are determined, the encoder and the decoder may perform the filtering on each of the prediction pixels in the prediction block based on the filtering performing region and the filter type (S1040). In the case in which it is determined that the filtering is not performed on the prediction block, the encoder and the decoder may also not perform the filtering on the prediction block (and/or each of the prediction pixels in the prediction block) (S1050).

FIG. 11 is a diagram schematically showing an example of a method of determining whether or not filtering is performed based on encoding parameters of neighboring blocks adjacent to a current block.

In FIG. 11, the encoding parameters of the neighboring blocks may include an intra prediction mode, an inter prediction mode, an encoding mode, or the like. Here, the encoding mode of the neighboring blocks may indicate whether the neighboring blocks are encoded/decoded in the inter mode or are encoded/decoded in the intra mode.

1110 of FIG. 11 shows an example of a method of determining whether or not filtering is performed based on the intra prediction mode of the neighboring block adjacent to the current block. 1113 of FIG. 11 indicates the current block C, and 1116 of FIG. 11 indicates a left neighboring block A adjacent to the left of the current block. In 1110 of FIG. 11, it is assumed that the intra prediction mode of the current block corresponds to the vertical prediction mode. In this case, since the encoder and the decoder perform the intra prediction on the current block using the above reference pixels and/or the above-right reference pixels, the filtering may be performed on the pixels positioned at a left region 1119 in the prediction block.

However, in the case in which a prediction direction of the left neighboring block A 1116 adjacent to a filtering target region 1119 and a prediction direction of the current block C 1113 are different from each other as shown in 1110 of FIG. 11, it may be more efficient not to perform the filtering on the filtering target region 1119. Therefore, in the case in which the prediction direction of the neighboring block 1116 adjacent to the filtering target region 1119 and the prediction direction of the current block C 1113 are different from each other, the encoder and the decoder may not perform the filtering on the filtering target region 1119. To the contrary, in the case in which the prediction direction of the neighboring block 1116 adjacent to the filtering target region 1119 and the prediction direction of the current block C 1113 are the same as or similar to each other (for example, in the case in which a difference value between prediction angles is a predetermined threshold value or less), the encoder and the decoder performs the filtering on the filtering target region 1119, thereby making it possible to reduce the prediction error.

1120 of FIG. 11 shows an example of a method of determining whether filtering is performed based on the encoding mode of the neighboring block adjacent to the current block in the case in which the constrained intra prediction (CIP) is applied to the current block. 1123 of FIG. 11 indicates the current block C, and 1126 of FIG. 11 indicates a left neighboring block A adjacent to the left of the current block. In 1120 of FIG. 11, it is assumed that the intra prediction mode of the current block corresponds to the vertical prediction mode. In this case, since the encoder and the decoder perform the intra prediction on the current block using the above reference pixels and/or the above-right reference pixels, the filtering may be performed on the pixels positioned at a left region 1129 in the prediction block.

However, in the case in which the CIP is applied to the current block C 1123, the encoder and the decoder may also not perform the filtering on a filtering target region 1129 according to the encoding mode of the left neighboring block A 1126 adjacent to the filtering target region 1129.

In the case in which the CIP is applied to the current block 1123, the encoder and the decoder may not use pixels in the neighboring block encoded in the inter mode as the reference pixels in performing the intra prediction on the current block 1123. For example, in 1120 of FIG. 11, in the case in which the left neighboring block A 1126 is encoded in the inter mode, the reference pixels in the left neighboring block 1126, that is, the left reference pixels may not be used for the inter prediction of the current block 1123. In this case, the encoder and the decoder may fill positions of the left reference pixels with the pixel values of the reference pixels in the block encoded in the intra mode and then perform the intra prediction. That is, the encoder and the decoder does not use the pixels to which the inter mode is applied for the intra prediction, thereby making it possible to enhance resistance against the error.

Therefore, in the case in which the CIP is applied to the current block 1123 and the encoding mode of the left neighboring block 1126 adjacent to the filtering target region 1129 is the inter mode as shown in 1120 of FIG. 11, the encoder and the decoder may not perform the filtering on the filtering target region 1129.

Figure 12:
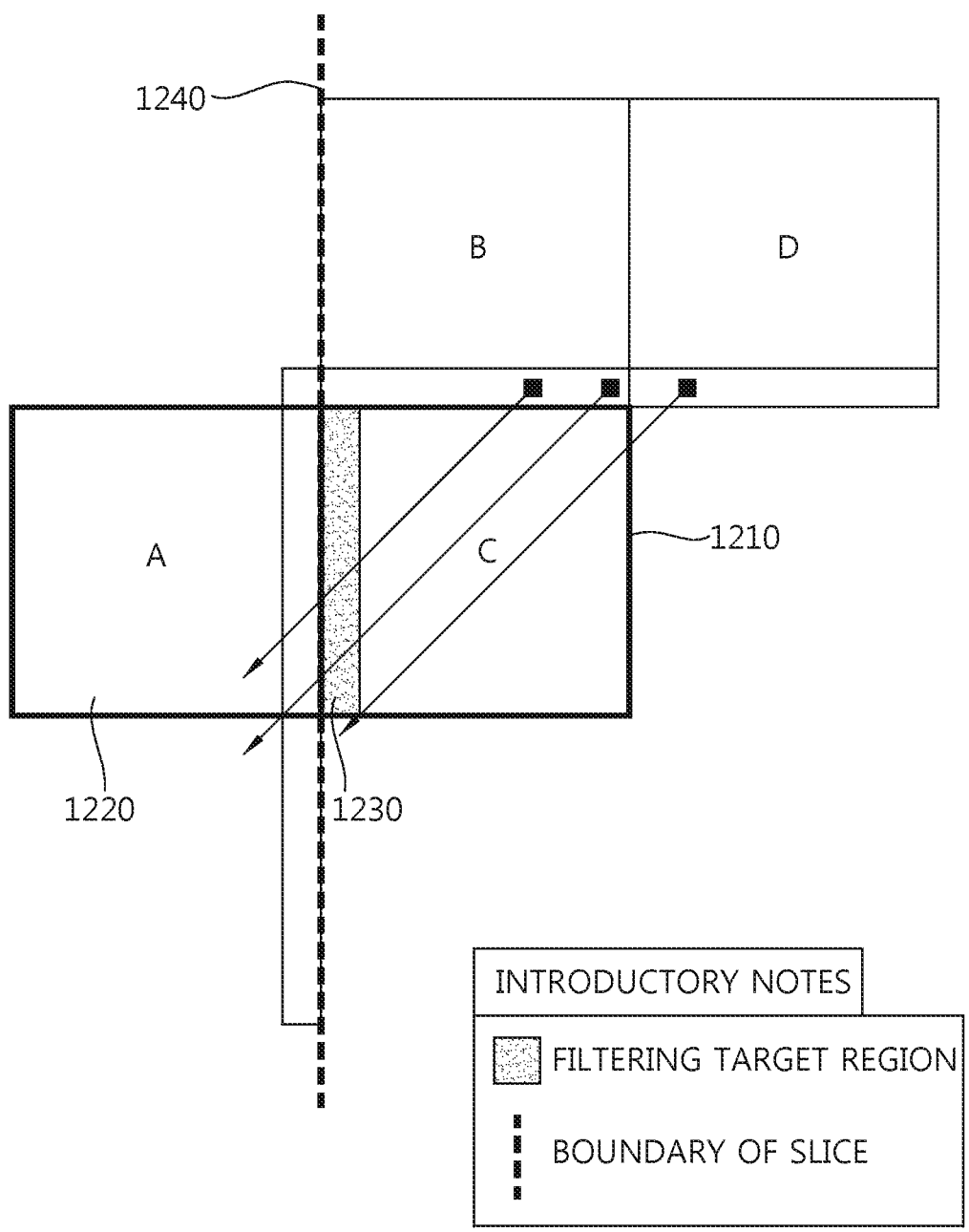
FIG. 12 is a diagram schematically showing an example of a method of determining whether or not filtering is performed based on information on whether or not the neighboring blocks adjacent to the current block is present (and/or whether or not the neighboring blocks are an available block).

FIG. 12 is a diagram schematically showing an example of a method of determining whether or not filtering is performed based on information on whether or not the neighboring blocks adjacent to the current block is present (and/or whether or not the neighboring blocks are an available block).

1210 of FIG. 12 indicates the current block C, and 1220 of FIG. 12 indicates a neighboring block A adjacent to the left of the current block. In FIG. 12, it is assumed that the intra prediction mode of the current block 1210 corresponds to the vertical prediction mode. In this case, since the encoder and the decoder perform the intra prediction on the current block using the above reference pixels and/or the above-right reference pixels, the filtering may be performed on the pixels positioned at a left region 1230 in the prediction block.

However, in the case in which the neighboring block adjacent to the filtering target region is not present or is not available, the encoder and the decoder may also not perform the filtering on the filtering target region. Here, an example of the case in which the neighboring block adjacent to the filtering target region is not present or is not available, there are a case in which the current block is present on a boundary of a current picture, a case in which the neighboring block adjacent to the current block is present outside a boundary of a slice to which the current block pertains, and the like.

In the case in which the neighboring block adjacent to the filtering target region is not present or is not available, the encoder and the decoder may generate reference pixel values of positions adjacent to the filtering target region using available reference pixels and then perform the intra prediction. However, in this case, since a plurality of generated reference pixels may have values similar to each other and the values of the generated reference pixels may not be similar to the pixel values in the current block, when the filtering is performed on the current block based on the generated reference pixels, the encoding efficiency may be reduced. Therefore, the encoder and the decoder may not perform the filtering on the filtering target region.

Referring to FIG. 12, reconstructed blocks B and D are present around the current block C 1210. Further, a left neighboring block A 1220 adjacent to a filtering target region 1230 in the current block 1210 is present outside a boundary 1240 of a slice to which the current block 1210 pertains. In this case, since the left neighboring block A 1220 adjacent to the filtering target region 1230 corresponds to an unavailable region, the encoder and the decoder may not perform the filtering on the filtering target region 1230.

Figure 13:
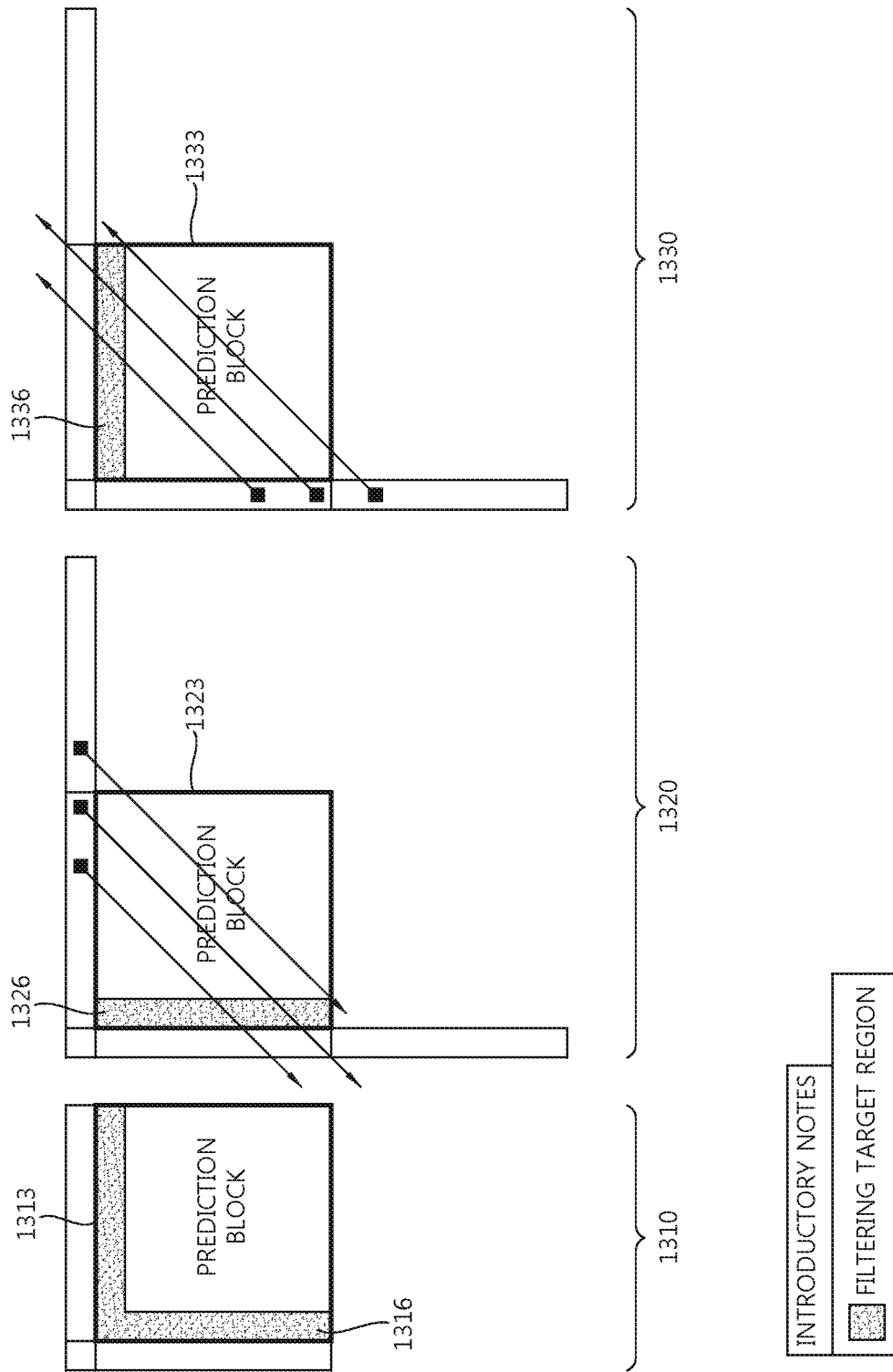
FIG. 13 is a diagram schematically showing an example of a method of determining a filtering performing region based on an intra prediction mode of the current block.

FIG. 13 is a diagram schematically showing an example of a method of determining a filtering performing region based on an intra prediction mode of the current block.

As described above, the encoder and the decoder may perform the intra prediction on the encoding/decoding target block based on the previously reconstructed reference pixels. In this case, since the reference pixel and/or the prediction direction used for the intra prediction may be changed according to the intra prediction mode of the current block, it may be efficient to determine that a region having a relatively large prediction error is the filtering performing region, in consideration of the intra prediction mode of the current block. More specifically, prediction pixels positioned at a region adjacent to reference pixels that are not used for the intra prediction in the prediction block may have a low correlation with the reference pixels and a large prediction error. Therefore, the encoder and the decoder performs the filtering on the prediction pixels in the region adjacent to the reference pixels that are not used for the intra prediction among the prediction pixels in the prediction block, thereby making it possible to reduce the prediction error and improve the prediction efficiency.

1310 of FIG. 13 shows an example of a filtering performing region in the case in which the prediction mode of the current block is the DC mode and/or the planar mode. In 1310 of FIG. 13, 1313 may indicate a prediction block, and 1316 may indicate a filtering performing region.

As described above, in the case in which the prediction mode of the current block is the DC mode, since the prediction block 1313 is generated by the average of the pixel values of the plurality of reference pixels, the correlation between the prediction pixel and the reference pixel becomes small. Therefore, in this case, the encoder and the decoder may determine that at least one horizontal pixel line (hereinafter, referred to as an upper horizontal prediction pixel line) positioned at the uppermost portion in the prediction block 1313 and at least vertical pixel line (hereinafter, referred to as a left vertical prediction pixel line) positioned at the leftmost portion in the prediction block 1313 are the filtering performing region 1316. Here, the number of horizontal pixel lines included in the upper horizontal prediction pixel line and the number of vertical pixel lines included in the left vertical prediction pixel line may be a predetermined fixed number. For example, each of the upper horizontal prediction pixel line and the left vertical prediction pixel line may include one pixel line. In addition, as in an example of FIG. 14 described below, the number of pixel lines included in the upper horizontal prediction pixel line and the number of pixel lines included in the left vertical prediction pixel line may also be determined based on the sizes of the current block and/or the prediction block 1313. That is, the number of pixel lines included in the upper horizontal prediction pixel line and the number of pixel lines included in the left vertical prediction pixel line may be variable according to the sizes of the current block and/or the prediction block 1313. For example, each of the number of pixel lines included in the upper horizontal prediction pixel line and the number of pixel lines included in the left vertical prediction pixel line may be 1, 2, 4, or the like.

Meanwhile, even in the prediction mode of the current block is the planar mode (the prediction mode having the mode value of 34), the correlation between the prediction pixel and the reference pixel may be small. Therefore, in this case, the encoder and the decoder may determine that the upper horizontal prediction pixel line and the left vertical prediction pixel line are the filtering performing region 1316, as in the DC mode.

1320 of FIG. 13 shows an example of a filtering performing region in the case in which the intra prediction mode of the current block is the vertical right mode (for example, the prediction mode having the mode value of 5, 6, 12, 13, 22, 23, 24, and 25). In 1320 of FIG. 13, 1323 may indicate a prediction block, and 1326 may indicate a filtering performing region.

In the case in which the prediction mode of the current block is the vertical right mode, since the encoder and the decoder perform the intra prediction on the current block based on the above reference pixels and/or the above-right reference pixels, the correlation between the prediction pixels positioned at the left region in the prediction block 1323 and the left reference pixels may become small. Therefore, in this case, the encoder and the decoder determines that at least one vertical pixel line positioned at the leftmost portion in the prediction block 1323, that is, the left vertical prediction pixel line is the filtering performing region 1326 and perform the filtering, thereby making it possible to improve the prediction efficiency. In this case, the number of vertical pixel lines included in the left vertical prediction pixel line may be a predetermined fixed number. For example, the left vertical prediction pixel line may include one vertical pixel line. Further, as in an example of FIG. 14 described below, the number of vertical pixel lines included in the left vertical prediction pixel line may also be determined based on the sizes of the current block and/or the prediction block 1323. That is, the number of vertical pixel lines included in the left vertical prediction pixel line may be variable according to the sizes of the current block and/or the prediction block 1323 and be, for example, 1, 2, 4, or the like.

Meanwhile, in the case in which the prediction mode of the current block is the vertical mode, since the encoder and the decoder perform the intra prediction on the current block using the above reference pixels, the correlation between the prediction pixels positioned at the left region in the prediction block and the left reference pixels may become small. Therefore, even in this case, the encoder and the decoder may determine that the left vertical prediction pixel line is the filtering performing region and perform the filtering.

1330 of FIG. 13 shows an example of a filtering performing region in the case in which the intra prediction mode of the current block is the horizontal below mode (for example, the prediction mode having the mode value of 8, 9, 16, 17, 30, 31, 32, and 33). In 1330 of FIG. 13, 1333 may indicate a prediction block, and 1336 may indicate a filtering performing region.

In the case in which the intra prediction mode of the current block is the horizontal below mode, since the encoder and the decoder perform the intra prediction on the current block using the left reference pixels and/or the below-left reference pixels, the correlation between the prediction pixels positioned at the upper region in the prediction block 1333 and the above reference pixels may become small. Therefore, in this case, the encoder and the decoder determines that at least one horizontal pixel line positioned at the uppermost portion in the prediction block 1333, that is, the upper horizontal prediction pixel line is the filtering performing region 1336 and perform the filtering, thereby making it possible to improve the prediction efficiency. In this case, the number of horizontal pixel lines included in the upper horizontal prediction pixel line may be a predetermined fixed number. For example, the upper horizontal prediction pixel line may include one horizontal pixel line. Further, as in an example of FIG. 14 described below, the number of horizontal pixel lines included in the upper horizontal prediction pixel line may also be determined based on the sizes of the current block and/or the prediction block 1333. That is, the number of horizontal pixel lines included in the upper horizontal prediction pixel line may be variable according to the sizes of the current block and/or the prediction block 1333 and be, for example, 1, 2, 4, or the like.

Meanwhile, in the case in which the prediction mode of the current block is the horizontal mode, since the encoder and the decoder perform the intra prediction on the current block using the left reference pixels, the correlation between the prediction pixels positioned at the upper region in the prediction block and the above reference pixels may become small. Therefore, even in this case, the encoder and the decoder may determine that the upper horizontal prediction pixel line is the filtering performing region and perform the filtering.

Figure 14:
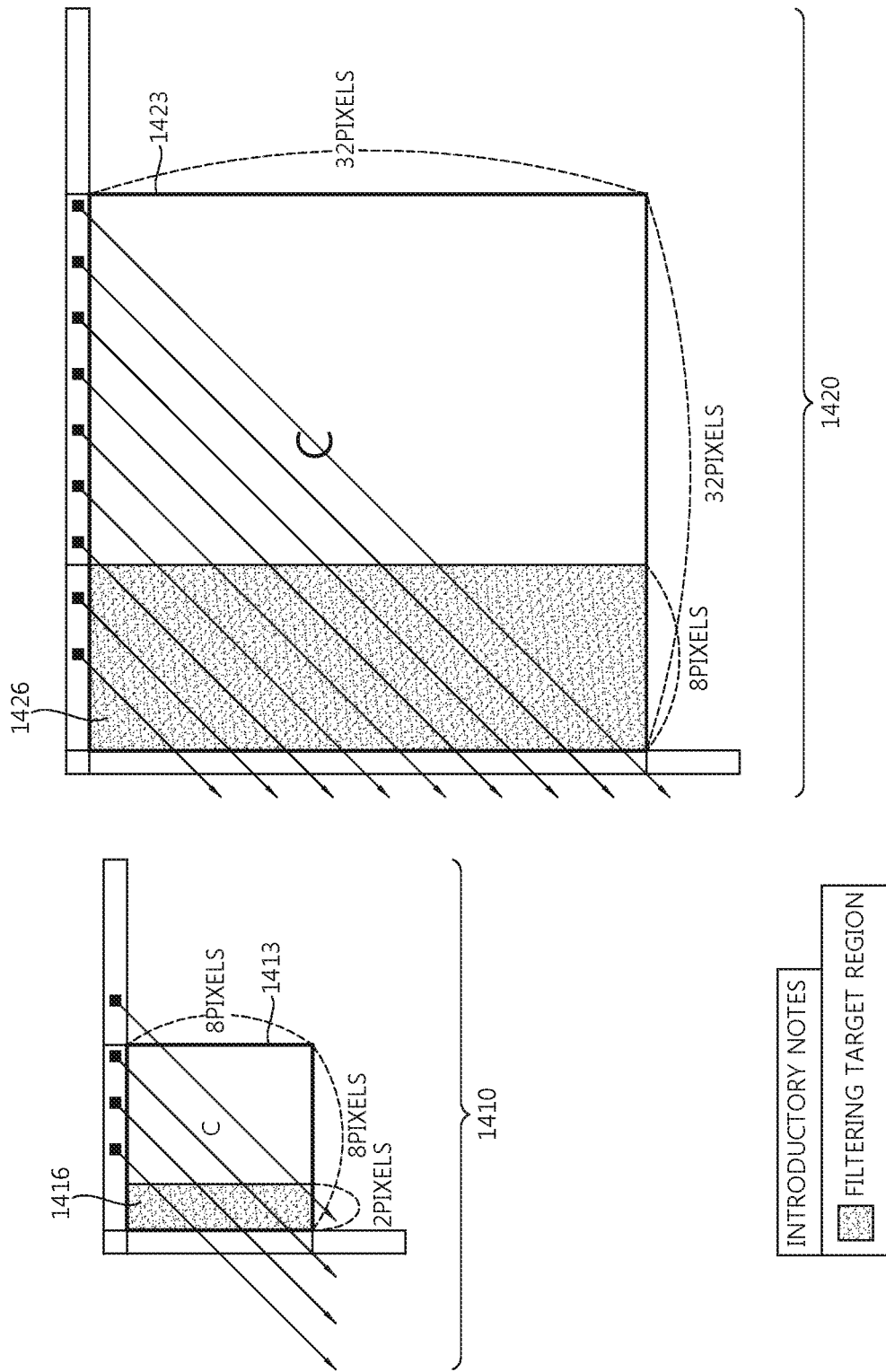
FIG. 14 is a diagram schematically showing an example of a method of determining a filtering performing region based on a size and/or a depth of the current block.

FIG. 14 is a diagram schematically showing an example of a method of determining a filtering performing region based on a size and/or a depth of the current block.

In the case in which a size of the current block (and/or the prediction target block) is large, a size of a region having a large prediction error in the current block may also be large, and in the case in which the size of the current block (and/or the prediction target block) is small, the size of the region having the large prediction error in the current block may also be small. Therefore, the encoder and the decoder determines the filtering performing region based on the size (and/or the depth) of the current block (and/or the prediction target block), thereby making it possible to improve the encoding efficiency. In the case, the encoder and the decoder may determine that a region having a relatively large prediction error is the filtering performing region.

1410 of FIG. 14 shows an example of a filtering performing region in the case in which a size of a current block is 8×8. In 1410 of FIG. 14, 1413 indicates a current block, and 1416 indicates a filtering performing region. In 1410 of FIG. 14, it is assumed that an intra prediction mode of the current block 1413 corresponds to the vertical right mode (for example, the prediction mode having the mode value of 6). In this case, since the encoder and the decoder perform the intra prediction on the current block using the above reference pixels and/or the above-right reference pixels, a prediction error of a left region to which a distance from the above reference pixels and/or the above-right reference pixels is distant in the prediction block may be large. Therefore, in this case, the encoder and the decoder may determine that at least one vertical pixel line positioned at the leftmost portion in the prediction block, that is, the left vertical prediction pixel line is the filtering performing region 1416.

1420 of FIG. 14 shows an example of a filtering performing region in the case in which a size of a current block is 32×32. In 1420 of FIG. 14, 1423 indicates a current block, and 1426 indicates a filtering target region. In 1420 of FIG. 14, it is assumed that an intra prediction mode of the current block 1423 corresponds to the vertical right mode (for example, the prediction mode having the mode value of 6). In this case, since the encoder and the decoder perform the intra prediction on the current block using the above reference pixels and/or the above-right reference pixels, a prediction error of a left region to which a distance from the above reference pixels and/or the above-right reference pixels is distant in the prediction block may be large. Therefore, in this case, the encoder and the decoder may determine that at least one vertical pixel line positioned at the leftmost portion in the prediction block, that is, the left vertical prediction pixel line is the filtering performing region 1426.

In 1410 or 1420 of FIG. 14, the number vertical pixel lines configuring the left vertical prediction pixel line may be determined based on the sizes of the current block 1413 or 1423 and/or the prediction block. In 1410 of FIG. 14, the size of the current block is 8×8, which is a relatively small value. Therefore, in this case, since the size of the region having the large prediction error may be small, the encoder and the decoder may determine that two vertical pixel lines positioned at the leftmost portion in the prediction block are the filtering performing region. On the other hand, in 1420 of FIG. 14, the size of the current block is 32×32, which is a relatively large value. Therefore, in this case, since the size of the region having the large prediction error may be large, the encoder and the decoder may determine that four vertical pixel lines positioned at the leftmost portion in the prediction block are the filtering performing region.

The following Table 5 shows an example of a filtering performing region according to a block size, and the following Table 6 shows an example of a filtering performing region according to a depth value of a current block. The encoder and the decoder may determine the filtering performing region based on the size and/or the depth of the current block, as shown in the following Tables 5 and 6.

TABLE 5

| Block size | 2 × 2 | 4 × 4 | 8 × 8 | 16 × 16 | 32 × 32 | 64 × 64 |
|---|---|---|---|---|---|---|
| Filtering performing region | 0 × 0 | 1 × 4 | 2 × 8 | 4 × 16 | 8 × 32 | 16 × 64 |

TABLE 6

| Depth value | 5 | 4 | 3 | 2 | 1 | 0 |
|---|---|---|---|---|---|---|
| Filtering performing region | 0 × 0 | 4 × 1 | 8 × 2 | 16 × 4 | 32 × 8 | 64 × 16 |

Here, the current block may correspond to the TU, a size of the TU may be, for example, 2×2, 4×4, 8×8, 16×16, 32×32, 64×64, or the like. However, the present invention is not limited thereto. That is, the current block may correspond to the CU, the PU, or the like, rather than the TU.

The size and/or the position of the filtering performing region determined according to the size and/or the depth of the current block are not limited to the above-mentioned examples, but may also be determined to be a size and/or a position different from those of the above-mentioned examples. Further, in the above examples, the method of determining a filtering performing region based on the vertical right mode has been described for convenience of explanation. However, the method for determining a filtering performing region may also be similarly applied in the case in which the prediction mode corresponds to modes other than the vertical mode.

FIG. 15 is a diagram schematically showing an example of a method of determining a filtering performing region based on an encoding mode of the neighboring blocks adjacent to the current block.

In FIG. 15, it is assumed that the intra prediction mode of the current block C 1510 corresponds to the vertical prediction mode. In this case, since the encoder and the decoder perform the intra prediction on the current block using the above reference pixels and/or the above-right reference pixels, the filtering may be performed on the pixels positioned at a left region 1129 in the prediction block.

However, in the case in which the encoding mode of the neighboring bock adjacent to the current block is the inter mode, it is highly likely that the recovered pixel values in the neighboring block will be unreliable due to an error generated in a network, or the like, and when the filtering is performed based on the reconstructed pixel values in the neighboring block of which the encoding mode is the inter mode, the encoding efficiency may be reduced. Therefore, the encoder and the decoder may not perform the filtering on a region adjacent to the neighboring block of which the encoding mode is the inter mode. That is, the encoder and the decoder may determine the filtering performing region based on the encoding mode of the neighboring block adjacent to the current block.

Referring to FIG. 15, as the neighboring blocks adjacent to the left of the current block 1510, there are a reconstructed neighboring block A 1520 and a reconstructed neighboring block B 1530. Here, it is assumed that an encoding mode of the neighboring block A 1520 is the intra mode, and an encoding mode of the neighboring block B 1530 is the inter mode. In this case, the encoder and the decoder may determine that only a region adjacent to the neighboring block B 1530 encoded in the intra mode in the left region in the prediction block is the filtering target region.

Figure 16A:
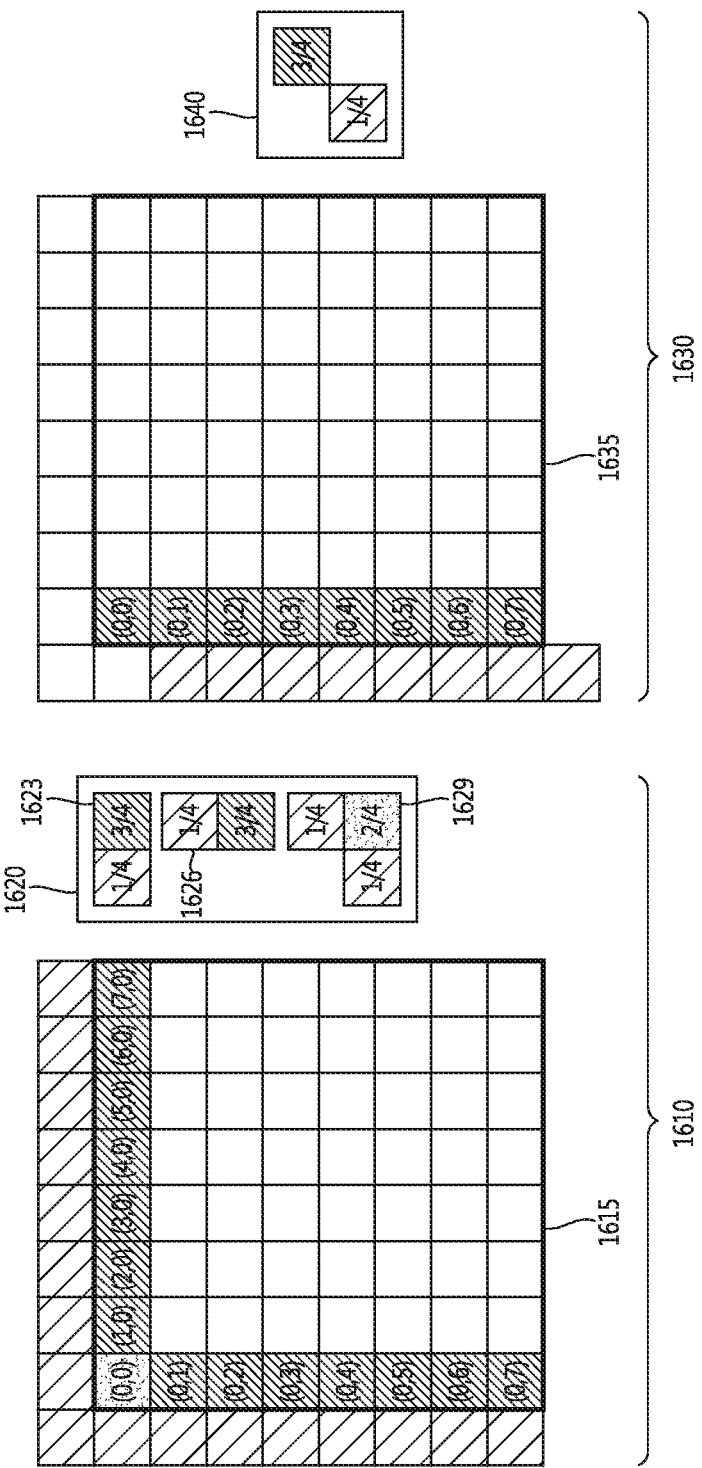
FIGS. 16A and 16B are diagrams showing an example of a filter type determining method according to the intra prediction mode of the current block.
Figure 16B:
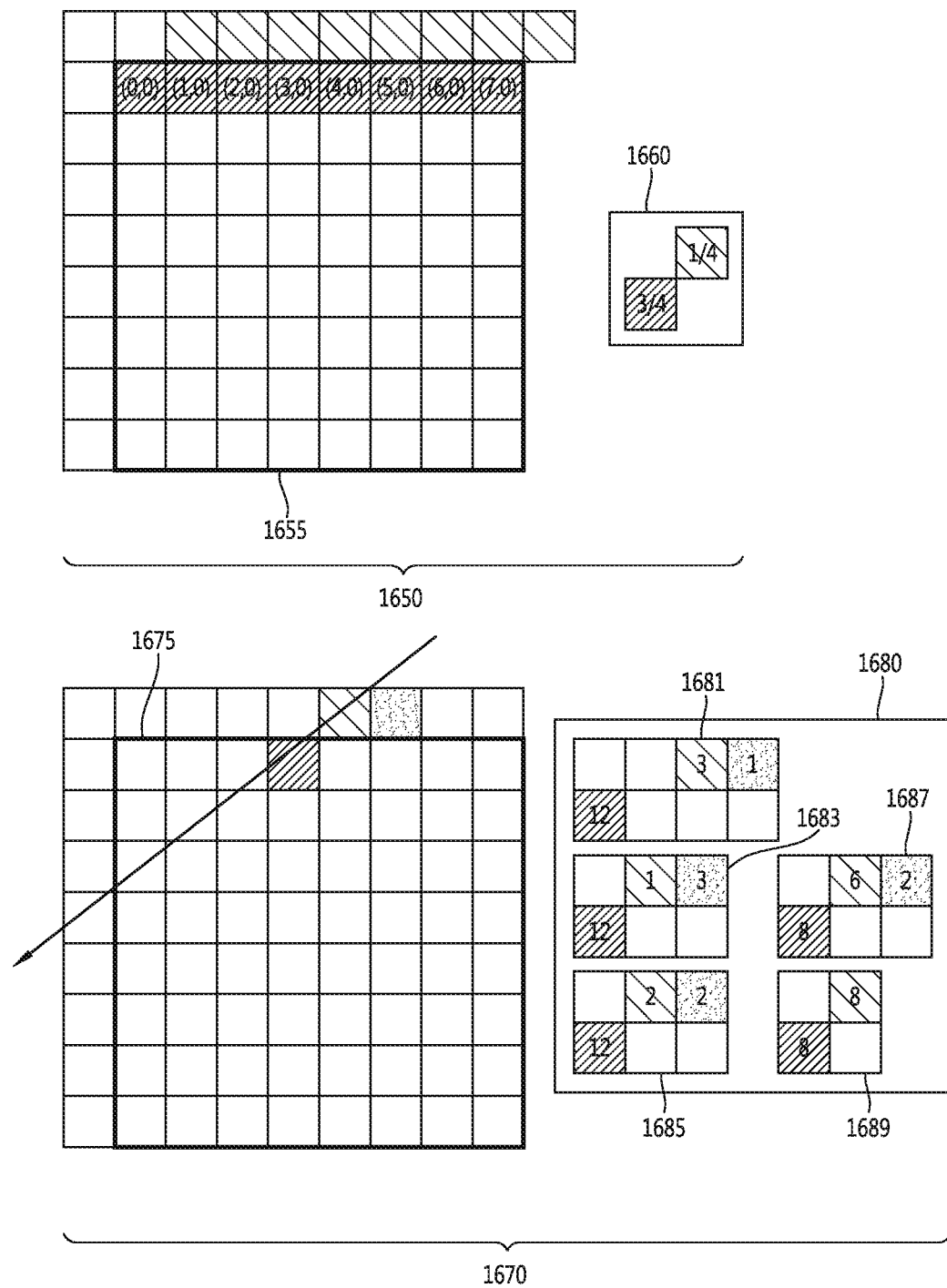

FIGS. 16A and 16B are diagrams showing an example of a filter type determining method according to the intra prediction mode of the current block.

1610 of FIG. 16A shows an example of a filter type determining method in the case in which the prediction mode of the current block is the DC mode and/or the planar mode. In 1610 of FIG. 16A, 1615 indicates a prediction block, and 1620 is a filter tap applied to a filtering target pixel.

As described above, in the case in which the prediction mode of the current block is the DC mode, since the prediction block 1615 is generated by the average of the pixel values of the plurality of reference pixels, the correlation between the prediction pixel and the reference pixel becomes small. Therefore, in this case, the encoder and the decoder may determine that prediction pixels (for example, (0,0), (1,0), (2,0), (3,0), (4,0), (5,0), (6,0), (7,0), (0,1), (0,2), (0,3), (0,4), (0,5), (0,6), (0,7)) included in an upper horizontal prediction line (for example, one horizontal pixel line positioned at the uppermost portion in the prediction block 1615) and a left vertical pixel line (for example, one vertical pixel line positioned at the leftmost portion in the prediction block 1615) are the filtering performing region. Further, in the case in which the prediction mode of the current block is the planar mode, the correlation between the prediction pixel and the reference pixel may be small. Therefore, in this case, the encoder and the decoder may determine that the prediction pixels included in the upper horizontal prediction pixel line and the left vertical prediction pixel line are the filtering performing region, as in the DC mode.

In the case in which the prediction mode of the current block is the DC mode and/or the planar mode, the encoder and the decoder may apply a 3-tap filter 1629 of [¼, 2/4, ¼] to a left upper prediction pixel (0,0) positioned at the leftmost upper portion in the prediction block. In this case, the encoder and the decoder may perform the filtering on the filtering target pixel based on the filtering target pixel (0,0), a reference pixel (0,−1) adjacent to an upper portion of the filtering target pixel, and a reference pixel (−1,0) adjacent to the left of the filtering target pixel. In this case, a filter coefficient applied to the filtering target pixel may be 2/4, and a filter coefficient applied to the reference pixel adjacent to the upper portion of the filtering target pixel and the reference pixel adjacent to the left of the filtering target pixel may be ¼.

Further, in the case in which the prediction mode of the current block is the DC mode and/or the planar mode, the encoder and the decoder may apply a horizontal 2-tap filter 1623 of [¼, ¾] to each of the pixels (for example, (0,1), (0,2), (0,3), (0,4), (0,5), (0,6), and (0,7)) except for the left upper prediction pixel among prediction pixels included in the left vertical prediction pixel line. Here, when it is assumed that a position of the filtering target pixel is (0,y), the encoder and the decoder may perform the filtering on the filtering target pixel based on the filtering target pixel (0,y) and a reference pixel (−1,y) adjacent to the left of the filtering target pixel. In this case, a filter coefficient applied to the filtering target pixel may be ¾, and a filter coefficient applied to the reference pixel adjacent to the left of the filtering target pixel may be ¼.

Further, in the case in which the prediction mode of the current block is the DC mode and/or the planar mode, the encoder and the decoder may apply a vertical 2-tap filter 1625 of [¼, ¾] to each of the pixels (for example, (1,0), (2,0), (3,0), (4,0), (5,0), (6,0) and (7,0)) except for the left upper prediction pixel among prediction pixels included in the upper horizontal prediction pixel line. Here, when it is assumed that a position of the filtering target pixel is (x,0), the encoder and the decoder may perform the filtering on the filtering target pixel based on the filtering target pixel (x,0) and a reference pixel (x,−1) adjacent to an upper portion of the filtering target pixel. In this case, a filter coefficient applied to the filtering target pixel may be ¾, and a filter coefficient applied to the reference pixel adjacent to the upper portion of the filtering target pixel may be ¼.

In the above-mentioned example, the encoder and the decoder may also use different filter types (for example, a filter shape, a filter tap, a filter coefficient, or the like) according to the size of the current block. In this case, the encoder and the decoder may adaptively determine the filter type based on the size of the current block. However, the encoder and the decoder may also always use a predetermined fixed filter type (for example, a filter shape, a filter tap, a filter coefficient, or the like) regardless of the sizes of the current block and/or the prediction block as in the above-mentioned example.

1630 of FIG. 16A shows an example of a filter type determining method in the case in which the prediction mode of the current block is the vertical right mode (for example, the prediction mode having the mode value of 5, 6, 12, 13, 22, 23, 24, and 25). In 1630 of FIG. 16A, 1635 indicates a prediction block, and 1640 is a filter tap applied to a filtering target pixel.

As described above, in the case in which the prediction mode of the current block is the vertical right mode, since the encoder and the decoder perform the intra prediction on the current block based on the above reference pixels and/or the above-right reference pixels, the correlation between the prediction pixels positioned at the left region in the prediction block 1635 and the left reference pixels may become small. Therefore, in this case, the encoder and the decoder may determine that prediction pixels (for example, (0,0), (0,1), (0,2), (0,3), (0,4), (0,5), (0,6), and (0,7)) included in a left vertical prediction pixel line (for example, one vertical pixel line positioned at the leftmost portion in the prediction block 1635) are the filtering performing region.

Meanwhile, in the case in which the prediction mode of the current block is the vertical mode (for example, the prediction mode having the mode value of 0), since the encoder and the decoder perform the intra prediction on the current block using the above reference pixels, the correlation between the prediction pixels positioned at the left region in the prediction block and the left reference pixels may become small. Therefore, even in this case, the encoder and the decoder may determine that the prediction pixels included in the left vertical prediction pixel line are the filtering performing region. However, a filter type applied to the vertical mode may be different from a filter type applied to the vertical right mode.

In the case in which the prediction mode of the current block is the vertical right mode, the encoder and the decoder may apply a diagonal 2-tap filter 1640 of [¼, ¾] to each of the prediction pixels (for example, (0,1), (0,2), (0,3), (0,4), (0,5), (0,6), and (0,7)) included in the left vertical prediction pixel line. Here, when it is assumed that a position of the filtering target pixel is (0,y), the encoder and the decoder may perform the filtering on the filtering target pixel based on the filtering target pixel (0,y) and a reference pixel (−1,y+1) adjacent to a lower portion of a reference pixel adjacent to the left of the filtering target pixel. In this case, a filter coefficient applied to the filtering target pixel may be ¾, and a filter coefficient applied to the reference pixel adjacent to the lower portion of the reference pixel adjacent to the left of the filtering target pixel may be ¼.

1650 of FIG. 16B shows an example of a filter type determining method in the case in which the prediction mode of the current block is the horizontal below mode (for example, the prediction mode having the mode value of 8, 9, 16, 17, 30, 31, 32, and 33). In 1650 of FIG. 16B, 1655 indicates a prediction block, and 1660 is a filter tap applied to a filtering target pixel.

As described above, in the case in which the intra prediction mode of the current block is the horizontal below mode, since the encoder and the decoder perform the intra prediction on the current block using the left reference pixels and/or the below-left reference pixels, the correlation between the prediction pixels positioned at the upper region in the prediction block 1655 and the above reference pixels may become small. Therefore, in this case, the encoder and the decoder may determine that prediction pixels (for example, (0,0), (1,0), (2,0), (3,0), (4,0), (5,0), (6,0), and (7,0)) included in an upper horizontal prediction pixel line (for example, one vertical pixel line positioned at the uppermost portion in the prediction block 1655) are the filtering performing region.

Meanwhile, in the case in which the prediction mode of the current block is the horizontal mode (for example, the prediction mode having the mode value of 1), since the encoder and the decoder perform the intra prediction on the current block using the left reference pixels, the correlation between the prediction pixels positioned at the upper region in the prediction block 1655 and the above reference pixels may become small. Therefore, even in this case, the encoder and the decoder may determine that the prediction pixels included in the upper horizontal prediction pixel line are the filtering performing region. However, a filter type applied to the horizontal mode may be different from a filter type applied to the horizontal below mode.

In the case in which the prediction mode of the current block is the horizontal below mode, the encoder and the decoder may apply a diagonal 2-tap filter 1660 of [¼, ¾] to each of the prediction pixels (for example, (0,0) (1,0), (2,0), (3,0), (4,0), (5,0), (6,0), and (7,0)) included in the upper horizontal prediction pixel line. Here, when it is assumed that a position of the filtering target pixel is (x,0), the encoder and the decoder may perform the filtering on the filtering target pixel based on the filtering target pixel (x,0) and a reference pixel (x+1,−1) adjacent to the right of a reference pixel adjacent to an upper portion of the filtering target pixel. In this case, a filter coefficient applied to the filtering target pixel may be ¾, and a filter coefficient applied to the reference pixel adjacent to the right of the reference pixel adjacent to the upper portion of the filtering target pixel may be ¼.

1670 of FIG. 16B shows an example of a method of adaptively determining a filter type (for example, a filter shape, a filter coefficient, a filter tap, or the like) according to the intra prediction mode (particularly, the directional prediction mode) of the current block. In 1670 of FIG. 16B, 1675 indicates a prediction block, and 1680 is a filter tap applied to a filtering target pixel.

As in the examples of 1630 and 1650 described above, the encoder and the decoder may apply a predetermined fixed filter type to each of the vertical right mode and/or the horizontal below mode. However, the encoder and the decoder may also apply various filter types other than the above-mentioned filter type according to the intra prediction mode. In this case, the encoder and the decoder may adaptively determine the filter type based on the intra prediction mode of the current block.

As an example, the encoder and the decoder may use a 3-tap filter 1681 performing the filtering based on the filtering target pixel (x,y), a reference pixel (x+2,y−1), and a reference pixel (x+3,y−1). In this case, a filter coefficient applied to the filtering target pixel (x,y) may be 12, a filter coefficient applied to the reference pixel (x+2,y−1) may be 3, and a filter coefficient applied to the reference pixel (x+3,y−1) may be 1. As another example, the encoder and the decoder may use a 3-tap filter 1683, 1685, or 1687 performing the filtering based on the filtering target pixel (x,y), a reference pixel (x+1,y−1), and a reference pixel (x+2,y−1). In this case, a filter coefficient applied to the filtering target pixel (x,y) may be 12, a filter coefficient applied to the reference pixel (x+1,y−1) may be 1, and a filter coefficient applied to the reference pixel (x+2,y−1) may be 3 (1683). In addition, a filter coefficient applied to the filtering target pixel (x,y) may be 12, a filter coefficient applied to the reference pixel (x+1,y−1) may be 2, and a filter coefficient applied to the reference pixel (x+2,y−1) may be 2 (1685). Further, a filter coefficient applied to the filtering target pixel (x,y) may be 8, a filter coefficient applied to the reference pixel (x+1,y−1) may be 6, and a filter coefficient applied to the reference pixel (x+2,y−1) may be 2 (1687). As still another example, the encoder and the decoder may also use a 2-tap filter 1689 performing the filtering based on the filtering target pixel (x,y) and a reference pixel (x+1,y−1). In this case, a filter coefficient applied to the filtering target pixel (x,y) may be 8, and a filter coefficient applied to the reference pixel (x+1,y−1) may be 8.

Meanwhile, in the case in which the intra prediction mode of the current block corresponds to one of the prediction modes (for example, prediction modes having mode values of 3, 4, 7, 10, 11, 14, 15, 18, 19, 20, 21, 26, 27, 28, and 29) other than the above-mentioned prediction modes, the encoder and the decoder may use at least one of the above reference pixels and the above-right reference pixels for the intra prediction and use at least one of the left reference pixels and the below-left reference pixels for the intra prediction. Therefore, in this case, since all of the prediction pixels positioned at the left region and the upper region in the prediction block may maintain the correlation with the reference pixels, the encoder and the decoder may not perform the filtering on the prediction block.

Further, as described above in the example of FIG. 10, since the encoder and the decoder may determine whether or not the filtering is performed based on the information on the color component of the current block, the encoder and the decoder may also perform the filtering process described above with reference to FIGS. 16A and 16B only in the case in which the current block is the luma block. That is, the filtering processes according to the above-mentioned examples may be applied only in the case in which the current block corresponds to the luma block and may not be applied in the case in which the current block corresponds to the chroma block.

Figure 17:
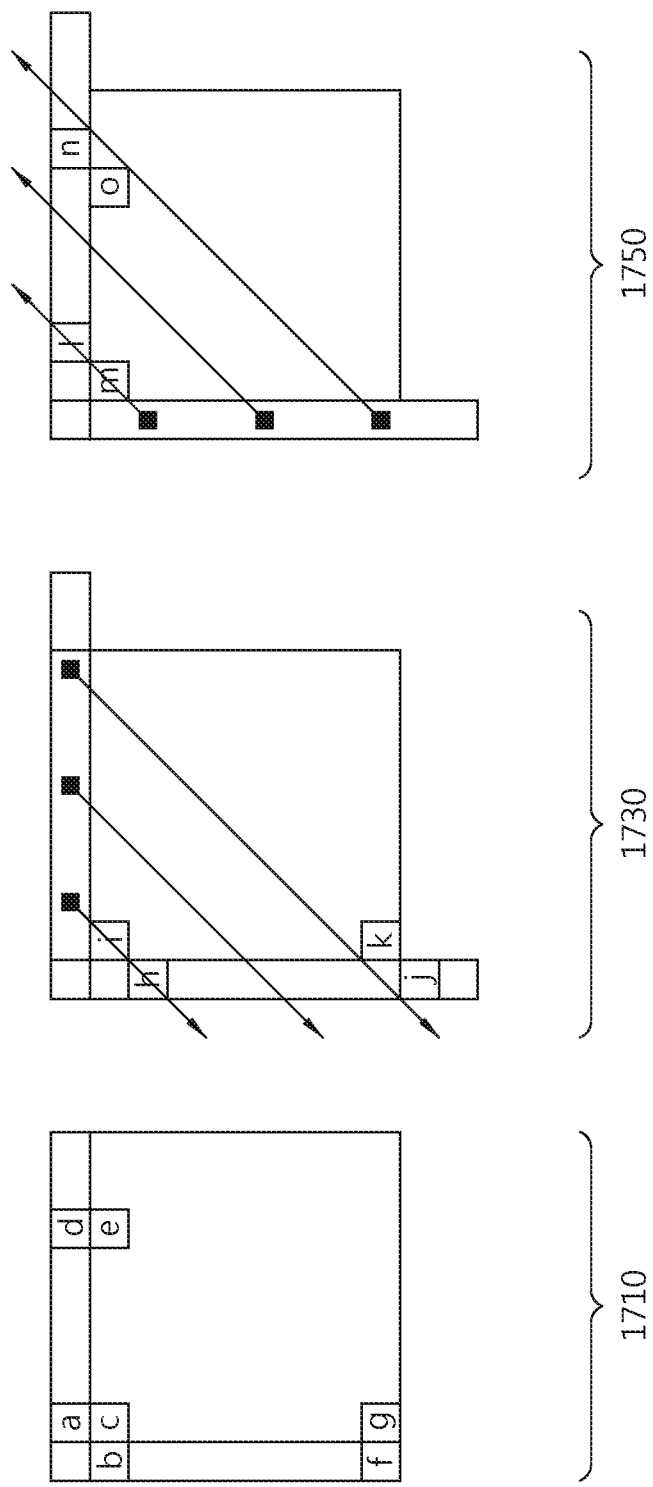
FIG. 17 is a diagram schematically showing the filter type determining method according to the example of FIGS. 16A and 16B.

FIG. 17 is a diagram schematically showing the filter type determining method according to the example of FIGS. 16A and 16B.

1710 of FIG. 17 shows an example of a filter type in the case in which the prediction mode of the current block is the DC mode and/or the planar mode. 1710 of FIG. 17 shows an example of the same filter type as the filter type shown in 1610 of FIG. 16A.

As described above with reference to 1610 of FIG. 16A, in the case in which the prediction mode of the current block is the DC mode (for example, the prediction mode having the mode value of 2) and/or the planar mode (for example, the prediction mode having the mode value of 34), the encoder and the decoder may apply a 3-tap filter to a left upper prediction pixel (for example, a c pixel in 1710 of FIG. 17) positioned at the leftmost upper portion in the prediction block. In addition, the encoder and the decoder may apply a horizontal 2-tap filter to each of the pixels (for example, a g pixel in 1710 of FIG. 17) except for the left upper prediction pixel among the prediction pixels included in a left vertical prediction pixel line. In addition, the encoder and the decoder may apply a vertical 2-tap filter to each of the pixels (for example, an e pixel in 1710 of FIG. 17) except for the left upper prediction pixel among the prediction pixels included in an upper horizontal prediction pixel line. As an example, this may be represented by the following Equation 1.

$$F\_g = (f + 3*g + 2) >> 2$$

$$F\_e = (d + 3*e + 2) >> 2$$

$$F\_c = (a + 2*c + b + 2) >> 2 \qquad \text{[Equation 1]}$$

Where F_x indicates a filtered prediction pixel value generated by performing the filtering on a prediction pixel value of an x position.

1730 of FIG. 17 shows an example of a filter type in the case in which the prediction mode of the current block is the vertical right mode (for example, the prediction mode having the mode value of 5, 6, 12, 13, 22, 23, 24, and 25). 1730 of FIG. 17 shows an example of the same filter type as the filter type shown in 1630 of FIG. 16A.

As described above with reference to 1630 of FIG. 16A, in the case in which the prediction mode of the current block is the vertical right mode, the encoder and the decoder may apply a 2-tap filter to each of the prediction pixels (for example, an i pixel and a k pixel in 1730 of FIG. 17) included in a left vertical prediction pixel line. In the vertical right mode, since the prediction direction is a diagonal direction, the encoder and the decoder may determine that a shape of the filter is a diagonal shape. As an example, this may be represented by the following Equation 2.

$$F\_i = (h + 3*i + 2) >> 2$$

$$F\_k = (j + 3*k + 2) >> 2 \quad \text{[Equation 2]}$$

Where F_x indicates a filtered prediction pixel value generated by performing the filtering on a prediction pixel value of an x position.

1750 of FIG. 17 shows an example of a filter type in the case in which the prediction mode of the current block is the horizontal below mode (for example, the prediction mode having the mode value of 8, 9, 16, 17, 30, 31, 32, and 33). 1750 of FIG. 17 shows an example of the same filter type as the filter type shown in 1650 of FIG. 16B.

As described above with reference to 1650 of FIG. 16B, in the case in which the prediction mode of the current block is the horizontal below mode, the encoder and the decoder may apply a 2-tap filter to each of the prediction pixels (for example, an m pixel and an o pixel in 1750 of FIG. 17) included in an upper horizontal prediction pixel line. In the horizontal below mode, since the prediction direction is a diagonal direction, the encoder and the decoder may determine that a shape of the filter is a diagonal shape. As an example, this may be represented by the following Equation 3.

$$F\_m = (1 + 3*m + 2) >> 2$$

$$F\_o = (n + 3*o + 2) >> 2 \quad \text{[Equation 3]}$$

Where F_x indicates a filtered prediction pixel value generated by performing the filtering on a prediction pixel value of an x position.

Figure 18:
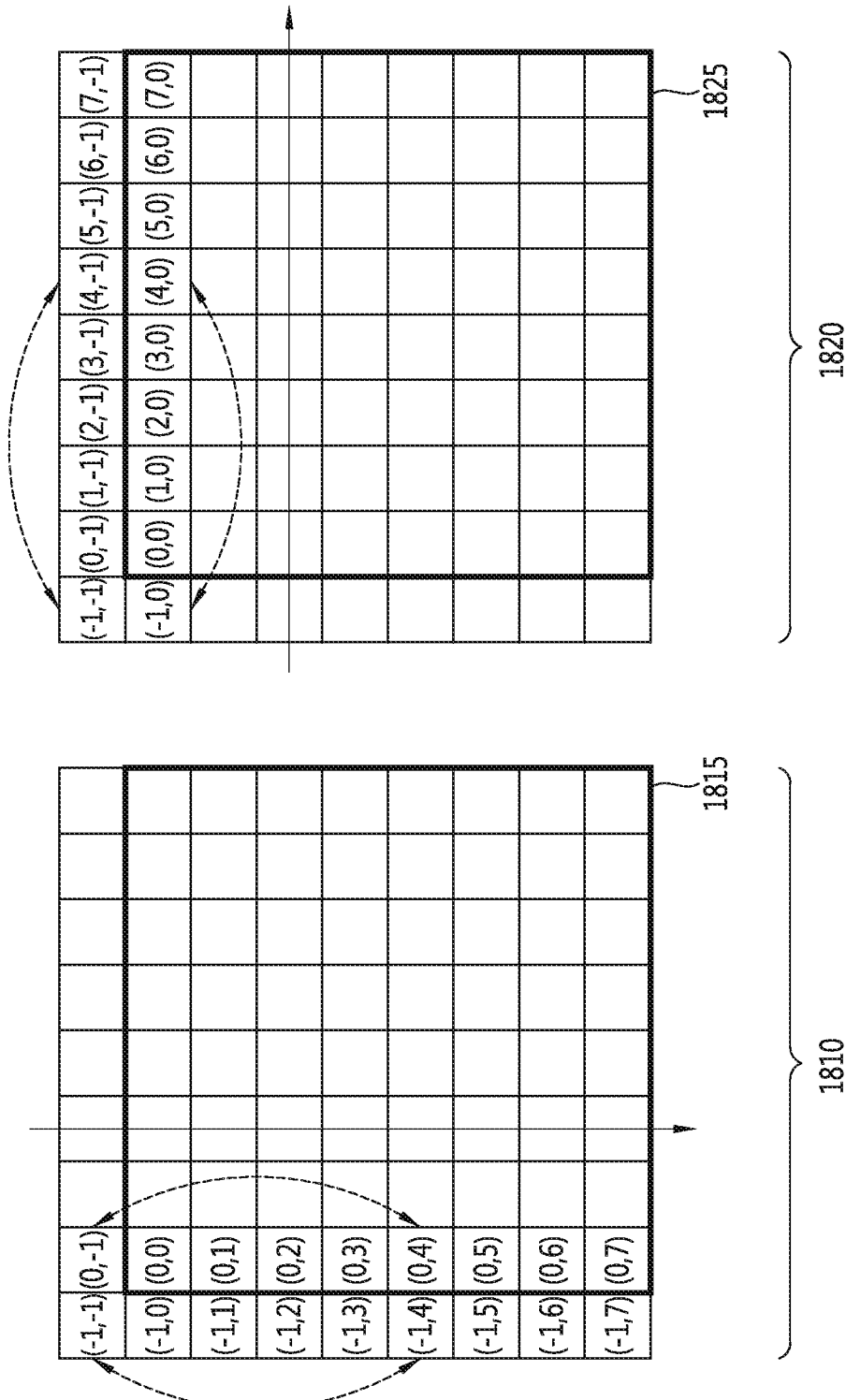
FIG. 18 is a diagram schematically showing an example of a filter type applied in the case in which a prediction mode of the current block is a vertical mode and/or a horizontal mode.

FIG. 18 is a diagram schematically showing an example of a filter type applied in the case in which a prediction mode of the current block is a vertical mode and/or a horizontal mode.

In an example to be described below, terms such as a first reference pixel, a second reference pixel, a third reference pixel, and the like, will be independently used in each of 1810 and 1820 of FIG. 18. For example, the first reference pixel used in 1810 of FIG. 18 is not the same as the first reference pixel used in the 1820 of FIG. 18, and the second and third reference pixels may have independent meanings in 1810 and 1820 of FIG. 18, respectively.

As described above, the filter determined by the filter type may also not be a filter defined by the filter shape, the filter tap, the filter coefficient, or the like. For example, the encoder and the decoder may also perform a filtering process by adding an offset value determined by a predetermined process to the pixel values of the reference pixels. In this case, the filtering process may also be combined with the prediction block generating process to thereby be performed as a single process. That is, the filtered prediction pixel values of each of the pixels in the current block may be derived only by the above-mentioned filtering process. In this case, the above-mentioned filtering process may correspond to a single process including both of the prediction pixel generating process and the filtering process for the generated prediction pixels. In this case, the filtering process may also be called a final prediction pixel (and/or a filtered prediction pixel) generating process using a reference pixel. Therefore, in FIG. 18, examples will be described in view of generation of a prediction pixel.

1810 of FIG. 18 shows an example of a prediction pixel generating method in the case in which the prediction mode of the current block is the vertical mode.

As described above, in the case in which the prediction mode of the current block is the vertical mode, the encoder and the decoder may generate the prediction block by performing the intra prediction on the current block using the above reference pixel. In this case, since the correlation between the prediction pixel positioned at the left region in the prediction block and the left reference pixel is small, the prediction pixel positioned at the left region in the prediction block may have a large prediction error. Therefore, the encoder and the decoder may generate the prediction block as follows for each of the pixels (for example, (0,0), (0,1), (0,2), (0,3), (0,4), (0,5), (0,6), and (0,7)) included in one vertical pixel line (hereinafter, referred to as a left vertical pixel line) positioned at the leftmost portion in the current block 1815.

Referring to 1810 of FIG. 18, pixels of (0,0), (0,1), (0,2), (0,3), (0,4), (0,5), (0,6), and (0,7) positions may be present on the left vertical pixel line. In 1810 of FIG. 18, it is assumed that a current prediction target pixel is a pixel (0,4) among the pixels on the left vertical pixel line.

Since the prediction mode of the current block 1815 is the vertical mode, the encoder and the decoder may fill a position of a prediction target pixel with a pixel value of a first reference pixel (0,−1) (for example, a reference pixel positioned at the leftmost portion among the above reference pixels) positioned on the same vertical line as the vertical line on which the prediction target pixel is positioned among the above reference pixels. That is, in the case in which the prediction mode of the current block 1815 is the vertical mode, the pixel value of the first reference pixel may be determined to be a prediction pixel value of the prediction target pixel.

However, in this case, since the generated prediction pixel value may have a large prediction error, the encoder and the decoder may add an offset value to the pixel value of the first reference pixel to derive a final prediction pixel value. Here, a process of adding the offset value may correspond to the filtering process or correspond to a portion of the prediction pixel generating process. In this case, the offset value may be derived based on a second reference pixel (−1,4) adjacent to the prediction target pixel and a third reference pixel (−1,−1) adjacent to the left of the first reference pixel. For example, the offset value may correspond to a value obtained by subtracting a pixel value of the third reference pixel from a pixel value of the second reference pixel. That is, the encoder and the decoder may add the pixel values of the second and third reference pixels to the pixel value of the first reference pixel to derive a prediction value of the prediction target pixel. The above-mentioned prediction pixel generating process may be similarly applied to pixels other than a pixel (0,4) among the pixels on the left vertical pixel line.

The above-mentioned prediction pixel generating process may be represented by the following Equation 4.

$$p'[x,y]=p[x,-1]+((p[-1,y]-p[-1,-1])>>1)), \{x=0, y=0 \ldots nS-1\}$$ [Equation 4]

Where p'[x,y] indicates a final prediction pixel value for a prediction target pixel of a (x,y) position, and p[x,−1] indicates a first reference pixel positioned on the same vertical line as the vertical line on which the prediction target pixel is positioned on above reference pixels. In addition, p[−1,y] indicate a second reference pixel adjacent to the left of the prediction target pixel, and p[−1,−1] indicates a third reference pixel adjacent to the left of the first reference pixel. Further, nS indicates a height of a current block.

Meanwhile, in the case in which the prediction mode of the current block 1815 is the vertical mode, a region to which the offset and/or the filtering are applied is not limited to the above-mentioned example. For example, the encoder and the decoder may also apply the above-mentioned prediction pixel generating process to two vertical pixel lines positioned at the leftmost portion in the current block 1815. In this case, the prediction pixel generating process may be represented by the following Equation 5.

$$p'[x,y]=p[x,y]+(p[-1,y]-p[-1,-1]+(1<<x))>>(x+1), \{x=0 \ldots 1, y=0 \ldots 7\}$$ [Equation 5]

Where p'[x,y] indicates a final prediction pixel value for a prediction target pixel of a (x,y) position, and p[x,y] indicates a prediction pixel value generated by a general vertical prediction process. In addition, p[−1,y] indicate a reference pixel positioned on the same horizontal line as the horizontal line on which the prediction target pixel is positioned among left reference pixels, and p[−1,−1] indicates a above-left corner reference pixel.

Meanwhile, the process of adding the offset described above may be applied only in the case in which the current block is the luma block and may not be applied in the case in which the current block is the chroma block. For example, in the case in which the current block is the chroma block, the encoder and the decoder may also directly determine that the first reference pixel is the prediction pixel value of the prediction target pixel without applying the offset value.

1820 of FIG. 18 shows an example of a prediction pixel generating method in the case in which the prediction mode of the current block is the horizontal mode.

As described above, in the case in which the prediction mode of the current block is the horizontal mode, the encoder and the decoder may generate the prediction block by performing the intra prediction on the current block using the left reference pixel. In this case, since the correlation between the prediction pixel positioned at the upper region in the prediction block and the above reference pixel is small, the prediction pixel positioned at the upper region in the prediction block may have a large prediction error.

Therefore, the encoder and the decoder may generate the prediction block or the prediction pixels as follows for each of pixels (for example, (0,0), (1,0), (2,0), (3,0), (4,0), (5,0), (6,0), and (7,0)) included in one horizontal pixel line (hereinafter, referred to as an upper horizontal pixel line) positioned at the uppermost portion in the current block 1825.

Referring to 1820 of FIG. 18, pixels of (0,0), (1,0), (2,0), (3,0), (4,0), (5,0), (6,0), and (7,0) positions may be present on the upper horizontal pixel line. In 1820 of FIG. 18, it is assumed that a current prediction target pixel is a pixel (4,0) among the pixels on the upper horizontal pixel line.

Since the prediction mode of the current block 1825 is the horizontal mode, the encoder and the decoder may fill a position of a prediction target pixel with a pixel value of a first reference pixel (−1,0) (for example, a reference pixel positioned at the uppermost portion among the left reference pixels) positioned on the same horizontal line as the horizontal line on which the prediction target pixel is positioned among the left reference pixels. That is, in the case in which the prediction mode of the current block 1825 is the horizontal mode, the pixel value of the first reference pixel may be determined to be a prediction pixel value of the prediction target pixel.

However, in this case, since the generated prediction pixel value may have a large prediction error, the encoder and the decoder may add an offset value to the pixel value of the first reference pixel to derive a final prediction pixel value. Here, a process of adding the offset value may correspond to the filtering process or correspond to a portion of the prediction pixel generating process. In this case, the offset value may be derived based on a second reference pixel (4,−1) adjacent to an upper portion of the prediction target pixel and a third reference pixel (−1,−1) adjacent to an upper portion of the first reference pixel. For example, the offset value may correspond to a value obtained by subtracting a pixel value of the third reference pixel from a pixel value of the second reference pixel. That is, the encoder and the decoder may add the pixel values of the second and third reference pixels to the pixel value of the first reference pixel to derive a prediction value of the prediction target pixel. The above-mentioned prediction pixel generating process may be similarly applied to pixels other than a pixel (4,0) among the pixels on the upper horizontal pixel line.

The above-mentioned prediction pixel generating process may be represented by the following Equation 6.

$$p'[x,y]=p[-1,y]+((p[x,-1]-p[-1,-1])>>1)), \{x=0 \ldots nS-1, y=0\}$$ [Equation 6]

Where p'[x,y] indicates a final prediction pixel value for a prediction target pixel of a (x,y) position, and p[−1,y] indicates a first reference pixel positioned on the same horizontal line as the horizontal line on which the prediction target pixel is positioned among left reference pixels. In addition, p[x,−1] indicate a second reference pixel adjacent to an upper portion of the prediction target pixel, and p[−1,−1] indicates a third reference pixel adjacent to an upper portion of the first reference pixel. Further, nS indicates a width of a current block.

Meanwhile, in the case in which the prediction mode of the current block 1825 is the horizontal mode, a region to which the offset and/or the filtering are applied is not limited to the above-mentioned example. For example, the encoder and the decoder may also apply the above-mentioned prediction pixel generating process to two horizontal pixel lines positioned at the uppermost portion in the current block 1825. In this case, the prediction pixel generating process may be represented by the following Equation 7.

$$p'[x,y]=p[x,y]+(p[x,-1]-p[-1,-1]+(1<<y))>>(y+1), \{x=0 \ldots 7, y=0 \ldots 1\}$$ [Equation 7]

Where p'[x,y] indicates a final prediction pixel value for a prediction target pixel of a (x,y) position, and p[x,y] indicates a prediction pixel value generated by a general horizontal prediction process. In addition, p[x,−1] indicate a reference pixel positioned on the same vertical line as the vertical line on which the prediction target pixel is positioned among above reference pixels, and p[−1,−1] indicates a above-left corner reference pixel.

Meanwhile, similar to 1810 of FIG. 18, the process of adding the offset described above may be applied only in the case in which the current block is the luma block and may not be applied in the case in which the current block is the chroma block. For example, in the case in which the current block is the chroma block, the encoder and the decoder may also directly determine that the first reference pixel is the prediction pixel value of the prediction target pixel without applying the offset value.

Figure 19:
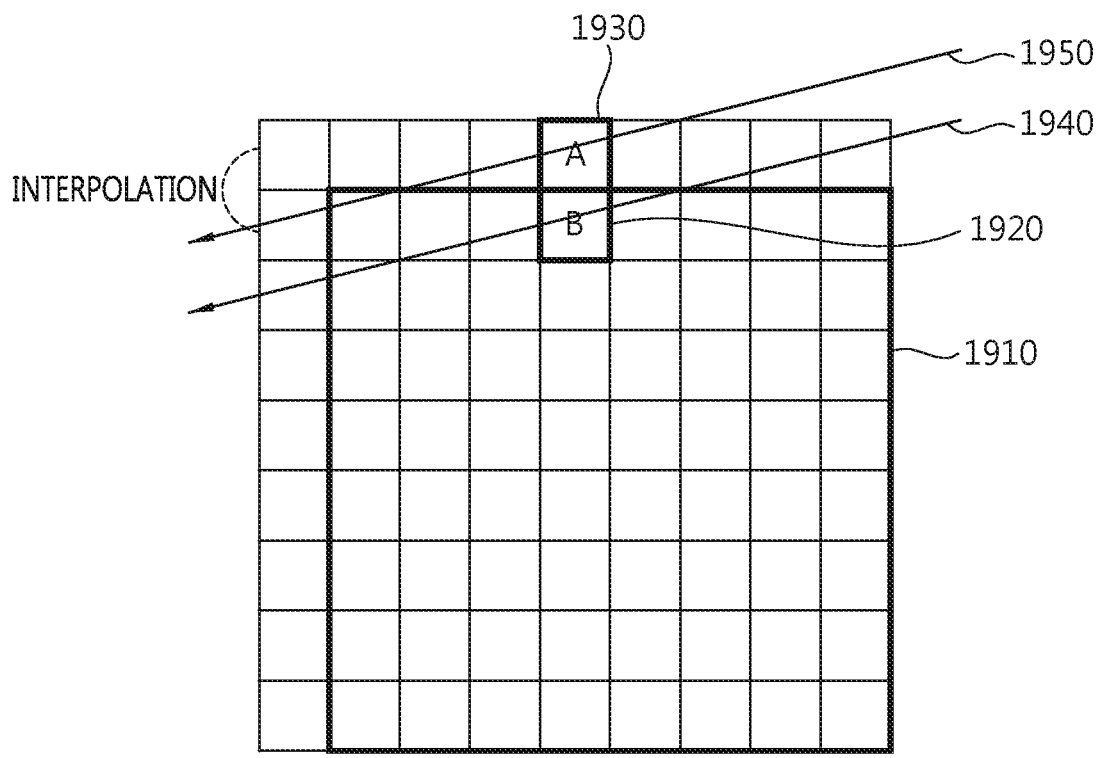
FIG. 19 is a diagram schematically showing another example of a filter type according to the exemplary embodiment of the present invention.

FIG. 19 is a diagram schematically showing another example of a filter type according to the exemplary embodiment of the present invention.

In the example of FIG. 19, since the encoder and the decoder perform the intra prediction on the current block using the left reference pixels and/or the below-left reference pixels, the correlation between the prediction pixels positioned at the upper region in the prediction block 1910 and the above reference pixels may become small. Therefore, in this case, the encoder and the decoder may perform the filtering on the prediction pixels included in an upper horizontal prediction pixel line (for example, one horizontal line positioned at the uppermost portion in the prediction block 1910). Although the case in which the filtering is performed on the pixels on the upper horizontal prediction pixel line is described in an example to be described below, a filtering method according to FIG. 19 may be similarly applied to the case in which the filtering is performed on pixels on a left vertical prediction pixel line (for example, one vertical pixel line positioned at the leftmost portion in the prediction block 1910).

Referring to FIG. 19, the encoder and the decoder may perform the filtering on a predicted pixel, that is, a prediction pixel B 1920, in the prediction block 1910. The above-mentioned filtering performing process may correspond to a process of adding an appropriate offset value to a pixel value of the prediction pixel 1920.

The offset value may be derived based on the reference pixel. As an example, in the case in which a filtering target pixel 1920 is a pixel positioned at the uppermost portion in the prediction block 1910, the reference pixel used to derive the offset value may be a reference pixel A 1930 adjacent to an upper portion of the filtering target pixel 1920. As another example, in the case in which the filtering target pixel is a pixel positioned at the leftmost portion in the prediction block 1920, the reference pixel used to derive the offset value may be a reference pixel adjacent to the left of the filtering target pixel. Hereinafter, an example of a process of obtaining an offset value based on the reference pixel 1920 will be described.

The encoder and the decoder may perform the intra prediction on the reference pixel 1930 to obtain a prediction value of the reference pixel, that is, a prediction reference pixel value. Here, the intra prediction may be directional prediction. In this case, the encoder and the decoder may perform the prediction on the reference pixel 1940 based on the same intra prediction mode (and/or prediction direction) 1950 as a prediction mode (and/or a prediction direction) 1940 of the current block. In the case in which the position of the prediction reference pixels determined based on the prediction directions and the reference pixels of the intra prediction mode are not the integer positions, the encoder and the decoder may perform interpolation based on the reference pixels of the integer positions to obtain pixel values of the prediction reference pixels.

The encoder and the decoder may derive the offset value based on a difference between the pixel value of the reference pixel and the pixel value of the prediction reference pixel. For example, the offset value may correspond to a value obtained by dividing the difference between the pixel value of the reference pixel and the pixel value of the prediction reference pixel by 4. After the offset value is derived, the encoder and the decoder may derive a pixel value of a filtered prediction pixel by adding the derived offset value to the pixel value of the prediction pixel 1920.

The above-mentioned filtering process may be represented by the following Equation 8.

$$\text{Ref1} = \text{Prediction Value of } A$$

$$\text{Delta} = (A - \text{Ref1} + 2) >> 2$$

$$B' = B + \text{Delta} \qquad \text{[Equation 8]}$$

Where B indicates the pixel value of the prediction pixel 1920, A indicates the pixel value of the reference pixel 1930 for the prediction pixel, and Ref1 indicates the pixel value for the reference pixel for A. In addition, B' indicates the pixel value of the filtered prediction pixel.

Although the process of determining whether or not filtering is performed, the process of determining a filtering performing region, the process of determining a filter type, and the like, have been independently described, respectively, in the above-mentioned examples, the encoder and the decoder may also combine these processes with each other to process them as a single process. In this case, the encoder and the decoder may determine at least two of the process of determining whether or not filtering is performed, the process of determining a filtering performing region, and the process of determining a filter type based on a single table.

As an example, whether or not the filtering is performed, the filtering performing region, and the filter type according to the intra prediction mode may be represented by a single table. In this case, both of the encoder and the decoder may have the same table stored therein and determine whether or not the filtering is performed, the filtering performing region, and the filter type based on the intra prediction mode and the table stored therein. The following Table 7 shows an example of the table showing whether or not the filtering is performed, the filtering performing region, and the filter type according to the intra prediction mode.

TABLE 7

| Intra prediction mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Filter type | 0 | 0 | 1 | 0 | 0 | 2 | 2 | 0 | 3 | 3 | 0 | 0 | 3 | 3 | 0 | 0 | 3 | 3 |

| Intra prediction mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| Filter type | 0 | 0 | 0 | 0 | 2 | 2 | 2 | 2 | 0 | 0 | 0 | 0 | 3 | 3 | 3 | 3 | 1 |

In Table 7, in the case in which a value allocated to a filter type is 0, the filter type may indicate that the filtering is not performed on the prediction block. In addition, in the case in which the value allocate to the filter type is 1, 2, or 3, the filter type may indicate that the filtering is performed on the prediction block.

Further, in Table 7, in the case in which the value allocated to the filter type is 1, the filter type may indicate that the filtering performing region and the filter type in the DC mode and/or the planar mode described above with reference to 1610 of FIG. 16A are applied. Further, in the case in which the value allocated to the filter type is 2, the filter type may indicate that the filtering performing region and the filter type in the vertical right mode described above with reference to 1630 of FIG. 16A are applied. Further, in the case in which the value allocated to the filter type is 3, the filter type may indicate that the filtering performing region and the filter type in the horizontal below mode described above with reference to 1650 of FIG. 16B are applied.

region, and the filter type based on the intra prediction mode, sizes of the current block (and/or the prediction block), and the table stored therein.

In the case in which the sizes of the current block and/or the prediction block are excessively small or large, it may be preferable that the filtering is not performed on the prediction block. For example, in the case in which the current block and/or the prediction block correspond to a large block such as a block having a size of 32×32, the correlation between pixels neighboring to the current block and/or pixels in the current block may be large. In this case, the filtering on the prediction block does not have an important meaning. Therefore, the encoder and the decoder may adaptively determine whether or not the filtering is performed according to the sizes of the current block and/or the prediction block to improve the filtering efficiency. The following Table 8 shows an example of a table configured in consideration of the block size as well as the intra prediction mode as described above.

TABLE 8

| | | Intra prediction mode | | | | | | | | | | | | | | | | |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 |
| Block size | 2 × 2 | 0 | 0 | 0 | 0 | 0 | 0 | 0 | 0 | 0 | 0 | 0 | 0 | 0 | 0 | 0 | 0 | 0 | 0 |
| | 4 × 4 | 0 | 0 | 1 | 0 | 0 | 2 | 2 | 0 | 3 | 3 | 0 | 0 | 3 | 3 | 0 | 0 | 3 | 3 |
| | 8 × 8 | 0 | 0 | 1 | 0 | 0 | 2 | 2 | 0 | 3 | 3 | 0 | 0 | 3 | 3 | 0 | 0 | 3 | 3 |
| | 16 × 16 | 0 | 0 | 1 | 0 | 0 | 2 | 2 | 0 | 3 | 3 | 0 | 0 | 3 | 3 | 0 | 0 | 3 | 3 |
| | 32 × 32 | 0 | 0 | 0 | 0 | 0 | 0 | 0 | 0 | 0 | 0 | 0 | 0 | 0 | 0 | 0 | 0 | 0 | 0 |
| | 64 × 64 | 0 | 0 | 0 | 0 | 0 | 0 | 0 | 0 | 0 | 0 | 0 | 0 | 0 | 0 | 0 | 0 | 0 | 0 |

| | | Intra prediction mode | | | | | | | | | | | | | | | | |
|---|---|---|---|---|---|---|---|---|---|---|---|---|---|---|---|---|---|---|
| | | 18 | 19 | 20 | 21 | 22 | 23 | 24 | 25 | 26 | 27 | 28 | 29 | 30 | 31 | 32 | 33 | 34 |
| Block size | 2 × 2 | 0 | 0 | 0 | 0 | 0 | 0 | 0 | 0 | 0 | 0 | 0 | 0 | 0 | 0 | 0 | 0 | 0 |
| | 4 × 4 | 0 | 0 | 0 | 0 | 2 | 2 | 2 | 2 | 0 | 0 | 0 | 3 | 3 | 3 | 3 | 3 | 1 |
| | 8 × 8 | 0 | 0 | 0 | 0 | 2 | 2 | 2 | 2 | 0 | 0 | 0 | 3 | 3 | 3 | 3 | 3 | 1 |
| | 16 × 16 | 0 | 0 | 0 | 0 | 2 | 2 | 2 | 2 | 0 | 0 | 0 | 3 | 3 | 3 | 3 | 3 | 1 |
| | 32 × 32 | 0 | 0 | 0 | 0 | 0 | 0 | 0 | 0 | 0 | 0 | 0 | 0 | 0 | 0 | 0 | 0 | 0 |
| | 64 × 64 | 0 | 0 | 0 | 0 | 0 | 0 | 0 | 0 | 0 | 0 | 0 | 0 | 0 | 0 | 0 | 0 | 0 |

As another example, the table represented by the above Table 7 may further include information on whether or not a filter is applied according to a block size. That is, the table including information on whether or not the filter is applied, the filter applying region, and the filter type according to the intra prediction mode may also include the information on whether or not the filter is applied according to the block size. In this case, both of the encoder and the decoder may have the same table stored therein and determine whether or not the filtering is performed, the filtering performing In Table 8, values of 0, 1, 2, and 3 allocated to a filter type may have the same meaning as that of Table 7. Referring to Table 8, the encoder and the decoder may determine whether or not the filtering is performed based on the sizes of the current block and/or the prediction block and determine whether or not the filtering is performed, the filtering performing region, the filter type, and the like, based on the intra prediction mode.

As another example, whether or not the filtering is performed, the filtering performing region, and the filter type according to the intra prediction mode may also be represented by the following Table 9.

TABLE 9

| Intra prediction mode | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Filtering performing region | T1L1 | L2 | T2 | T1L1 | T1L1 | L1 | L1 | L4 | T1 | T1 | T4 | L1 | 0 | L1 | L1 | T1 |
| Filter type | a | b | b | a | a | c | c | d | c | c | d | c | 0 | e | c | c |

| Intra prediction mode | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|

TABLE 9-continued

| Filtering performing region | 0 | T1 | T1 | L1 | L1 | 0 | 0 | L1 | L1 | L1 | L1 | T1 | T1 | 0 | 0 | T1 | T1 | T1 | T1 |
|---|---|---|---|---|---|---|---|---|---|---|---|---|---|---|---|---|---|---|---|
| Filter type | 0 | e | c | c | c | 0 | 0 | e | e | c | c | c | c | 0 | 0 | e | e | c | c |

FIG. 20 is a diagram describing an intra prediction mode and a filter type applied to Table 9. 2010 of FIG. 20 show examples of prediction directions of an intra prediction mode and mode values allocated to each of the prediction directions. Although the above-mentioned examples have been described based on the intra prediction mode (prediction direction, mode value) shown in 410 of FIG. 4A, it is assumed that an intra prediction mode (prediction direction, mode value) shown in 2010 of FIG. 20 is used in an example of Table 9. However, the example of Table 9 is not limited to being applied to 2010 of FIG. 20.

Referring to Table 9, in the case in which a value allocated to a filtering performing region is 0 and/or in the case in which a value allocated to a filter type is 0, the encoder and the decoder may not perform the filtering on the prediction block. On the other hand, in the case in which the value allocated to the filtering performing region is not 0 and the value allocated to the filter type is not 0, the encoder and the decoder may perform the filtering on the prediction block.

Meanwhile, Tx applied to the filter applying region may indicate x horizontal pixel lines positioned at the uppermost portion in the prediction block, that is, upper horizontal prediction pixel lines, and Lx allocated to the filter applying region may indicate x vertical pixel lines positioned at the leftmost in the prediction block, that is, left vertical prediction pixel lines. In addition, TxLx allocated to the filter applying region may indicate a region including both of the upper horizontal prediction pixel lines and the left vertical prediction pixel lines. In the example of Table 9, a value of x may be 1, 2, or 4. However, as another example, x may also be a predetermined fixed value. For example, x may always be 1. In this case, the upper horizontal prediction pixel line may include only one horizontal pixel line, and the left vertical prediction pixel line may include only one vertical pixel line.

As a filter type that is not 0 in Table 9, there may be a, b, c, d, and e. In Table 9, in the case in which a value allocated to the filter type is a, the encoder and the decoder may perform the filtering based on the filtering performing region and the filter type described above with reference to 1610 of FIG. 16A. In this case, the encoder and the decoder may perform the filtering on the prediction pixels included in the upper horizontal prediction pixel line (one pixel line) and the left vertical prediction pixel line (one pixel line) based on the filter coefficient described above with reference to 1610 of FIG. 16A. In Table 9, in the case in which the value allocated to the filter type is b, the encoder and the decoder may perform the filtering based on the filtering performing region and the filter type described above with reference to FIG. 18. In the case in which the prediction mode of the current block is the vertical mode (for example, the prediction mode having the mode value of 1), the encoder and the decoder may perform the filtering on the prediction pixels included in the left vertical prediction pixel line (for example, two pixel lines) as shown in 1810 of FIG. 18. Further, in the case in which the prediction mode of the current block is the vertical mode (for example, the prediction mode having the mode value of 2), the encoder and the decoder may perform the filtering on the prediction pixels included in the upper horizontal prediction pixel line (for example, two pixel lines) as shown in 1820 of FIG. 18.

Meanwhile, in Table 9, in the case in which the value allocated to the filter type is c and Tx is applied to the filter applying region, the encoder and the decoder may perform the filtering based on the filtering performing region and the filter type described above with reference to 1650 of FIG. 16B. In this case, the encoder and the decoder may apply a diagonal filter of [1,3] to the prediction pixels included in the upper horizontal prediction pixel line. Further, in Table 9, in the case in which the value allocated to the filter type is b and Lx is applied to the filter applying region, the encoder and the decoder may perform the filtering based on the filtering performing region and the filter type described above with reference to 1630 of FIG. 16A. In this case, the encoder and the decoder may apply a diagonal filter of [1,3] to the prediction pixels included in the left vertical prediction pixel line.

In Table 9, when the intra prediction mode of the current block is 7 or 10, the value allocated to the filter type may be d. Referring to 2020 of FIG. 20, a block 2023 may indicate a prediction block, and a prediction direction when an intra prediction mode of a current block may be represented by 2025. In this case, a filtered prediction pixel value may be represented by the following Equation 9.

$$p'[x,y]=((16-k)*p[x,y]+k*p[x,-1]+8)>>4, k=1<<(3-y), \{x=0 \ldots 7, y=0 \ldots 3\}$$ [Equation 9]

Where p'[x,y] may indicate a filtered prediction pixel value, and p[x,y] may indicate a prediction pixel value of a (x,y) position before filtering. In addition, p[x,−1] may indicate a reference pixel positioned on the same vertical line as the vertical line on which the prediction pixel is positioned among the above reference pixels. Referring to Equation 9, when the intra prediction mode of the current block is 10, the encoder and the decoder may perform the filtering on four horizontal pixel lines positioned at the uppermost position in the prediction block 2023. Even in the case in which the intra prediction mode of the current block is 7, the encoder and the decoder may perform the filtering on four vertical pixel lines positioned at the leftmost portion in the prediction block 2023 by a method similar to the method represented by Equation 9.

Again referring to 2020 of FIG. 20, when the intra prediction mode of the current block is 24, the prediction direction may be represented as shown in 2027. In Table 9, when the intra prediction mode of the current block is 24, the value allocated to the filter type may be e. In the case in which the intra prediction mode of the current block is 24, the filtered prediction pixel value may be represented by the following Equation 10.

$$p'[x,y]=p[x,y]+(p[-1,y]-Rp[-1,y]+2)>>2, \{x=0, y=0 \ldots 7\}$$ [Equation 10]

Where p'[x,y] may indicate a filtered prediction pixel value, and p[x,y] may indicate a prediction pixel value of a (x,y) position before filtering. In addition, p[−1,y] may indicate a reference pixel positioned on the same horizontal line as the horizontal line on which the prediction pixel is positioned among the left reference pixels. Rp[−1,y] may indicate a prediction value of the reference pixel of p[−1,y], that is, a prediction reference pixel value. The encoder and the decoder may perform the prediction on the reference pixel of p[−1,y] based on the same intra prediction mode as the prediction mode of the current block in order to derive the prediction reference pixel value.

In Table 9, even in the case in which the intra prediction mode of the current block is 13, 17, 23, 31, or 32, the value allocated to the filter type may be e. Therefore, even in this case, the encoder and the decoder may perform the filtering by a method similar to the method described in Equation 10.

In Table 9, the filter applied according to the value allocated to each filter type is not limited to the above-mentioned example. That is, the filter applied according to the value allocated to each filter type may be changed according to an implementation and/or as needed. In addition, whether or not the filter is applied may be set to be different from the setting in the above-mentioned example.

Hereinafter, an example of a process of performing the filtering on a prediction pixel according to the exemplary embodiment of the present invention will be described in detail. In an example to be described below, an input is IntraPredMode, nS, p[x,y](x,y=−1 . . . nS), and predSamples [x,y](x,y=0 . . . nS−1), and an output is predSamplesF[x,y] (x,y=0 . . . nS−1). Here, IntraPredMode indicates an intra prediction mode of a current block, nS indicates a horizontal size and a vertical size of a prediction block, and p[x,y](x, y=−1 . . . nS) indicates a pixel value of a reference pixel positioned around the current block. In addition, predSamples[x,y](x,y=0 . . . nS−1) indicates a prediction pixel value, and predSamplesF[x,y](x,y=0 . . . nS−1) indicates a filtered prediction pixel value.

Here, whether or not the filtering is performed, the filtering performing region, and the filter type according to the intra prediction mode may be determined by the following Table 10.

TABLE 10

| IntraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| intraPostFilterType | 0 | 0 | 1 | 0 | 0 | 2 | 2 | 0 | 3 | 3 | 0 | 0 | 2 | 2 | 0 | 0 | 3 | 3 |
| IntraPredMode | 18 | 19 | 20 | 21 | 22 | 23 | 24 | 25 | 26 | 27 | 28 | 29 | 30 | 31 | 32 | 33 | 34 | 35 |
| intraPostFilterType | 0 | 0 | 0 | 0 | 2 | 2 | 2 | 2 | 0 | 0 | 0 | 0 | 3 | 3 | 3 | 3 | 1 | — |

In Table 10, intraPostFilterType indicates information on a filter type applied to a prediction block. Here, the information on a filter type may also include all of information on whether or not the filtering is performed, the filtering performing region, and the filter type according to the intra prediction mode. In addition, intraPostFilterType may be represented by intraPostFilterType[IntraPredMode], which means that a value allocated to intraPostFilterType is determined by IntraPredMode.

In the case in which nS is smaller than 32, the encoder and the decoder may induce predSamplesF[x,y](x,y=0 . . . nS−1) by the following process according to the value allocated to intraPostFilterType[IntraPredMode].

If the value allocated to intraPostFilterType[IntraPred-Mode] is 1, the encoder and the decoder may derive a predSamplesF[x,y] value by the following Equation 11.

predSamples*F*[0,0]=(p[−1,0]+2*predSamples[0,0]+p [0,−1]+2)>>2 predSamples*F*[x,0]=(p[x,−1]+3*predSamples[x, 0]+2)>>2 (x=1 . . . nS−1)

predSamples*F*[0,y]=(p[−1,y]+3*predSamples [0,y]+2)>>2 (y=1 . . . nS−1)

predSamples*F*[x,y]=predSamples[x,y] (x,y=1 . . . nS−1)  [Equation 11]

If the value allocated to intraPostFilterType[IntraPred-Mode] is 2, the encoder and the decoder may derive the predSamplesF[x,y] value by the following Equation 12.

predSamples*F*[0,y]=(p[−1,y+1]+3*predSamples[0,y]+ 2)>>2 (y=0 . . . nS−1)

predSamples*F*[x,y]=predSamples[x,y] (x=1 . . . nS−1, y=0 . . . nS−1)  [Equation 12]

If the value allocated to intraPostFilterType[IntraPred-Mode] is 3, the encoder and the decoder may derive the predSamplesF[x,y] value by the following Equation 13.

predSamples*F*[x,0]=(p[x+1,−1]+3*predSamples[x,0]+ 2)>>2 (x=0 . . . nS−1)

predSamples*F*[x,y]=predSamples[x,y] (x=0 . . . nS−1, y=1 . . . nS−1)  [Equation 13]

If the value allocated to intraPostFilterType[IntraPred-Mode] is 0, the encoder and the decoder may derive the predSamplesF[x,y] value by the following Equation 14.

predSamples*F*[x,y]=predSamples[x,y] (x,y=0 . . . nS−1)  [Equation 14]

Meanwhile, the encoder and the decoder may differently set an application of all methods (for example, the filtering performing method) described above according to the size and/or the depth of the current block (and/or the prediction block) For example, the application of the present invention may be differently set according to the size of the PU and/or the size of the TU or be differently set according to the depth value of the CU.

In this case, the encoder and the decoder may use the size value of the block and/or the depth value of the block as a variable in order to determine the application of the present invention. Here, the block may correspond to the CU, the PU, and/or the TU. As an example, in the case in which the size value of the block is used as a variable, the encoder and the decoder may apply the present invention only a block having a size equal to or larger than the variable. As another example, the encoder and the decoder may apply the present invention only to a block having a size smaller than or equal to the variable. Alternatively, the encoder and the decoder may apply the present invention only to a block having a size corresponding to the variable value.

The following Table 11 shows an example of the application of the present invention in the case in which the size value of the block used as a variable for determining the application of the present invention is 16×16. In Table 11, 0 indicates that the present invention is applied to a corresponding block size, and X indicates that the present invention is not applied to a corresponding block size.

TABLE 11

| Block size | Method A | Method B | Method C |
|---|---|---|---|
| 32 × 32 | ○ | X | X |
| 16 × 16 | ○ | ○ | ○ |
| 8 × 8 | X | ○ | X |
| 4 × 4 | X | ○ | X |

Referring to Table 11, in the case of a method A, the encoder and the decoder may apply the present invention only to a block having a size equal to or larger than a block size (16×16) used as a variable. In the case of a method B, the encoder and the decoder may apply the present invention only to a block having a size smaller than and equal to the block size (16×16) used as the variable. Further, in the case of a method C, the encoder and the decoder may apply the present invention only to a block having a size equal to the block size (16×16) used as the variable.

Meanwhile, as an example, the variable value (the size value of the block and/or the depth value of the block) for determining the application of the present invention may be a predetermined fixed value. In this case, the variable value may be pre-stored in the encoder and the decoder, and the encoder and the decoder may determine the application of the present invention based on the variable value stored therein.

As another example, the variable value for determining the application of the present invention may also be changed according to a profile or a level. In the case in which the variable value is determined based on the profile, the variable value corresponding to each profile may be a predetermined fixed value, and in the case in which the variable value is determined based on the level, the variable value corresponding to each level may be a predetermined fixed value.

As still another example, the variable value (the size value of the block and/or the depth value of the block) for determining the application of the present invention may be determined by the encoder. In this case, the encoder may encode information on the variable value to transmit the encoded information to the decoder through a bitstream. The information on the variable value transmitted through the bitstream may be included in a sequence parameter set (SPS), a picture parameter set (PSP), a slice header, and the like. The decoder may derive the variable value from the received bitstream and determine the application of the present invention based on the derived variable value.

As an indicator used to indicate the information on the variable value, there may be various types of indicates. As an example, in the case in which the method A is used in Table 11 and the variable value for determining the application of the present invention corresponds to the size value of the block, the indicator used to indicate the information on the variable value may be log 2=intra_prediction_filtering_enable_max_size_minus2. For example, in the case in which the variable value is 32×32, a value allocated to the indicator may be 3, and in the case in which the variable value is 4×4, a value allocated to the indicator may be 0. As another example, in the case in which the method A is used in Table 11 and the variable value for determining the application of the present invention corresponds to the depth value of the CU, the indicator used to indicate the information on the variable value may be intra_prediction_filtering_enable_max_cu_depth. In this case, for example, when a value allocated to the indicator is 0, the present invention may be applied to a block having a size equal to or larger than 64×64, when a value allocated to the indicator is 1, the present invention may be applied to a block having a size equal to or larger than 32×32, and when a value allocated to the indicator is 4, the present invention may be applied to a block having a size equal to or larger than 4×4.

Meanwhile, the encoder may also determine that the present invention is not applied to all block sizes. In this case, the encoder may use a predetermined indicate in order to transmit determined information to the decoder. As an example, the encoder may allow an indicator such as intra_prediction_filtering_enable_flag to be included in the SPS, the PPS, the slice header, or the like, and then transmit the SPS, the PPS, the slice header, or the like, to the decoder. Here, intra_prediction_filtering_enable_flag may correspond to an indicator indicating whether or not the present invention is applied to all blocks in a sequence, a picture, and/or a slice. As another example, the encoder may also transmit information indicating that the present invention is not applied to all block sizes using an indicator (for example, intra_prediction_filtering_enable_max_cu_depth) indicating the information on the variable value described above. In this case, as an example, the encoder allocates a value (for example, 5) indicating an invalid (and/or disallowed) block size (for example, a size of 2×2) to the indicator, thereby making it possible to indicate that the present invention is not applied to all block sizes.

According to the examples of the present invention described above, the prediction error generated at the time of the intra prediction is reduced and the discontinuity between the blocks is minimized, thereby making it possible to improve the prediction efficiency and the encoding efficiency.

In the above-mentioned exemplary embodiments, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

The invention claimed is:
1. A video decoding apparatus comprising:
a prediction block generating unit to generate a prediction block by performing prediction on a current block based on an intra prediction mode of the current block; and
a reconstructed block generating unit to generate a reconstructed block based on the prediction block and a reconstructed residual block corresponding to the current block,
wherein the prediction block comprises prediction pixels, the prediction pixels are pixels on a vertical pixel line of the current block, the prediction pixels are filtered based on an offset when the intra prediction mode of the current block is a vertical mode, the prediction pixels are filtered by adding a value of the offset to a pixel value of a first reference pixel present on the same vertical line as a vertical line on which the prediction pixels are present among reconstructed reference pixels adjacent to an upper of the current block when the intra prediction mode of the current block is the vertical mode, and the value of the offset is determined based on a difference value between a pixel value of a second reference pixel adjacent to a left portion of the prediction pixels and a pixel value of a third reference pixel adjacent to a left portion of the first reference pixel.

2. The video decoding apparatus of claim 1, wherein the prediction block generating unit performs filtering when a size of the current block is smaller than 32×32.

3. A video encoding apparatus comprising:

a prediction block generating unit to generate a prediction block by performing prediction on a current block based on an intra prediction mode of the current block; and a reconstructed block generating unit to generate a reconstructed block based on the prediction block and a reconstructed residual block corresponding to the current block, wherein the prediction block comprises prediction pixels, the prediction pixels are pixels on a vertical pixel line of the current block, the prediction pixels are filtered based on an offset when the intra prediction mode of the current block is a vertical mode, the prediction pixels are filtered by adding a value of the offset to a pixel value of a first reference pixel present on the same vertical line as a vertical line on which the prediction pixels are present among reconstructed reference pixels adjacent to an upper of the current block when the intra prediction mode of the current block is the vertical mode, and the value of the offset is determined based on a difference value between a pixel value of a second reference pixel adjacent to a left portion of the prediction pixels and a pixel value of a third reference pixel adjacent to a left portion of the first reference pixel.

4. The video encoding apparatus of claim 3, wherein the prediction block generating unit performs filtering when a size of the current block is smaller than 32×32.

5. A non-transitory computer-readable medium storing a bitstream, the bitstream comprising:

prediction mode information indicating an intra prediction mode for a current block on which filtering is performed;

wherein a prediction block is generated by performing prediction on the current block based on the intra prediction mode of the current block which the prediction mode information indicates, a reconstructed block is generated based on the prediction block and a reconstructed residual block corresponding to the current block, the prediction block comprises prediction pixels, the prediction pixels are pixels on a vertical pixel line of the current block, the filtering is performed on the prediction pixels based on an offset when the intra prediction mode of the current block is a vertical mode, the prediction pixels are filtered by adding a value of the offset to a pixel value of a first reference pixel present on the same vertical line as a vertical line on which the prediction pixels are present among reconstructed reference pixels adjacent to an upper of the current block when the intra prediction mode of the current block is the vertical mode, and the value of the offset is determined based on a difference value between a pixel value of a second reference pixel adjacent to a left portion of the prediction pixels and a pixel value of a third reference pixel adjacent to a left portion of the first reference pixel.

6. The non-transitory computer-readable medium of claim 5, wherein the filtering is performed when a size of the current block is smaller than 32×32.

* * * * *